(12) United States Patent
Uchiyama et al.

(10) Patent No.: US 12,118,196 B2
(45) Date of Patent: Oct. 15, 2024

(54) INSPECTION SETTING DEVICE

(71) Applicant: Keyence Corporation, Osaka (JP)

(72) Inventors: Naoya Uchiyama, Osaka (JP); Yosuke Shiota, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 0 days.

(21) Appl. No.: 18/202,456

(22) Filed: May 26, 2023

(65) Prior Publication Data

US 2023/0418452 A1    Dec. 28, 2023

(30) Foreign Application Priority Data

Jun. 28, 2022  (JP) ................................ 2022-103854

(51) Int. Cl.
*G06F 3/04847* (2022.01)
*G06F 3/0482* (2013.01)
(Continued)

(52) U.S. Cl.
CPC ........ *G06F 3/04847* (2013.01); *G06F 3/0482* (2013.01); *G06F 3/0486* (2013.01); *G06T 7/0004* (2013.01); *G06T 11/60* (2013.01); *H04N 5/265* (2013.01); *H04N 7/183* (2013.01); *H04N 23/62* (2023.01); *G06T 2200/24* (2013.01); *G06T 2207/20092* (2013.01); *G06T 2207/30164* (2013.01)

(58) Field of Classification Search
CPC .. G06F 3/04847; G06F 3/0482; G06F 3/0486; H04N 23/62; H04N 5/265; H04N 7/183; G06T 7/0004; G06T 11/60; G06T 2200/24; G06T 2207/20092; G06T 2207/30164
See application file for complete search history.

(56) References Cited

U.S. PATENT DOCUMENTS

| | | | |
|---|---|---|---|
| 2014/0181752 A1* | 6/2014 | Kim | G06F 3/04817 |
| | | | 715/835 |
| 2015/0022637 A1* | 1/2015 | Saeki | G06T 7/0004 |
| | | | 348/46 |
| 2020/0364841 A1* | 11/2020 | Hino | G06T 7/001 |

FOREIGN PATENT DOCUMENTS

JP    2015021760 A    2/2015

OTHER PUBLICATIONS

Xiang-Na Tang et al., Visual Inspection of Workpiece Quality, Oct. 1, 2011, International Conference on Image Analysis and Signal Processing, pp. 434-438 (Year: 2011).*

(Continued)

*Primary Examiner* — Tam T Tran

(74) *Attorney, Agent, or Firm* — Kilyk & Bowersox, P.L.L.C.

(57) ABSTRACT

A user can easily execute image processing from setting to data utilization without acquiring programming skills. An inspection setting device includes: a screen generation unit that generates a display screen displaying a palette region in which a plurality of tools including an imaging setting tool, a positioning setting tool, an inspection setting tool, and an output tool can be arranged and a work sheet region in which data related to the plurality of tools is referred to and calculated; and an input unit that receives selection of a tool arranged on the palette region and receives a setting related to input, reference, or calculation of data related to the selected tool via the work sheet region.

20 Claims, 43 Drawing Sheets

(51) Int. Cl.
   *G06F 3/0486*   (2013.01)
   *G06T 7/00*   (2017.01)
   *G06T 11/60*   (2006.01)
   *H04N 5/265*   (2006.01)
   *H04N 7/18*   (2006.01)
   *H04N 23/62*   (2023.01)

(56) References Cited

OTHER PUBLICATIONS

Tao Liu et al., Visual Inspection System for Smart Manufacture of Home Appliances, Oct. 1, 2017, IEEE International Symposium on Robotics and Intelligent Sensors, pp. 243-248 (Year: 2017).*
U.S. Appl. No. 18/202,442, filed May 26, 2023 (68 pages).

\* cited by examiner

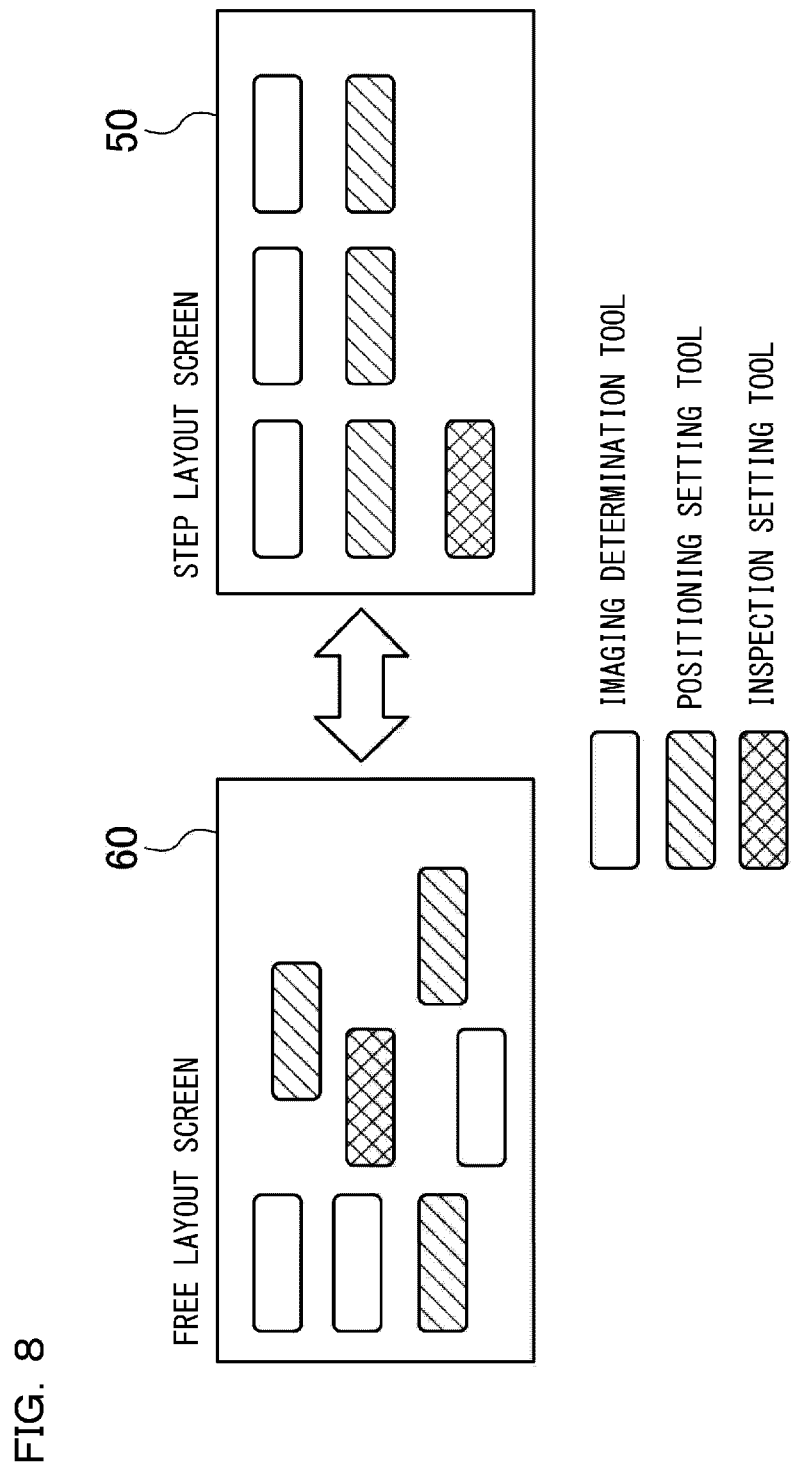

GUI      WORK SHEET

GUI      WORK SHEET

FIG. 29

☐ SELECT ALL

☐ NUMBER OF LABELS
☐ DETERMINATION LABEL
　☐ CENTER OF GRAVITY X[0]
　☐ CENTER OF GRAVITY Y[0]
　☐ AREA [0]
☐ LABEL 0
　☐ CENTER OF GRAVITY X[0]
　☐ CENTER OF GRAVITY Y[0]
　☐ AREA [0]

∧ TO FILTER

| CLEAR |
|---|

FIG. 31

| PALETTE | | | | | SCREEN SELECTION |
|---|---|---|---|---|---|
| ∨ MAIN MEASUREMENT ROUTINE | | NUMBER OF TIMES OF EXECUTION :10 | | EXECUTION TIME :7,511 | PROPERTY |
| | | | | | WHOLE |
| DETERMINATION | ID TOOL NAME | ORDER OF TIMES | NUMBER OF TIMES NG | EXECUTION TIME Error | TOOL TYPE  RESULT OUTPUT |
| ⊘ | 0001 ∨ IMAGE INPUT 1 | 1 | 0 | 1.347 | TOOL ID  0004 |
| ⊘ | 0002 ∨ PATTERN SEARCH | 1 | 0 | 1.347 | TOOL NAME  RESULT OUTPUT |
| ⊘ | 0003 ∧ BLOB | 1 | 0 | 1.347 | EXECUTABILITY  EXECUTABLE ∨ |
| NAME | | | SET VALUE | | FILTER SETTING |
| AREA UPPER LIMIT | | | 110 | | AREA UPPER LIMIT  B2 |
| AREA LOWER LIMIT | | | 100 | | LOWER LIMIT  100 |

INSPECTION TARGET IMAGE

T0003 BLOB

| NAME | SET VALUE | | |
|---|---|---|---|
| AREA UPPER LIMIT | ◀▶ 110 | | |
| | | | |
| | | | |

INSPECTION SETTING DEVICE

CROSS-REFERENCE TO RELATED APPLICATIONS

The present application claims foreign priority based on Japanese Patent Application No. 2022-103854, filed Jun. 28, 2022, the contents of which are incorporated herein by reference.

BACKGROUND OF THE INVENTION

1. Field of the Invention

The disclosure relates to an inspection setting device for setting an image inspection device that inspects a workpiece captured by a camera.

2. Description of Related Art

For example, in image inspection using the image inspection device disclosed in Japanese Patent Application Laid-Open No. 2015-21760, not only image processing but also data utilization such as reference, analysis, and calculation of data obtained by image processing is important.

For example, in image inspection, collective coordinate transformation for a plurality of coordinate values measured by image processing, collective threshold determination with a predetermined threshold for a plurality of measurement values, and the like are important.

As a data utilization means in the conventional image inspection, a numerical calculation by a script and a variable definition method are known.

However, in the above method, since a programming skill capable of creating a script is required, there is a problem that the cost for allowing the user to learn the skill is high.

SUMMARY OF THE INVENTION

The disclosure has been made in view of such a point, and an object of the disclosure is to enable a user to make an easy execution from setting of image processing to data utilization without acquiring programming skill.

In order to achieve the above object, according to one embodiment of the disclosure, it can be premised on an inspection setting device for setting an image inspection device that inspects a workpiece captured by a camera. An inspection setting device includes: a screen generation unit configured to generate a display screen displaying a palette region in which a plurality of tools including an imaging setting tool related to capturing setting of a camera, a positioning setting tool related to a positioning setting for positioning an inspection region with respect to an inspection target image captured by the camera, an inspection setting tool related to an inspection setting for setting an inspection content with respect to the positioned inspection region, and an output tool related to an output setting for performing setting related to output of an inspection result, and a work sheet region for referring to and calculating data related to the plurality of tools; and an input unit configured to receive selection of a tool arranged on the palette region on the display screen, and receive a setting related to input, reference, or calculation of data related to the selected tool via the work sheet region.

According to this configuration, when the user selects a plurality of arbitrary tools among the imaging setting tool, the positioning setting tool, the inspection setting tool, and the output tool and arranges the tools in the palette region of the display screen, it is possible to perform data input, reference, and calculation with respect to the tool on the palette region selected by the user via the work sheet region. As a result, the user can execute setting of image processing to data utilization without acquiring programming skill. In addition, the image processing can be set by the tool in the palette region, and the data utilization regarding the tool can be set in the work sheet region. Therefore, each setting can be distinguished, and the setting operation can be easily understood. Note that the palette region and the work sheet region may be displayed on one display screen at the same time, or only one of them may be displayed.

According to another embodiment, a control unit configured to generate a mnemonic representing data related to a tool arranged on the palette region may be included. In addition, the input unit can receive a forward reference instruction for taking data related to a selected tool on the palette region into the work sheet region. When the input unit receives the forward reference instruction, the control unit associates the selected tool with a cell by giving a mnemonic of data related to the selected tool to the cell on the work sheet region. That is, data processing can be easily performed on the work sheet region by taking data related to the tool into the work sheet region. At this time, by associating the tool and the cell with each other by the mnemonic, the measurement value is updated for each measurement and taken into the work sheet region, so that the inspection can be made efficient. The palette region may be capable of free layout or step layout.

In addition, when the selection operation of an arbitrary tool is received, reference relationship data indicating a reference relationship between the selected tool and a cell in the work sheet region may be created and displayed. In addition, when the selection operation of a cell to which data is input is received, reference relationship data indicating a reference relation between the selected cell and the tool may be created and displayed.

The input unit according to another embodiment may be configured to be capable of receiving the forward reference instruction by a drag and drop operation in which data related to a selected tool on the palette region is dragged and dropped on the work sheet region. According to this configuration, data such as a measurement value on the palette region can be easily arranged on the work sheet region only by performing a drag and drop operation on the data to the work sheet region.

An input unit according to another embodiment may receive a reverse reference instruction for taking data of a selected cell on the work sheet region into a parameter of a selected tool on the palette region. In this case, when the input unit receives the reverse reference instruction, the control unit can associate the parameter of the selected tool on the palette region with the selected cell on the work sheet region by providing a reference link to the selected cell on the work sheet region with respect to the parameter of the selected tool on the palette region. According to this configuration, since the data on the work sheet region can be taken into the parameters of the tool on the palette region, the data for the parameters can be easily input on the work sheet region.

An input unit according to another embodiment may receive a reverse reference instruction for taking data of a cell in which a calculation result received via the work sheet region is arranged, into a parameter of a tool selected on the palette region. In this case, when the input unit receives a reverse reference instruction for taking data of a cell in which a calculation result received via the work sheet region is arranged, into a parameter of a tool selected on the palette region, the control unit can associate, when the input unit receives the reverse reference instruction, a parameter of a selected tool on the palette region with a cell in which the calculation result is arranged by providing a reference link to the cell in which the calculation result is arranged with respect to the parameter of the selected tool on the palette region. According to this configuration, since data calculated on the work sheet region can be taken into the parameter area of the tool, a desired parameter can be easily generated on the work sheet region.

A control unit according to another embodiment can analyze a reference relationship between a plurality of tools arranged on the palette region and data input to the work sheet region, and determine an execution order at the time of executing inspection of each tool and a reference order and a calculation order of data in the work sheet region. As a result, the execution order, the reference order, and the calculation order of the data in a case where a plurality of tools are selected are automatically determined, so that the usability for the user is improved.

A control unit according to another embodiment may refer to identification information allocated to a plurality of tools arranged on the palette region and a plurality of cells in the work sheet region, analyze a dependency relationship based on a processing content of each piece of the identification information, and execute a sorting algorithm, thereby determining an execution order of each tool at the time of execution of inspection, and a reference order and a calculation order of data in the work sheet region. That is, each tool may have a dependency relationship in which, for example, an inspection is executed after imaging and an acquired inspection result is output. In addition, there is a dependency such as data reference between the tool and the cell. The execution order can be appropriately determined by executing the sorting algorithm comprehensively considering such dependency.

A control unit according to another embodiment inputs the output result into a cell on the work sheet region when the input unit receives an instruction to take the output result into the work sheet region. In addition, when the input unit receives an instruction to take the calculation result into an output tool arranged in the palette region, the control unit can execute the calculation, and provide the output tool with a reference link to a cell in which the calculation result is arranged, thereby associating the output tool with a cell in which the calculation result is arranged. That is, in a case where there is a plurality of inspection regions, the calculation can be performed using the determination result in each inspection on the work sheet region, and thus, for example, comprehensive determination, extraction of the maximum value, batch coordinate conversion, and the like can be easily performed.

A screen generation unit according to another embodiment may be configured to be capable of generating a display screen that simultaneously displays the palette region, the work sheet region, and an image region that displays an image captured by the camera. According to this configuration, it is possible to efficiently set the tool setting in the palette region and the data setting in the work sheet region while confirming the captured image.

The screen generation unit according to another embodiment may be configured to be capable of generating a display screen that distinguishes and displays a first inspection region in the image region and a tool and a cell related to the first inspection region, and a second inspection region in the image region and a tool and a cell related to the second inspection region. In a case where there are a plurality of inspection regions, an inspection region to be focused on and a tool and a cell related to the region can be displayed in a highlighted manner to be distinguished from other inspection regions, so that a point to be viewed by the user becomes clear.

As described above, since the setting regarding the input, reference, or calculation of the data regarding the tool arranged on the palette region can be received via the work sheet region, the setting of the image processing to the data utilization can be easily executed even if the user does not learn the programming skill.

BRIEF DESCRIPTION OF THE DRAWINGS

FIG. 8 is a conceptual diagram for explaining a case where switching between a step layout screen and a free layout screen is performed;

FIG. 29 is a diagram illustrating a filtering display screen;

FIG. 31 is a diagram illustrating a state in which a link is attached;

FIG. 36 is a diagram illustrating a state in which a table is created by attaching a mnemonic;

FIG. 37 is a diagram illustrating a state in which a display setting for enable/disable control is created;

DETAILED DESCRIPTION OF PREFERRED EMBODIMENTS

Hereinafter, embodiments of the invention will be described in detail with reference to the drawings. It is to be noted that the following description of preferred embodiments is merely exemplary in nature and is not intended to limit the invention, its application, or its use.

Figure 1:
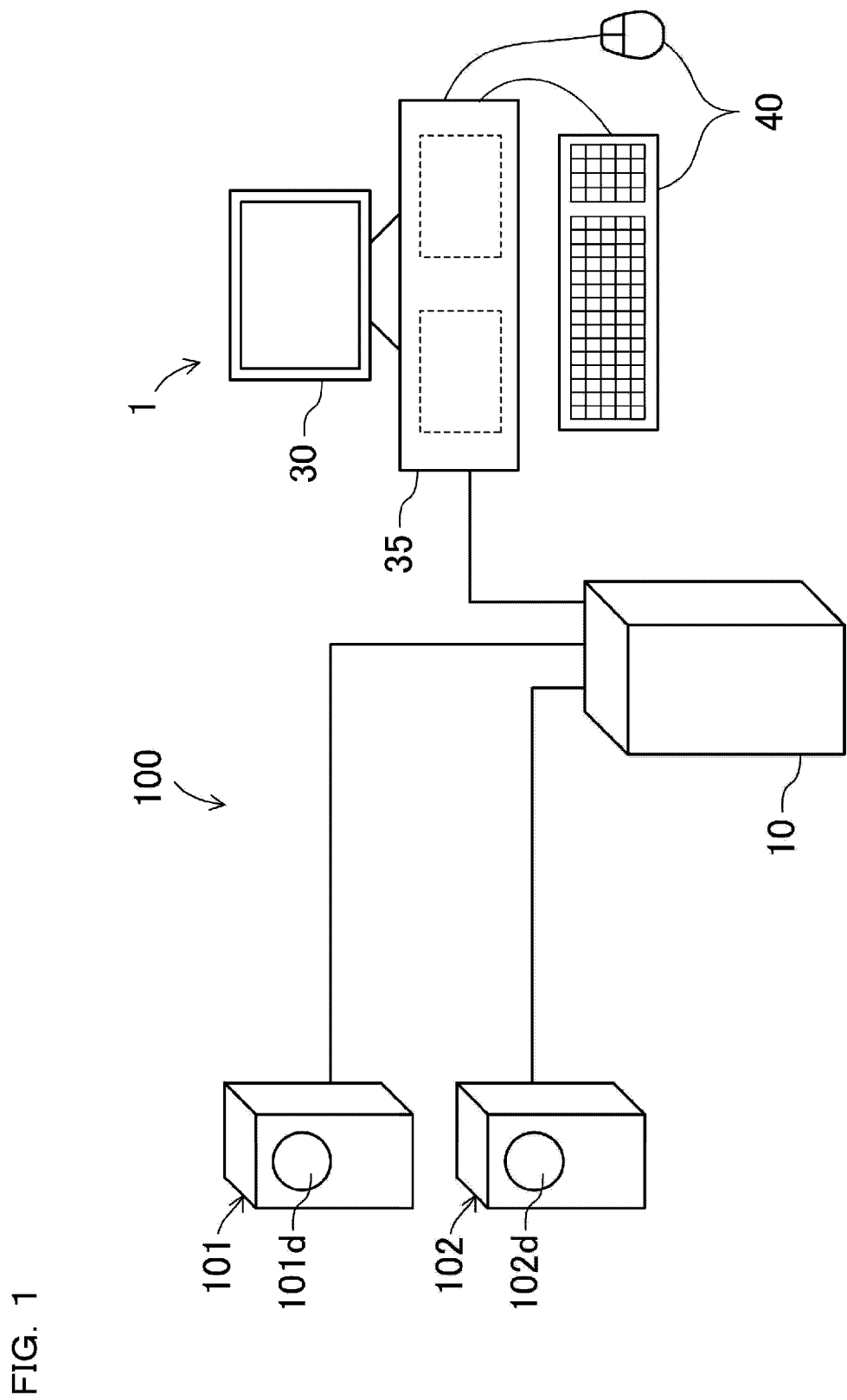
FIG. 1 is a schematic diagram illustrating a configuration of an inspection setting device according to an embodiment of the invention.
Figure 2:
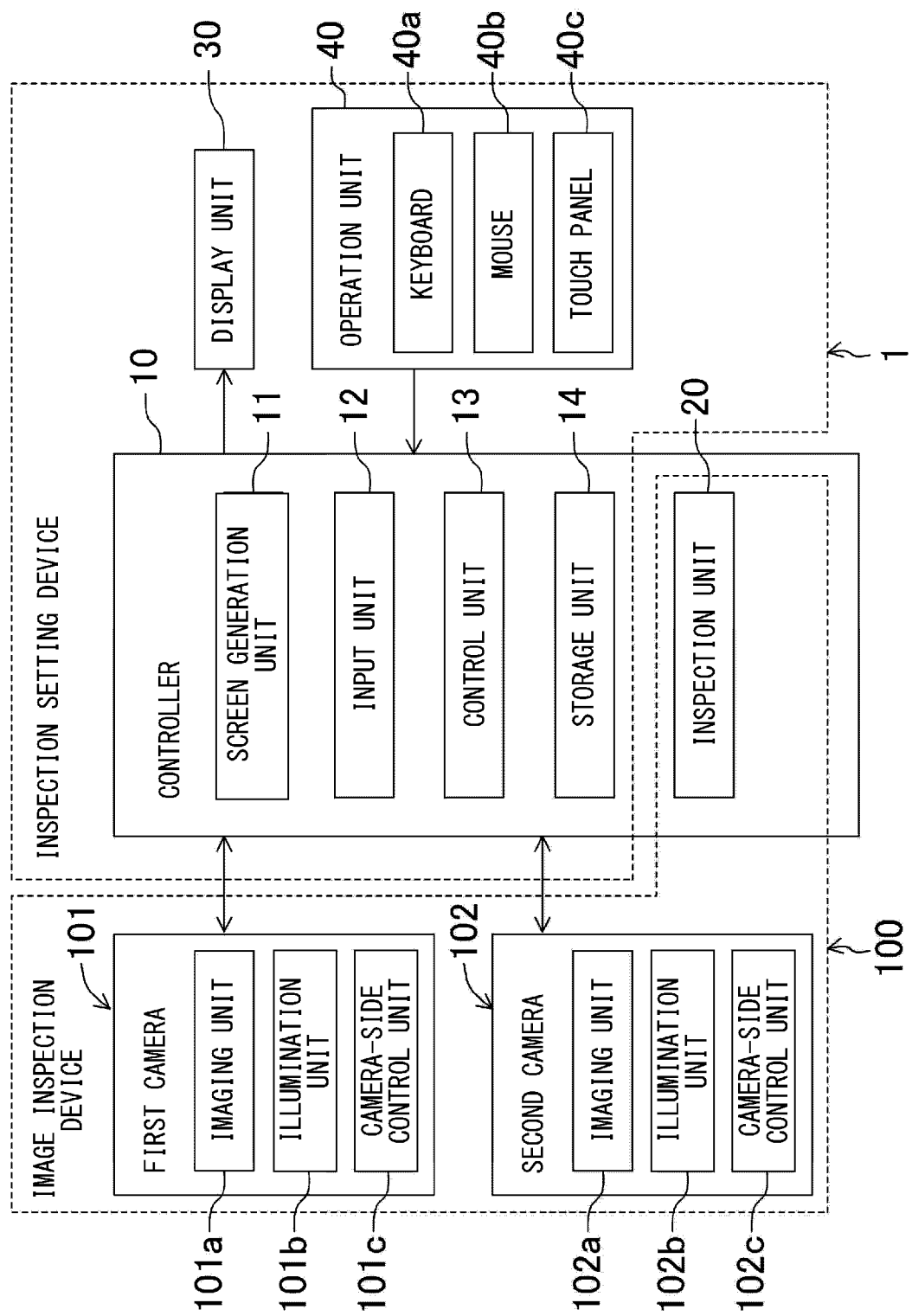
FIG. 2 is a block diagram of the inspection setting device.

FIG. 1 is a schematic diagram illustrating a configuration of an inspection setting device 1 according to an embodiment of the invention, and FIG. 2 is a block diagram of the inspection setting device 1. The inspection setting device 1 illustrated in FIGS. 1 and 2 is a device for setting an image inspection device 100 including a first camera 101 and a second camera 102, for example. In the present example, an example in which the image inspection device 100 includes two cameras 101 and 102 will be described, but the image inspection device 100 may include one camera or three or more cameras.

(Configuration of Image Inspection Device)

Before describing the inspection setting device 1, the image inspection device 100 will be described. As illustrated in FIG. 2, the image inspection device 100 includes the first camera 101 and the second camera 102, and a part of a controller 10, that is, an inspection unit 20, and is a device that inspects a workpiece (also referred to as an inspection target) captured by the first camera 101 or the second camera 102. The inspection unit 20 may be built in the first camera 101. In this case, the first camera 101 can be configured by a smart camera equipped with an image inspection function for inspecting the generated inspection target image in addition to an image generation function for generating the inspection target image. The same applies to the second camera 102.

The first camera 101 and the second camera 102 are installed, for example, on a line or the like on which a plurality of workpieces are sequentially conveyed. The first camera 101 and the second camera 102 may be installed on a single line and capture images of different portions of the same workpiece, or may be installed on different lines and capture images of different workpieces.

The first camera 101 includes an imaging unit 101a and an illumination unit 101b. The imaging unit 101a includes, for example, an image sensor including a charge coupled device (CCD), a complementary metal oxide semiconductor (CMOS), or the like, but may be any image sensor capable of capturing a workpiece. The illumination unit 101b is a portion that illuminates the workpiece at the time of capturing an image by the imaging unit 101a, and includes, for example, a light emitting body such as a light emitting diode. In addition, as illustrated in FIG. 1, the first camera 101 is provided with an optical system 101d including a lens on which light reflected from a workpiece enters.

The imaging unit 101a and the illumination unit 101b are controlled by a camera-side control unit 101c built in the first camera 101. For example, when a trigger signal is input from the outside, the camera-side control unit 101c controls the imaging unit 101a and the illumination unit 101b according to preset capturing setting of the camera, the illumination unit 101b illuminates the workpiece at a predetermined timing, and the imaging unit 101a captures the illuminated workpiece at a predetermined exposure time. The light amount of the illumination unit 101b, the gain of the imaging unit 101a, and the like are defined by capturing settings. The capturing setting is set by the inspection setting device 1. Note that the camera-side control unit 101c may be built in a device other than the first camera 101, for example, the controller 10. In addition, the illumination unit 101b may be separate from the first camera 101, or may be configured to illuminate the workpiece from a place different from the imaging unit 101a. In this case, the control of the illumination unit 101b can be performed by the controller 10.

The image captured by the first camera 101 is an inspection target image and is output to the inspection unit 20 of the controller 10. When the inspection unit 20 is built in the first camera 101, the inspection target image is output to the inspection unit 20 in the first camera 101.

The second camera 102 is configured similarly to the first camera 101. That is, the second camera 102 includes an imaging unit 102a, an illumination unit 102b, a camera-side control unit 102c, and an optical system 102d. The illumination unit 102b may be provided separately from the second camera 102.

After executing the positioning processing of the inspection region with respect to the inspection target image, the inspection unit 20 executes inspection processing with the inspection content set in advance with respect to the positioned inspection region, and executes the output processing of outputting the inspection result to the outside. In the positioning processing, the positioning setting set by the inspection setting device 1 is used. For example, when only a part of the workpiece is to be inspected, information for specifying the relative position and size of the inspection target region in the workpiece is included in the positioning setting. The positioning setting also includes processing of extracting an inspection target region, processing of rotating the inspection target region so that the inspection target region has a desired posture and enlarging or reducing the inspection target region so that the inspection target region has a desired size, and the like.

In the inspection processing, the inspection setting set by the inspection setting device 1 is used. The inspection setting includes inspection contents for the positioned inspection region. As a specific example, inspection contents such as the presence or absence of a component assembled to a workpiece, the presence or absence of a flaw, whether a dimension is within a reference dimension, and the presence or absence of printing are included.

In the output processing, the output setting set by the inspection setting device 1 is used. The output setting includes settings related to the output of the inspection result, such as data to be output (whether to output an inspection signal, a measurement value, and/or an inspection target image, and the like), an output destination of the inspection result, and an output timing.

(Configuration of Inspection Setting Device)

The inspection setting device 1 includes a controller 10, a display unit and an operation unit 40. The controller 10 includes a screen generation unit 11 that generates a display screen for setting, an input unit 12 that receives various user inputs, a control unit 13, and an inspection unit 20. When the inspection unit 20 is built in the first camera 101 or the second camera 102, the inspection unit 20 may not be provided in the controller 10. Even when the inspection unit 20 is built in the first camera 101 or the second camera 102, the inspection unit 20 may be provided in the controller 10.

The screen generation unit 11, the input unit 12, the control unit 13, and the inspection unit 20 may be configured by hardware, or may be configured by a combination of hardware and software. For example, a central processing unit (CPU) is built in the controller 10. The CPU is connected to a ROM, a RAM, and the like, processes a given signal or data, performs various calculations, and outputs a calculation result. The screen generation unit 11, the input unit 12, the control unit 13, and the inspection unit 20 may be constituted by a CPU, a ROM, a RAM, and the like capable of executing such operations. In addition, the screen generation unit 11, the input unit 12, the control unit 13, and the inspection unit 20 may be each configured by an independent arithmetic processing device.

The display unit 30 includes, for example, a liquid crystal display device, an organic EL display device, or the like, is connected to the controller 10, and is controlled by the controller 10. The display unit 30 displays, for example, a display image generated by the screen generation unit 11 of the controller 10, an inspection target image generated by the first camera 101 and the second camera 102, an inspection result, and the like.

The operation unit 40 includes an operation device or the like for the user to perform various input operations, and is connected to the controller 10. When the operation unit 40 is operated, the operation content is detected by the input unit 12 of the controller 10. The operation unit 40 includes, for example, a keyboard 40a, a mouse 40b, a touch panel 40c, and the like. The touch panel 40c is configured to be capable of detecting a touch operation by the user. The touch panel 40c and the display unit 30 may be integrated, and in this case, for example, the user interface displayed on the display unit 30 may be directly operated by the touch panel 40c.

The inspection setting device 1 may include a personal computer (hereinafter, referred to as PC) 35 illustrated in FIG. 1. When the PC 35 is included, the display unit 30 and the operation unit 40 may be connected to a main body portion of the PC 35. In this case, the display unit 30 is controlled via the main body portion of the PC 35, and the operation state of the operation unit 40 is acquired by the controller 10 via the main body portion of the PC 35.

When the PC 35 is included, only a part or all of the screen generation unit 11, the input unit 12, the control unit 13, and the storage unit 14 of the controller 10 may be executable by the PC 35. That is, since the screen generation unit 11, the input unit 12, and the control unit 13 are parts that can be configured by a CPU, a ROM, a RAM, and the like built in the PC 35, even if the screen generation unit, the input unit, and the control unit are provided in a device other than the controller 10, the screen generation unit, the input unit, and the control unit can exhibit functions similar to those in the case of being provided in the controller 10. In addition, since the storage unit 14 is a portion including, for example, a solid state drive, a hard disk drive, or the like, even if the storage unit 14 is provided in the PC 35, it is possible to store various kinds of data as in the case where the storage unit is provided in the controller 10. Further, the storage unit 14 may include an external storage device connected to the controller 10 or the PC 35 via a network.

Figure 3A:
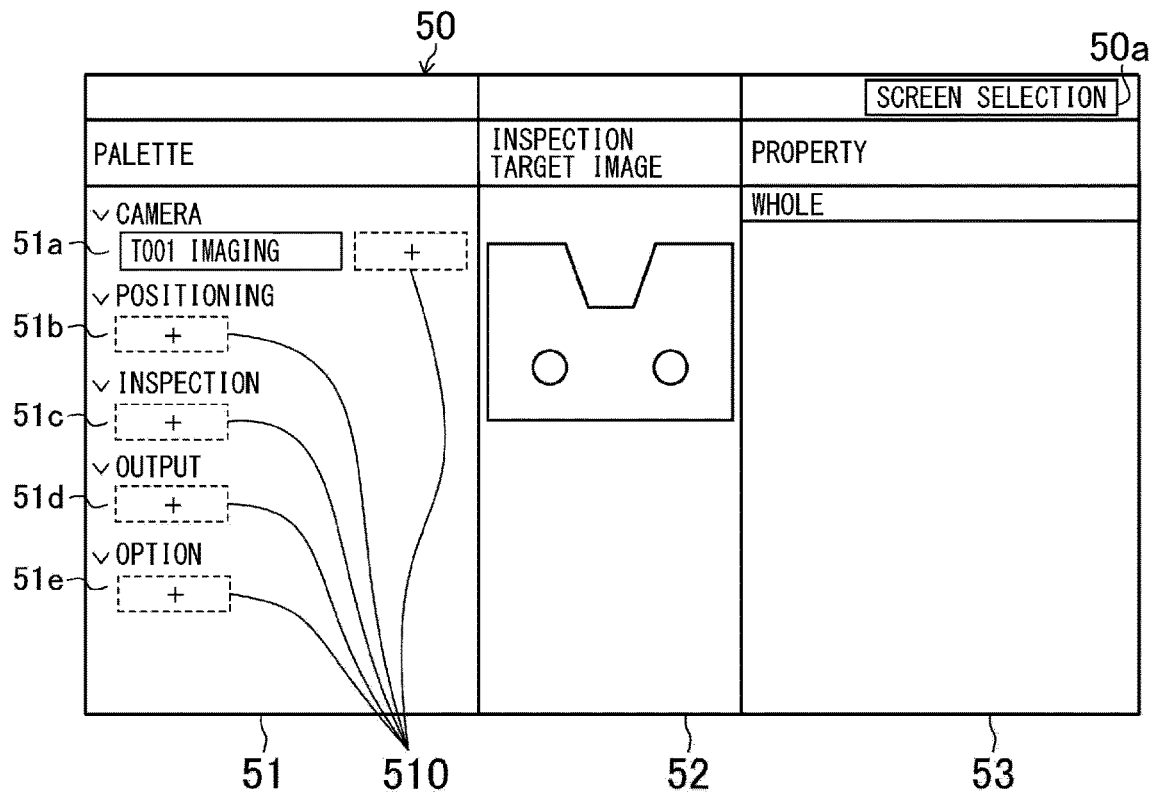
FIG. 3A is a diagram illustrating an example of an initial state of a step layout screen.
Figure 3B:
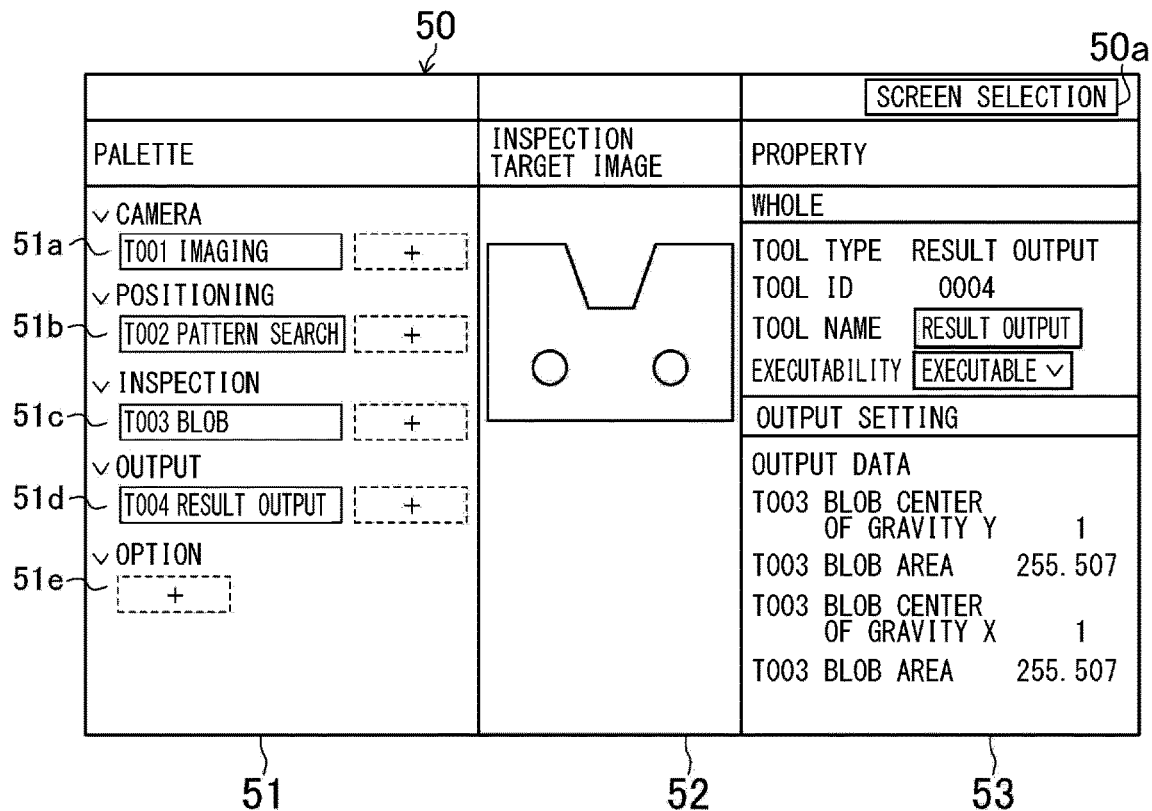
FIG. 3B is a diagram illustrating an example of the step layout screen after tool addition.
Figure 4:
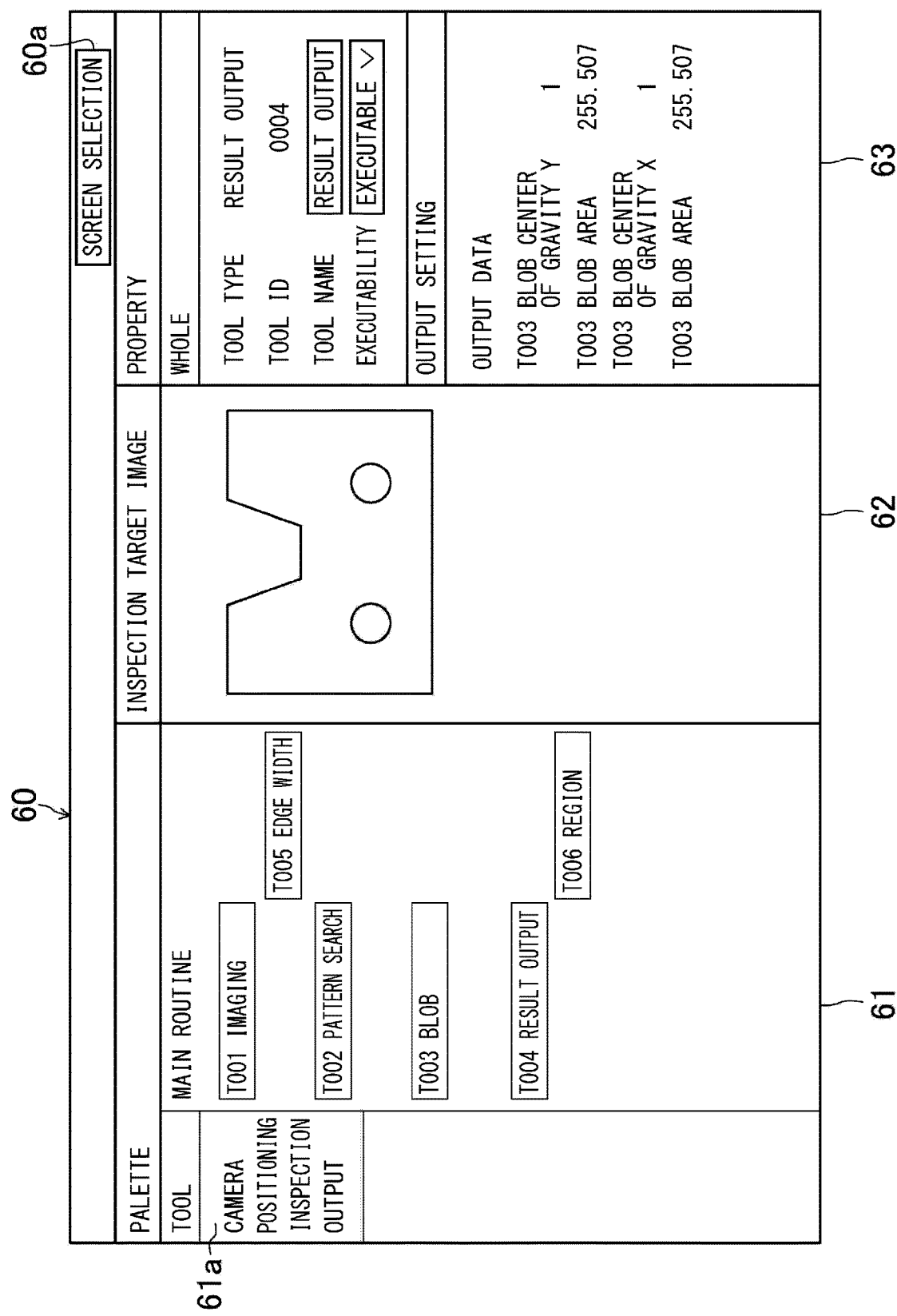
FIG. 4 is a diagram illustrating an example of a free layout screen.

The screen generation unit 11 is configured to be capable of generating a step layout screen 50 illustrated in FIGS. 3A and 3B and a free layout screen 60 illustrated in FIG. 4 as display screens to be displayed on a display unit. The step layout screen 50 includes a palette region 51, an image region 52 that is different from the palette region 51 and displays an inspection target image, and a property region 53. When an inspection target image captured by the first camera 101 or the second camera 102 is input to the controller 10, the inspection target image is laid out so as to be displayed in the image region 52 of the step layout screen 50 generated by the screen generation unit 11.

The palette region 51 of the step layout screen 50 is an area for arranging a plurality of tools, and the tools are automatically categorized. The tools that can be arranged in the palette region 51 include an imaging setting tool related to the capturing setting of the cameras 101 and 102, a positioning setting tool related to the positioning setting for positioning the inspection region with respect to the inspection target image captured by the cameras 101 and 102, an inspection setting tool related to the inspection setting for setting the inspection content with respect to the positioned inspection region, an output tool related to the output setting for performing the setting related to the output of the inspection result, and the like.

In the palette region 51 of the step layout screen 50, an initial category is defined, and this initial category is defined in advance on the inspection setting device 1 side before being defined by the user. Since four tools of an imaging setting tool, a positioning setting tool, an inspection setting tool, and an output tool are required in the image inspection, there are "camera" in which the imaging setting tool is classified, "positioning" in which the positioning setting tool is classified, "inspection" in which the inspection setting tool is classified, and "output" in which the output tool is classified, as initial categories.

Since the imaging processing by the cameras 101 and 102 is first executed in the image inspection, the imaging setting tool can be arranged on the most upstream side. Therefore, in the palette region 51, a camera area 51a, which is an area for arranging the imaging setting tool, is displayed on the most upstream side. Further, since the positioning processing of the inspection region is executed after the imaging processing, the positioning setting tool can be arranged next to the imaging setting tool. Therefore, in the palette region 51, a positioning area 51b, which is an area for arranging the positioning setting tool, is displayed on the downstream side of the camera area 51a. In addition, since the inspection for the inspection region is executed after the positioning processing, the inspection setting tool can be arranged next to the positioning setting tool. Therefore, in the palette region 51, an inspection setting area 51c, which is an area for arranging the inspection setting tool, is displayed on the downstream side of the positioning area 51b. In addition, since the output processing of the inspection result is executed after the inspection processing, the output tool can be arranged on the most downstream side. Therefore, in the palette region 51, an output area 51d, which is an area for arranging the output tool, is displayed on the most downstream side.

In the example illustrated in FIGS. 3A and 3B, since the flow of the inspection is set such that the most upstream of the image inspection is located upward and the most downstream is located downward, the camera area 51a is arranged at the top and the output area 51d is arranged at the bottom. Note that an optional tool may be settable, and in this example, an optional area 51e in which an optional tool can be set is arranged below the output area 51d.

On the step layout screen 50, each category is displayed in an initial state in the order of camera, positioning, inspection, and output on the palette region 51, and the user can select a desired tool from a tool group belonging to each category via a tool selection button 510 provided in each category. In the example illustrated in FIGS. 3A and 3B, in the initial state, only a tool belonging to the camera category is added in the initial state, and specifically, one "T001 imaging tool" is arranged only in the camera area 51a. In the palette region 51, no tool may be arranged in the initial state.

The tool group belonging to the camera category includes, for example, a tool related to image correction in addition to the imaging setting tool. The tool group belonging to the positioning category includes, for example, tools related to pattern search, edge detection, and blob processing. The tool group belonging to the inspection category includes, for example, tools related to presence/absence inspection, flaw inspection, dimension measurement, blob analysis (blob count, and the like). The tool group belonging to the output category includes, for example, tools related to result output and image output.

As described above, in the palette region 51 of the step layout screen 50, the categories are displayed in the order of the camera, the positioning, the inspection, and the output in the initial state. Therefore, even when the programming skill of the user is low, it is possible to guide the setting of the desired image inspection only by selecting a necessary tool in each category according to the displayed order.

The user can arrange the tool in the palette region 51 of the step layout screen 50 by operating the operation unit 40. The operation of the operation unit 40 by the user is detected by the input unit 12 of the controller 10. For example, when the user performs an operation of selecting and arranging the "T001 imaging" tool in the camera area 51a of the palette region 51, the operation is received by the input unit 12 as a user input for arranging the tool. When the input unit 12 receives a user input for arranging a tool, the control unit 13 recognizes and stores that the "T001 imaging" tool is arranged in the camera area 51a of the palette region 51. On the other hand, the screen generation unit 11 updates the step layout screen 50 to a display screen on which the "T001 imaging" tool is arranged in the camera area 51a of the palette region 51 and displays the display screen on the display unit 30.

Similarly, when the user performs an operation of arranging the "T002 pattern search" tool in the positioning area 51b of the palette region 51, the control unit 13 recognizes and stores that the "T002 pattern search" tool is arranged in the positioning area 51b of the palette region 51, and the screen generation unit 11 updates the display screen to a display screen in which the "T002 pattern search" tool is arranged in the positioning area 51b of the palette region 51. When the user performs an operation of arranging the "T003 blob" tool in the inspection setting area 51c of the palette region 51, the control unit 13 recognizes and stores that the "T003 blob" tool is arranged in the inspection setting area 51c of the palette region 51, and the screen generation unit 11 updates the display screen to a display screen in which the "T003 blob" tool is arranged in the inspection setting area 51c of the palette region 51. In addition, when the user performs an operation of arranging the "T004 result output" tool in the output area 51d of the palette region 51, the control unit 13 recognizes and stores that the "T004 result output" tool is arranged in the output area 51d of the palette region 51, and the screen generation unit 11 updates the display screen to a display screen in which the "T004 result output" tool is arranged in the output area 51d of the palette region 51.

When the tool is arranged in the palette region 51 of the step layout screen 50, a tool and a tool cannot be separated from each other because the tools are arranged in a packed state in order from the added tool. In addition, the order of the tools can be sorted, but the programming intention cannot be displayed at the position of the tool. That is, although the tools arranged in the palette region 51 can be listed, the degree of freedom of the layout position of the tools is limited, and thus, it is suitable for image inspection with low complexity and simple image inspection with few control elements.

In the property region 53 of the step layout screen 50, parameter setting can be performed as detailed setting of each tool. The parameter setting can be performed via the input unit 12.

In addition, when the user operates the operation unit 40 and performs parameter setting after arranging the tool in the palette region 51, the setting of the parameter of the tool is received via the input unit 12, and the input parameter is reflected. Parameters can be set for each tool.

The step layout screen 50 is configured such that a tool having a program element cannot be set. Specifically, the input unit 12 disables setting input of a tool having a program element in a state where the step layout screen 50 is displayed on the display unit 30. The tool in which the setting input is disabled on the step layout screen 50 is, for example, conditional branching, repetition, routine, routine schedule, event issuance, or the like. This is because, on the step layout screen 50, processing without a control element can be expressed in an easy-to-understand manner, but it is difficult to express when tools of respective categories such as positioning, inspection, and output are mixed in conditional branches.

The free layout screen 60 illustrated in FIG. 4 includes a palette region 61, an image region 62 that is different from the palette region 61 and displays an inspection target image, and a property region 63. In the image region 62, an inspection target image similar to the image region 52 of the step layout screen 50 is displayed. Further, in the property region 63 of the free layout screen 60, parameter setting is possible as detailed setting of each tool. The parameter setting can be performed via the input unit 12. As an example of the procedure, the user operates the operation unit 40 to select a tool for parameter setting from among a plurality of tools arranged in the palette region 61. A tool selection operation is received by the input unit 12. When parameter setting of the selected tool is performed, the user operates the operation unit 40. This operation is also received by the input unit 12, and the input parameter is reflected. In the property region 63, for example, input of a tool name, setting of executability, selection of output data, and the like can be performed. In addition, the property region 53 may be provided as necessary, and may be omitted.

The palette region 61 of the free layout screen 60 is a region for arranging a plurality of tools including the above-described imaging setting tool, positioning setting tool, inspection setting tool, and output tool. A difference from the palette region 51 of the step layout screen 50 is that the degree of freedom of the layout position of the tool is not limited as long as it is in the palette region 61, and thus, it is possible to arrange a plurality of tools at free positions regardless of the program state, and for example, it is easy to perform categorization or the like according to the inspection portion. Therefore, the free layout screen 60 is suitable for a user having a high programming skill and is also suitable for complex image processing.

A tool having a program element can be set in the palette region 61 of the free layout screen 60 so as to be capable of coping with complicated image processing. That is, the input unit 12 can receive an input of a tool that cannot be set on the step layout screen 50, for example, conditional branching, repetition, routine, routine schedule, event issuance, and the like. Note that there is no need to provide a difference in tools that can be set between the step layout screen 50 and the free layout screen 60.

A tool selection area 61a is provided in the palette region 61 of the free layout screen 60. In the tool selection area 61a, each of an imaging setting tool, a positioning setting tool, an inspection setting tool, and an output tool can be categorized and displayed, and the user can select a desired tool from the tool selection area 61a.

The user can arrange the tool at an arbitrary position on the palette region 61 of the free layout screen 60 by operating the operation unit 40. That is, for example, when the user selects the "T001 imaging" tool and then performs an operation of arranging the tool in the palette region 61, the input unit 12 receives the tool as a user input for arranging the tool. Examples of the operation of arranging the tool in the palette region 61 include a click operation of the mouse 40b, a touch operation of the touch panel 40c, and the like, and more specifically, there is a drag and drop operation of dragging the tool in a selected state and dropping the tool at an arbitrary position in the palette region 61. By repeating such an operation, the plurality of tools can be easily arranged at arbitrary positions in the palette region 61. The position of the tool disposed in the palette region 61 can also be corrected. It is also possible to delete the tool arranged in the palette region 61.

When the input unit 12 receives a user input for arranging a tool, the control unit 13 recognizes and stores that the "T001 imaging" tool is arranged at a position (designated position) designated by the user in the palette region 61. Unlike the step layout screen 50, the "T001 imaging" tool can be arranged anywhere in the palette region 61, so that fine adjustment of the position of the tool is also possible. The screen generation unit 11 updates the free layout screen 60 to a display screen on which the "T001 imaging" tool is arranged at a designated position in the palette region 61, and displays the display screen on the display unit 30.

In the example illustrated in FIG. 4, in addition to the "T002 pattern search" tool, the "T003 blob" tool, and the "T004 result output" tool, a "T005 edge width" tool, a "T006 region" tool, and the like are also arranged in the palette region 61.

Figure 5:
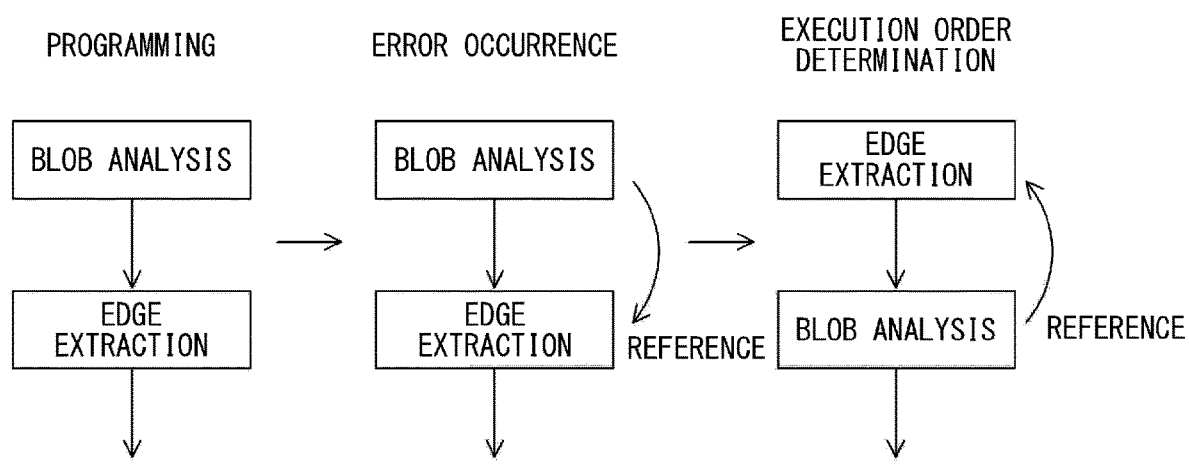
FIG. 5 is a diagram for explaining a programming example of a tool having a reference relationship.

As illustrated in FIG. 5, it is conceivable that programming is performed such that a certain user sequentially executes the blob analysis processing and the edge extraction processing without considering the execution order at the time of execution of the inspection. At the time of inspection execution, since the blob analysis processing needs to refer to the result of the edge extraction processing, an error occurs. As described above, since two of the "data reference" and the "processing order" need to be considered, programming in consideration of the execution order at the time of inspection execution has a high degree of difficulty.

On the other hand, since the control unit 13 illustrated in FIG. 2 analyzes the reference relationship among the plurality of tools arranged on the palette region 61 of the free layout screen 60 and determines the execution order at the time of execution of the inspection of each tool, the execution order is automatically changed so that the blob analysis is executed next to the edge extraction as illustrated on the right side of FIG. 5. As a result, the user can arrange the tool at an arbitrary position on the palette region 61 without considering the "processing order" in consideration of only the "data reference", so that programming can be simply performed.

Specifically, the control unit 13 refers to the identification information assigned to the plurality of tools arranged on the palette region 61 of the free layout screen 60, analyzes the dependency based on the processing content of each identification information, and executes a sorting algorithm, thereby determining the execution order of each tool at the time of execution of the inspection. As the sorting algorithm, it is preferable to use topological sorting, but the sorting algorithm is not limited to topological sorting. Note that the dependency may include a specific order in which the positioning setting tool is executed after the imaging setting tool, the inspection setting tool is executed after the positioning setting tool, and the output tool is executed after the inspection setting tool. In this case, the control unit 13 refers to a category of the plurality of tools arranged on the palette region 61 of the free layout screen that is, which one of the imaging setting tool, the positioning setting tool, the inspection setting tool, and the output tool belongs to. Then, the control unit 13 determines the execution order at the time of execution of the inspection of each tool so as to maintain the order based on the category obtained by reference.

An example will be described with reference to FIGS. 6A and 6B. FIG. 6A of FIG. 6 show six tools, a "T001 imaging" tool, a "T002 pattern search" tool, a "T003 blob" tool, a "T004 result output" tool, a "T005 edge width" tool, and a "T006 region" tool, arranged on the palette region 61 of the free layout screen of FIG. 4. For example, the "T001 imaging" tool means that the number T001 is assigned as the identification information. T001 and the like are examples of the identification information, and the identification information may include, for example, a symbol or a character, or a combination of a symbol and a character.

Arrows between the tools in FIG. 6A indicate a reference relationship between the tools. Specifically, the "T002 pattern search" tool refers to the "T001 imaging" tool. The "T003 blob" tool refers to the "T002 pattern search" tool and the "T006 region" tool. The "T004 result output" tool refers to the "T003 blob" tool and the "T005 edge width" tool. The "T005 edge width" tool refers to the "T002 pattern search" tool and the "T006 region" tool. The "T006 region" tool refers to the "T002 pattern search" tool.

Figure 6B:
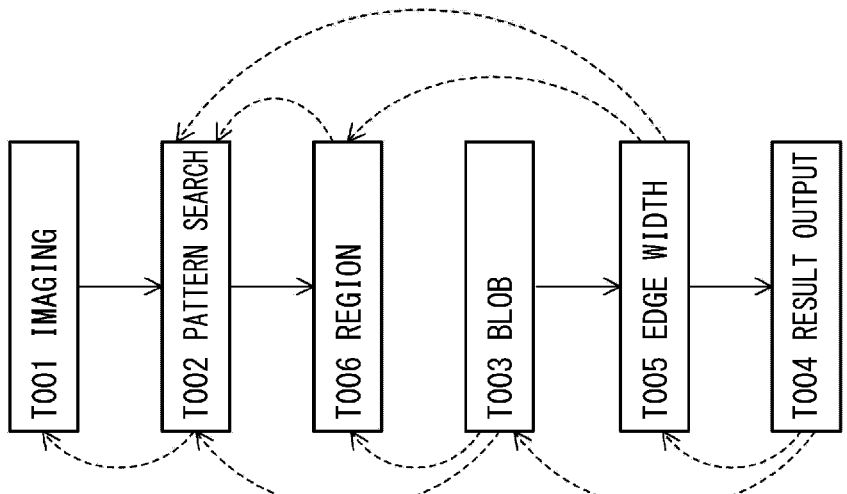
FIG. 6B is a diagram illustrating an execution order of the plurality of tools of FIG. 6A.
Figure 6A:
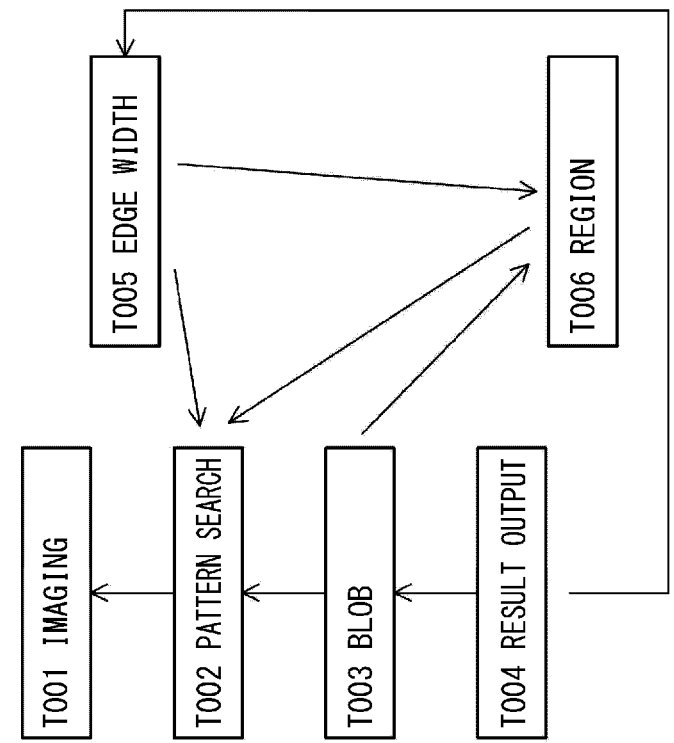
FIG. 6A is a diagram illustrating an example of a reference relationship of a plurality of tools arranged in a palette region of a free layout screen.

FIG. 6B of FIG. 6 shows the order of tools after topological sorting is performed on the plurality of tools illustrated in FIG. 6A. That is, a case is illustrated in which the execution order of the respective tools at the time of execution of the inspection is determined such that the reference relationship among the six tools is established by executing sorting such that each oriented side of the directed graph having no closed circuit is in the forward direction with respect to the five tools, and the tools are rearranged. The order in which the sorting is executed corresponds to the execution order of the respective tools and is represented by a solid arrow. A broken line extending from the side of each tool indicates a reference relationship similar to that in FIGS. 6A and 6B.

In the example illustrated in FIG. 6B, the "T001 imaging" tool, the "T002 pattern search" tool, the "T006 region" tool, the "T003 blob" tool, the "T005 edge width" tool, and the "T004 result output" tool are executed in this order. In a case where any tool may be executed first as in the "T003 blob" tool and the "T005 edge width" tool in this example, for example, the tool with a smaller number included in the identification information can be executed first.

Figure 7:
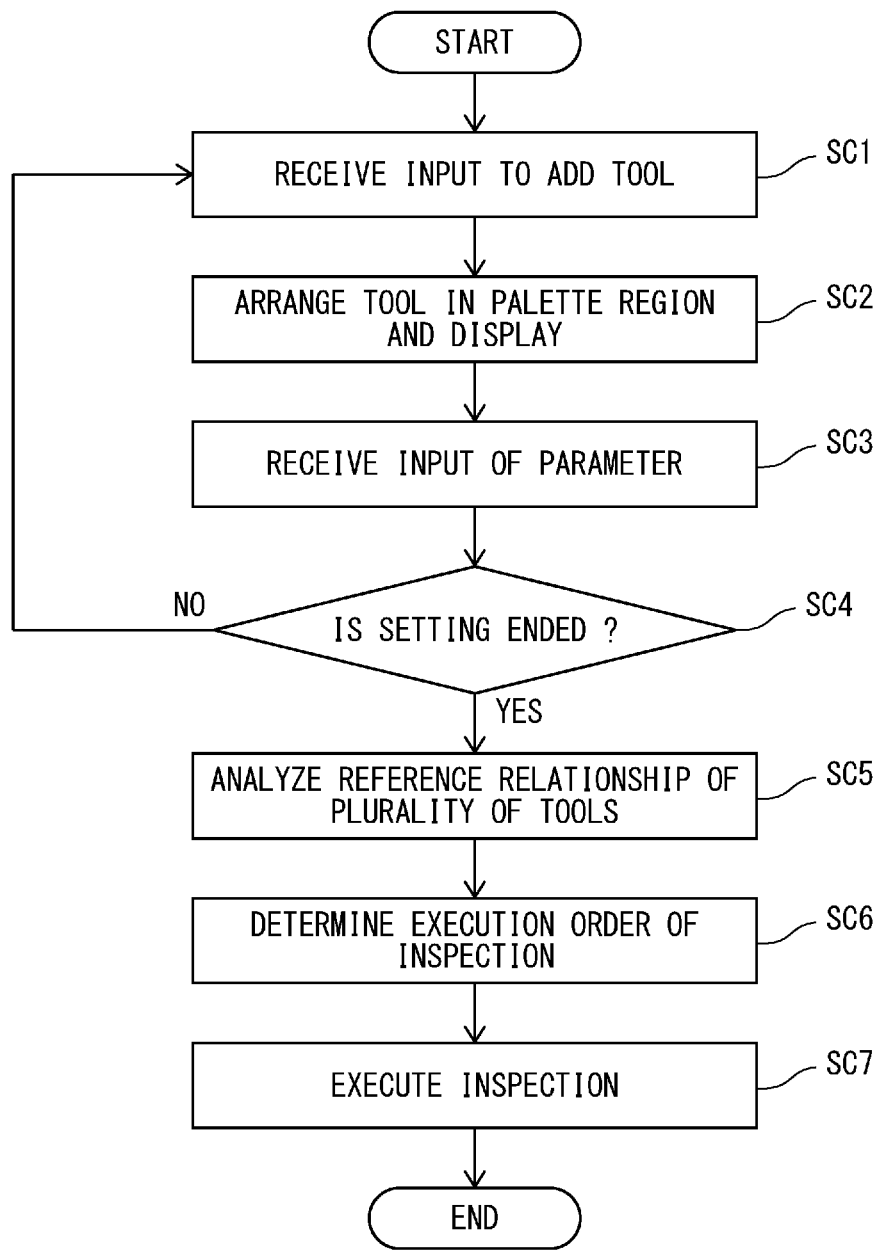
FIG. 7 is a flowchart illustrating an example of a flow of processing from addition of a tool to execution of inspection.

FIG. 7 is a flowchart illustrating a flow of processing from addition of a tool to execution of inspection, and the same applies to both the step layout screen 50 and the free layout screen 60. In step SC1 after the start, the input unit 12 receives an input for adding a tool from the user. In step SC2, the screen generation unit 11 displays the tool received in step SC1 in the palette regions 51 and 61. In step SC3, an input of a parameter to the added tool is received. Note that an initial parameter may be assigned to the added tool, and step SC3 may be skipped when there is no need to change from the initial parameter. In step SC4, in a case where there is another tool that needs to be added, the processing returns to step SC1, and similar processing is performed. In step SC4, when the inspection setting by the user is completed and the input unit 12 receives an instruction to execute the inspection, the process proceeds to step SC5. In step SC5, the control unit 13 analyzes the reference relationship among the plurality of added tools. In step SC6, the control unit 13 determines the execution order of the inspection based on the reference relationship analyzed in step SC5. In step SC7, the inspection unit 20 executes inspection based on the execution order determined in step SC6.

(Screen Selection/Screen Switching)

The input unit 12 is configured to be capable of receiving a selection operation by the user of the step layout screen 50 illustrated in FIGS. 3A and 3B and the free layout screen 60 illustrated in FIG. 4. As illustrated as a conceptual diagram in FIG. 8, it is assumed that three tools classified as imaging setting tools, three tools classified as positioning setting tools, and one tool classified as an inspection setting tool are arranged on the free layout screen 60 (output tools are not illustrated). When the free layout screen 60 is switched to the step layout screen 50, the three imaging setting tools are arranged at the top, the three positioning setting tools are arranged below the three imaging setting tools, and the inspection setting tool is arranged at the bottom so as to correspond to the execution order. At the time of this sorting, categories on the step layout screen 50 may be allocated in advance, or a categorizing list in which a rule indicating which category on the step layout screen 50 belongs to is described may be used.

Figure 9A:
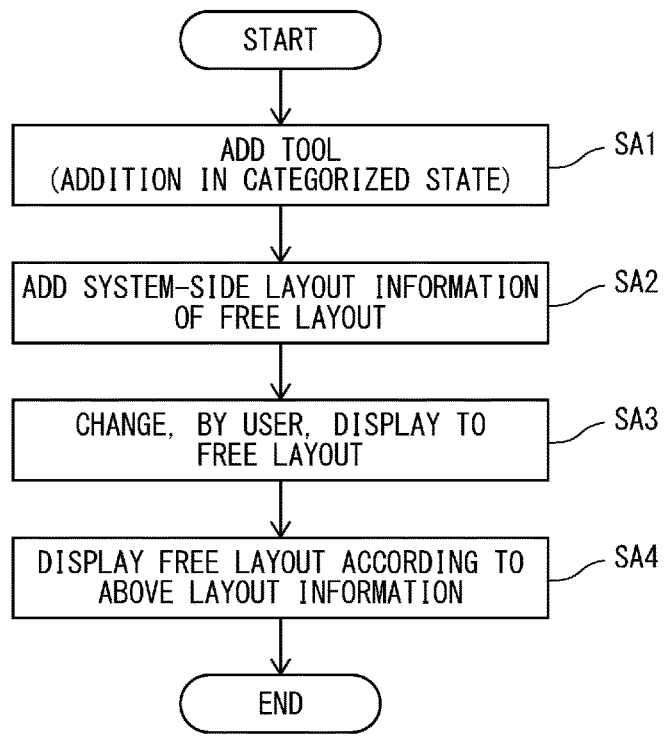
FIG. 9A is a flowchart illustrating an example of a switching procedure from a step layout screen to a free layout screen.

FIG. 9A of FIG. 9 illustrates a switching procedure from the step layout screen 50 to the free layout screen 60. In step SA1 after the start, a tool is added in a categorized state. In step SA2, the system side layout information of the free layout is added to each tool. The layout information is merely alignment. When the user performs a switching operation from the step layout screen 50 to the free layout screen 60 in step SA3, the free layout screen 60 is displayed in step SA4 in accordance with the layout information added in step SA2.

Figure 9B:
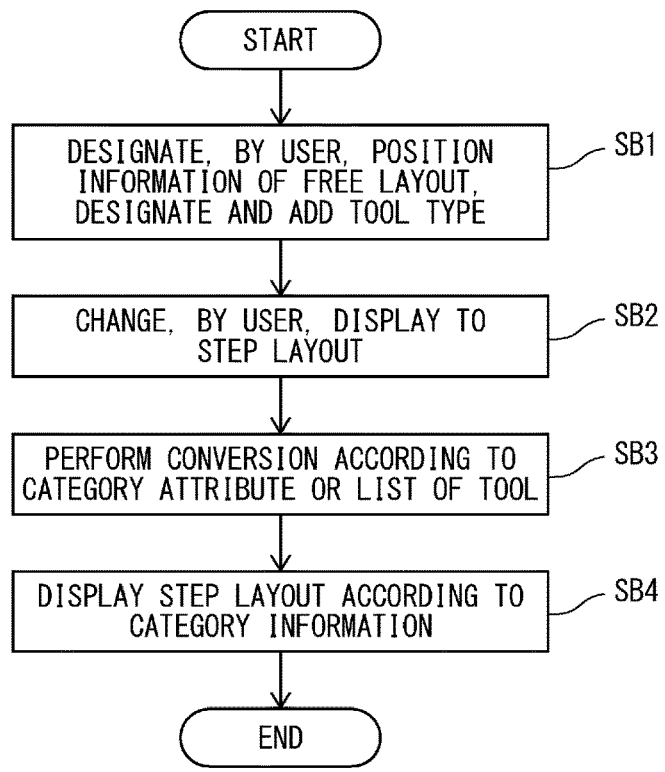
FIG. 9B is a flowchart illustrating an example of a switching procedure from the free layout screen to the step layout screen.

FIG. 9B of FIG. 9 shows a switching procedure from the free layout screen 60 to the step layout screen 50. In step SB1 after the start, the user designates the position information of the free layout. For example, a tool type can be designated and added. When the user performs the switching operation from the free layout screen 60 to the step layout screen 50 in step SB2, conversion is performed according to the category or the categorizing list of the tool in step SB3. In step SB4, the step layout screen 50 is displayed according to the category. Note that the conversion in step SB3 may be performed in advance.

As illustrated in FIGS. 3A and 3B, the step layout screen 50 is provided with a screen selection region 50a for switching from the step layout screen 50 to the free layout screen 60. In the screen selection region 50a, for example, a selection button, a switching button, a drop-down list, and the like are displayed. When the user operates the screen selection region 50a using the operation unit 40, the operation is received by the input unit 12 as a switching operation from the step layout screen 50 to the free layout screen 60, that is, a selection operation of the free layout screen 60. When detecting that the screen selection region 50a is operated, the screen generation unit 11 generates the free layout screen 60 and displays the screen on the display unit 30.

As illustrated in FIG. 4, the free layout screen 60 is provided with a screen selection region 60a for switching from the free layout screen 60 to the step layout screen 50. The screen selection region 60a is configured similarly to the screen selection region 50a of the step layout screen 50. When the user operates the screen selection region 60a using the operation unit 40, the operation is received by the input unit 12 as a switching operation from the free layout screen 60 to the step layout screen 50, that is, a selection operation of the step layout screen 50. When detecting that the screen selection region 60a is operated, the screen generation unit 11 generates a step layout screen 50 and displays the step layout screen on the display unit 30.

Specifically, assuming a case where a plurality of tools are arranged on the palette region 51 of the step layout screen 50 as illustrated in FIGS. 3A and 3B, when receiving the switching operation from the step layout screen 50 to the free layout screen 60 via the input unit 12, the screen generation unit 11 generates a display screen in which the plurality of tools arranged on the palette region 51 of the step layout screen 50 are arranged on the palette region 61 of the free layout screen 60 as illustrated in FIG. 4.

On the other hand, assuming a case where a plurality of tools are arranged on the palette region 61 of the free layout screen 60 as illustrated in FIG. 4, when receiving the switching operation from the free layout screen 60 to the step layout screen 50 via the input unit 12, the screen generation unit 11 generates a display screen in which the plurality of tools arranged on the free layout screen 60 are arranged in the area belonging to the corresponding category on the palette region 51 of the step layout screen 50 based on the category of each tool as illustrated in FIGS. 3A and 3B. For example, in FIG. 4, since the "T001 imaging" tool belongs to the category of the imaging setting tool, the "T001 imaging" tool is arranged in the camera area 51a on the palette region 51 of the step layout screen 50. Further, in FIG. 4, since the "T002 pattern search" tool belongs to the category of the positioning setting tool, the tool is arranged in the positioning area 51b on the palette region 51 of the step layout screen 50. Further, in FIG. 4, since the "T003 blob" tool belongs to the category of the inspection setting tool, the tool is arranged in the inspection setting area 51c on the palette region 51 of the step layout screen 50. Further, in FIG. 4, since the "T004 result output" tool belongs to the category of the output tool, the "T004 result output" tool is arranged in the output area 51d on the palette region 51 of the step layout screen 50.

When switching from the step layout screen 50 to the free layout screen 60 is performed after the input unit 12 receives the switching operation from the step layout screen 50 to the free layout screen 60, the screen generation unit 11 generates the free layout screen 60 while maintaining the display content displayed in the image region 52 of the step layout screen 50, and generates the free layout screen 60 having the palette region 61 having the display content different from the display content of the palette region 51 of the step layout screen 50.

On the other hand, when switching from the free layout screen 60 to the step layout screen 50 is performed after the input unit 12 receives the switching operation from the free layout screen 60 to the step layout screen 50, the screen generation unit 11 generates the step layout screen 50 while maintaining the display content displayed in the image region 62 of the free layout screen 60, and generates the step layout screen 50 including the palette region 51 having the display content different from the display content of the palette region 61 of the free layout screen 60.

As a result, when one of the free layout screen 60 and the step layout screen 50 is switched to the other, the display contents of the image region 52 of the step layout screen 50 and the image region 62 of the free layout screen 60 do not change, so that it is possible to prevent the user from having an impression that the user interface has greatly changed. Further, the position, size, and shape of the image region 52 of the step layout screen 50 and the image region 62 of the free layout screen 60 are not changed before and after the display screen is switched. Note that the position, size, and shape of the image region 52 of the step layout screen 50 and the image region 62 of the free layout screen 60 may be changed before and after the display screen is switched.

In a case where a tool that cannot be set on the step layout screen 50 is set on the free layout screen 60, when the free layout screen 60 is switched to the step layout screen 50, the tool that cannot be set may be automatically arranged in a region outside the palette region 51. As a result, even a tool not included in each category of the step layout screen 50 can be reflected on the step layout screen 50.

(Grouping Function)

Figure 23:
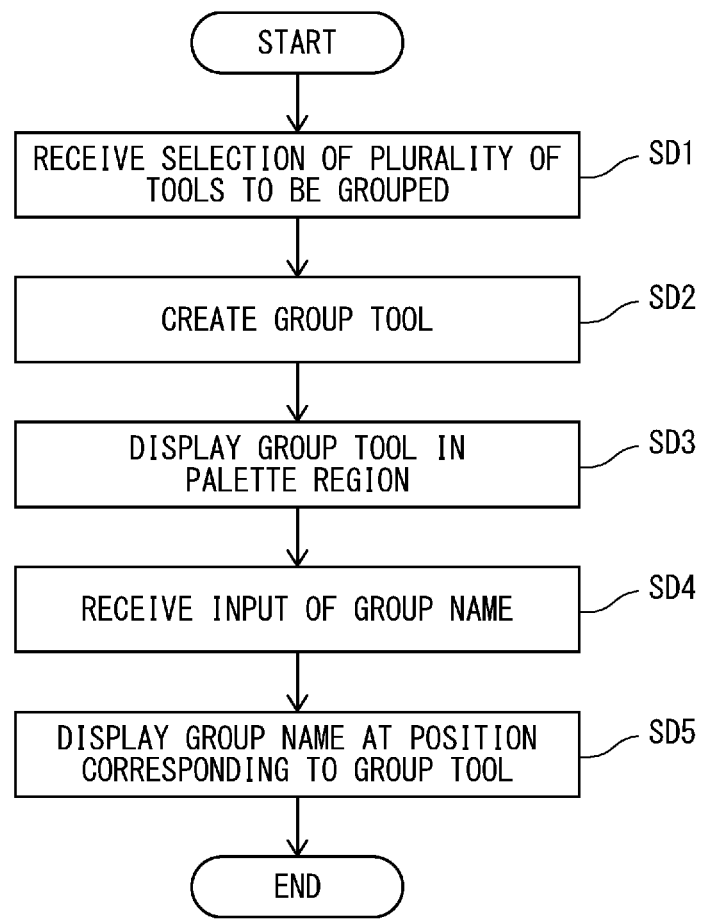
FIG. 23 is a flowchart illustrating a flow of processing when a plurality of tools are grouped.

The inspection setting device 1 has a grouping function of integrating a plurality of tools into one group to create a group tool. For example, in a case where a plurality of inspection parts are included in a workpiece, there is a case where it is desired to integrate processing for each inspection part, but there is a case where processing is divided when common processing common to the plurality of inspection parts is sandwiched in the middle due to the processing order. In such a case, the grouping function of this example can be used. The grouping function will be described along the flow of processing illustrated in the flowchart of FIG. 23.

Figure 10:
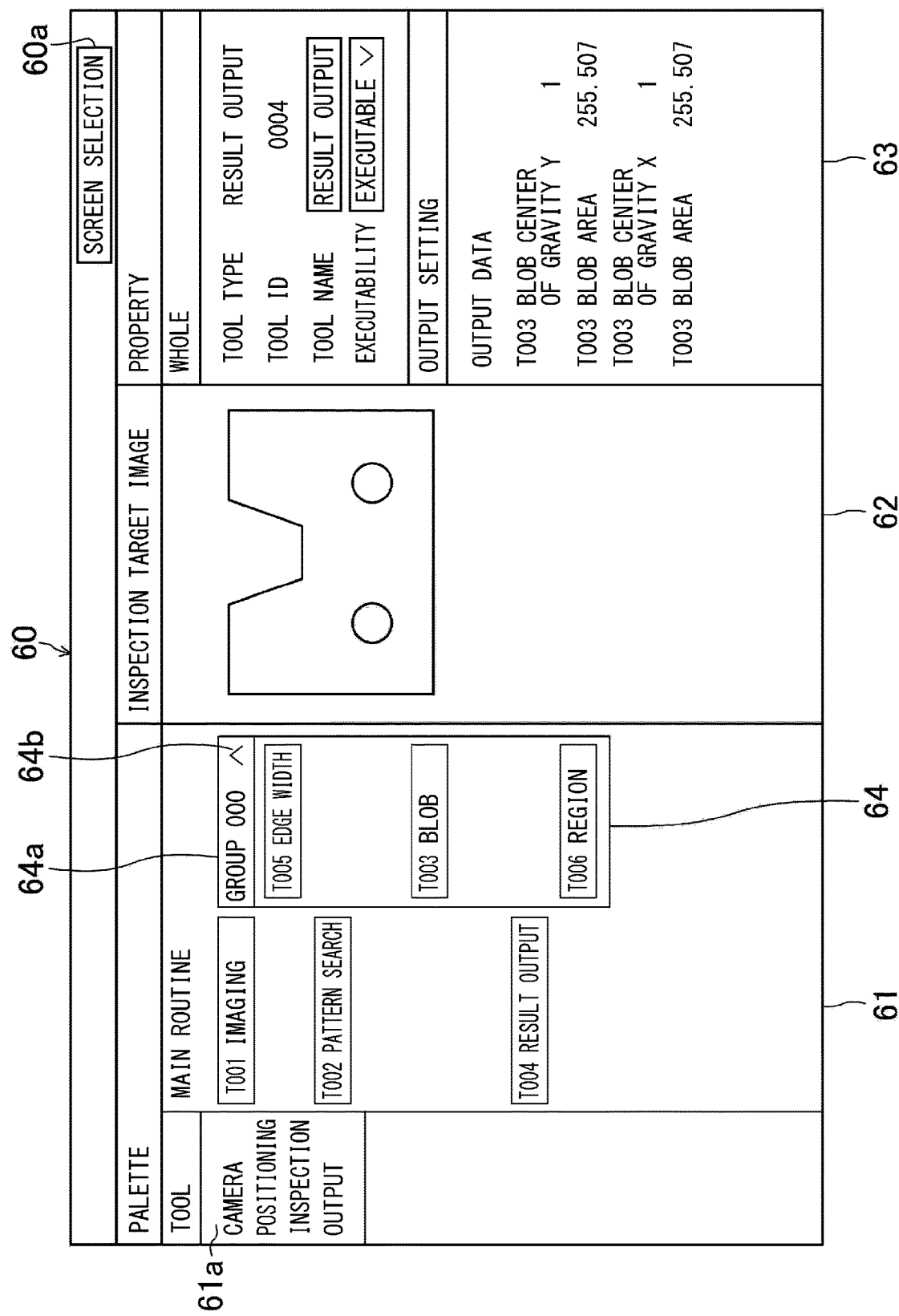
FIG. 10 is a diagram illustrating an example of a display screen in a case where a plurality of tools are grouped.

First, in step SD1 after the start, the input unit 12 receives selection of a plurality of tools that the user desires to group from among a plurality of tools arranged on the palette region. As illustrated in FIG. 10, the user operates the operation unit 40 to select a plurality of tools from among the plurality of tools arranged on the palette region 61 of the free layout screen 60. The user's operation is received by the input unit 12 as a user input for selecting a plurality of tools. FIG. 10 illustrates a case where the "T005 edge width" tool, the "T003 blob" tool, and the "T006 region" tool are selected.

Next, in step SD2, the control unit 13 integrates a plurality of tools whose selection has been received by the input unit 12 into one group, and creates an arbitrary group tool. At this time, a grouping operation from the user may be separately received. For example, a grouping execution button or the like is provided on the free layout screen 60, and when the input unit 12 receives an operation input of the grouping execution button, the control unit 13 creates a group.

The group tool created by the control unit 13 in step SD3 is displayed with the name "group 000" on the palette region 61 for convenience. The screen generation unit 11 displays a tool belonging to "group 000" and a tool not belonging to "group 000" in a distinguishable form on the palette region 61. Examples of the distinguishable form include a form in which a plurality of tools belonging to "group 000" are displayed in one window, a form in which a plurality of tools belonging to "group 000" are surrounded by a frame and displayed, and a form in which colors of a plurality of tools belonging to "group 000" are changed from colors of other tools and displayed. In FIG. 10, three tools belonging to "group 000" are integrated and displayed in one window 64.

While a plurality of grouped tools is displayed in the main body portion of the window 64, a group name display region 64a for displaying a group name is provided in the upper part of the window 64. In this example, the group name display region 64a is provided in the upper portion of the window 64, but the position where the group name display region 64a is provided is not limited to the upper portion. The group name displayed in the group name display region 64a can be changed. In a case where it is desired to change a group name or to newly input a group name, the user operates the operation unit 40 to select a group name display region, and inputs a desired character string using the keyboard 40a or the like. This operation is a user input for assigning a desired group name. In step SD4, the input unit 12 receives a user input for assigning a desired group name to the group created by the control unit 13. In step SD5, when the input unit 12 receives a user input for assigning a group name, the screen generation unit 11 generates a display screen in which the group name received by the input unit 12 is displayed at the corresponding position of the group tool in the palette region 61, that is, in the group name display region 64a.

Figure 11:
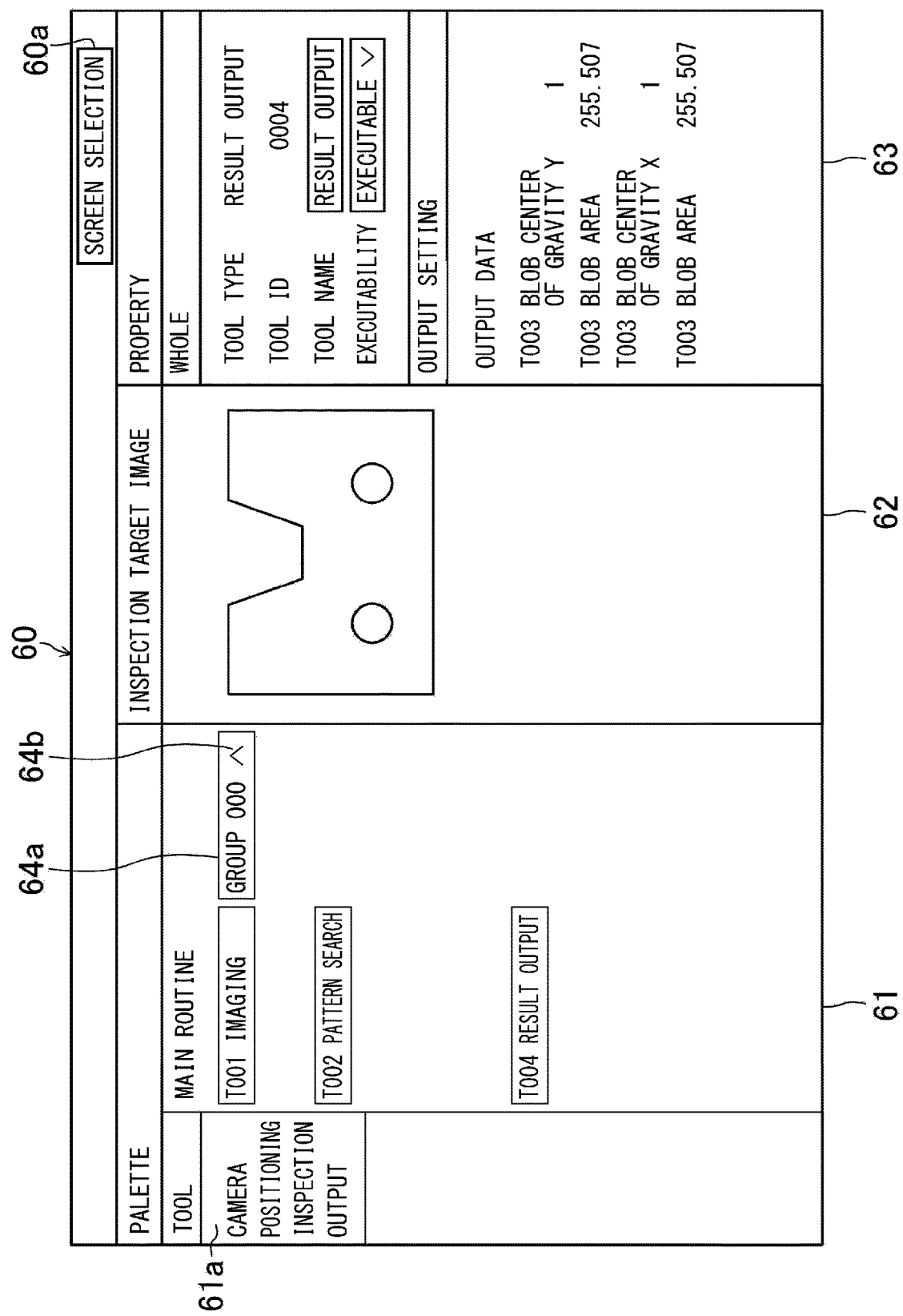
FIG. 11 is a diagram corresponding to FIG. 10 illustrating a state in which a main body portion of a group window is closed.

The window 64 is provided with a size change button 64b. When the size change button 64b is operated by the user in a state where the main body portion of the window 64 is displayed and this user input is received by the input unit 12, the screen generation unit 11 closes the main body portion of the window 64 and hides the plurality of grouped tools as illustrated in FIG. 11. At this time, the group name display region 64a and the size change button 64b remain displayed. When the size change button 64b is operated by the user in a state where the main body portion of the window 64 is closed and this user input is received by the input unit 12, the screen generation unit 11 displays the main body portion of the window 64 as illustrated in FIG. 10.

Figure 12:
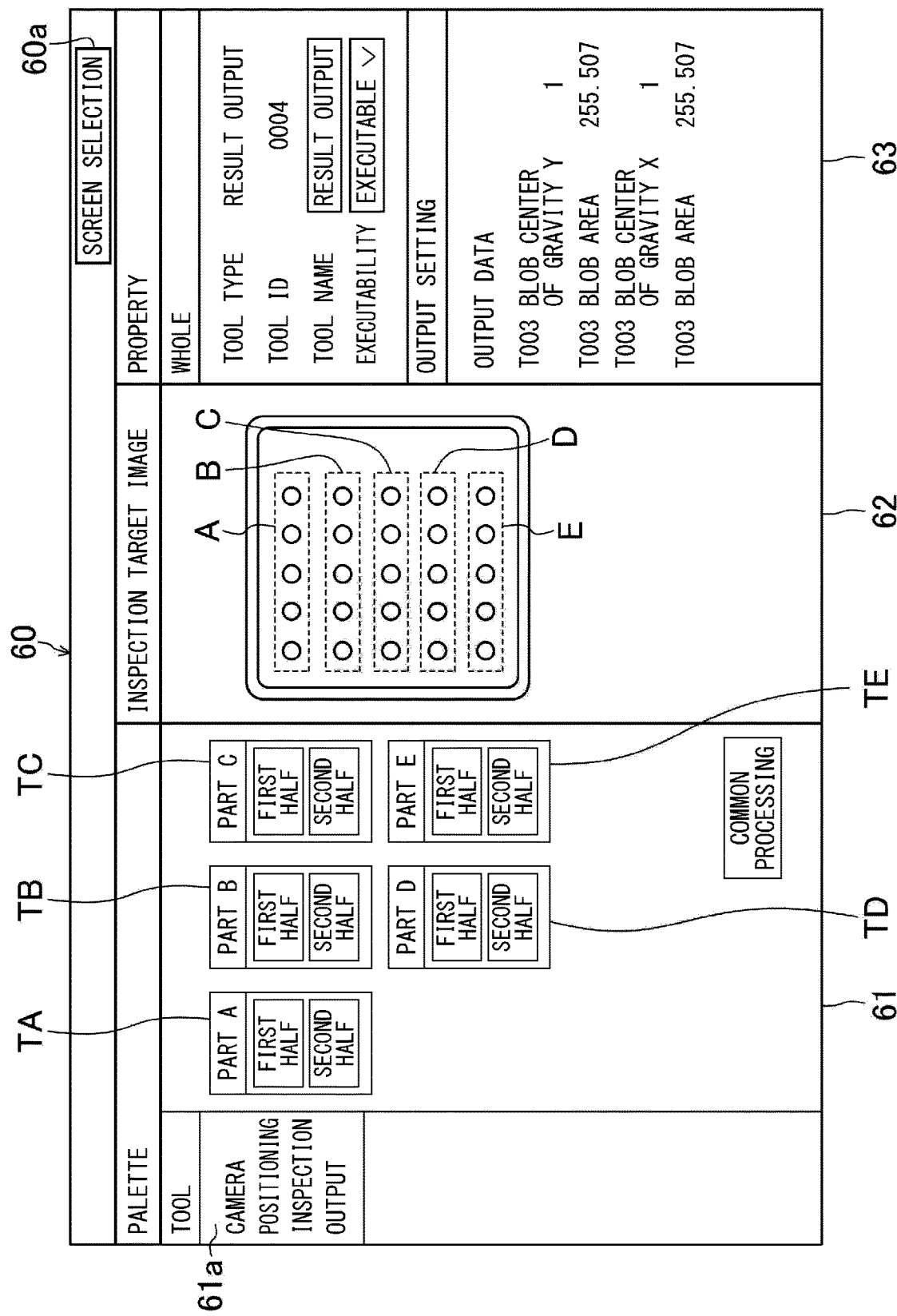
FIG. 12 is a free layout screen illustrating a state in which a plurality of inspection setting tools are arranged.

An example of grouping is specifically illustrated in FIG. 12. The example illustrated in FIG. 12 illustrates a case where there are five inspection parts of the workpiece from part A to part E displayed in the image region 62 of the free layout screen 60. Parts A to E are different from each other. In this manner, the screen generation unit 11 generates the display screen further including the image region 62 that displays the inspection target image in which at least part A as the first inspection region and part B as the second inspection region are indicated.

When each inspection part is inspected, there are first half processing and second half processing, and common processing is executed in the middle of the first half processing and the second half processing. When such common processing is included, the first half processing and the second half processing are divided in the case of the step layout screen 50, but the first half processing and the second half processing can be displayed as one group tool for each of parts A to E by using the grouping function.

For example, when the user selects a tool of the first half processing and a tool of the second half processing related to part A, the input unit 12 receives the selection operation, and the control unit 13 groups a plurality of tools related to part A as tools related to part A and sets the tools as a group tool TA. The same applies to the other parts B to E, and they are referred to as group tools TB, TC, TD, and TE, respectively.

Each part can also be referred to as a specific inspection region. In short, the input unit 12 is configured to be capable of receiving a user input for grouping tools related to a specific inspection region among a plurality of tools arranged on the palette region 61 in units of the specific inspection region. In addition, the screen generation unit 11 generates a display screen having the palette region 61 for displaying the group tools TA, TB, TC, TD, and TE in which tools related to a specific inspection region are grouped in units of inspection regions based on a user input for grouping in units of specific inspection regions. "Part A" and the like are group names and can be changed as described above.

For example, the group tool (first group tool) TA related to part A includes a positioning setting tool that positions part A as the first inspection region and an inspection setting tool that inspects the positioned part A. In addition, the group tool (second group tool) TB related to part B includes a positioning setting tool that positions part B as the second inspection region at a position different from the first inspection region, and an inspection setting tool that inspects the positioned part B. The same applies to parts C to E, and each of the group tools TC, TD, and TE includes a positioning setting tool and an inspection setting tool. As described above, the input unit 12 is configured to be capable of receiving an input for generating a first group tool by grouping a positioning setting tool that positions the first inspection region and an inspection setting tool that inspects the positioned first inspection region, and an input for generating a second group tool by grouping a positioning setting tool that positions a second inspection region at a position different from the first inspection region and an inspection setting tool that inspects the positioned second inspection region.

In addition, when the tools are grouped, inspection setting tools for inspecting different inspection regions can be grouped. For example, when the inspection setting tool that inspects part A and the inspection setting tool that inspects part B are common, the inspection setting tool that inspects part A and the inspection setting tool that inspects part B can be set as one group tool. That is, the input unit 12 is configured to be capable of receiving an input for grouping a first inspection setting tool that inspects part A selected via the input unit 12 among the plurality of tools arranged on the palette region 61 and a second inspection setting tool that inspects part B having common inspection processing with the first inspection setting tool. When the input unit 12 receives an input for grouping the first inspection setting tool and the second inspection setting tool, the control unit 13 integrates the first inspection setting tool and the second inspection setting tool into one group tool. In addition, for example, since data such as a preprocessing filter, model data, and an inspection region can be shared by a plurality of tools, the tools sharing such data can be integrated into the same group tool.

When the tools are grouped, the positioning setting tools can be grouped for each common tool. That is, the input unit 12 is configured to be capable of receiving an input for generating the first group tool by grouping a first positioning setting tool and the first inspection setting tool that refers to the first positioning setting tool among the plurality of tools arranged on the palette region. The input unit 12 is configured to be further capable of receiving an input for generating the second group tool by grouping a second positioning setting tool different from the first positioning setting tool and the second inspection setting tool that refers to the second positioning setting tool among a plurality of tools arranged on the palette region. When the positioning mark is shifted and displayed for each inspection target image, the parameter of the positioning setting tool changes following the shift of the positioning mark, so that it is necessary to change the parameter of the inspection setting tool that refers to the positioning setting tool. In this case, if the tools referring to the common positioning setting tool are grouped, the tool in which the parameter needs to be changed can be quickly specified, so that the work efficiency is improved.

When the first group tool is selected via the input unit 12, the screen generation unit 11 generates a display screen that displays the first inspection region in the image region 62 while distinguishing the first inspection region from the second inspection region. For example, when the group tool TA is selected by the user, part A is displayed in a form distinguishable from parts B to E in the image region 62. For example, the color of the frame surrounding part A is changed to the color of the frame surrounding parts B to E, or part A is colored and displayed in a color different from parts B to E. As a result, the user can easily determine which part of the group tool is currently selected.

In addition, when the first group tool is selected via the input unit 12, the screen generation unit 11 can generate a display screen that displays the first group tool distinguishable from the second group tool in the palette region 61. For example, when the group tool TA is selected by the user, the group tool TA is displayed in a form distinguishable from the group tools TB, TC, TD, and TE in the palette region 61. For example, the color of the frame surrounding the group tool TA is changed to the color of the frame surrounding each of the group tools TB, TC, TD, and TE and displayed, or the group tool TA is colored in a color different from the group tools TB, TC, TD, and TE and displayed. As a result, the user can easily determine which group tool is currently selected.

The input unit 12 is configured to be capable of receiving an input for grouping a plurality of subgroup tools into one group tool by integrating a plurality of subgroup tools into one group tool. For example, in FIG. 12, the first half processing is one group tool, and the group of the first half processing includes a plurality of tools. In addition, the second half processing is similarly one group tool including a plurality of tools. The group tool of the first half processing and the group tool of the second half processing can be referred to as a subgroup tool. The group tool TA or the like can be configured by integrating these subgroup tools.

In addition, the control unit 13 determines the execution order at the time of execution of the inspection of each tool so that a plurality of subgroup tools and an inspection processing tool arranged outside the group tool in which the subgroup tools are integrated form a series of processing. In the present example, the common processing corresponds to an inspection processing tool arranged outside the group tool TA on the palette region 61, and the control unit 13 determines the execution order at the time of execution of the inspection of each tool such that the common processing is performed between the group tool of the first half processing and the group tool of the second half processing.

(Batch Editing Function of a Plurality of Tools)

Figure 13:
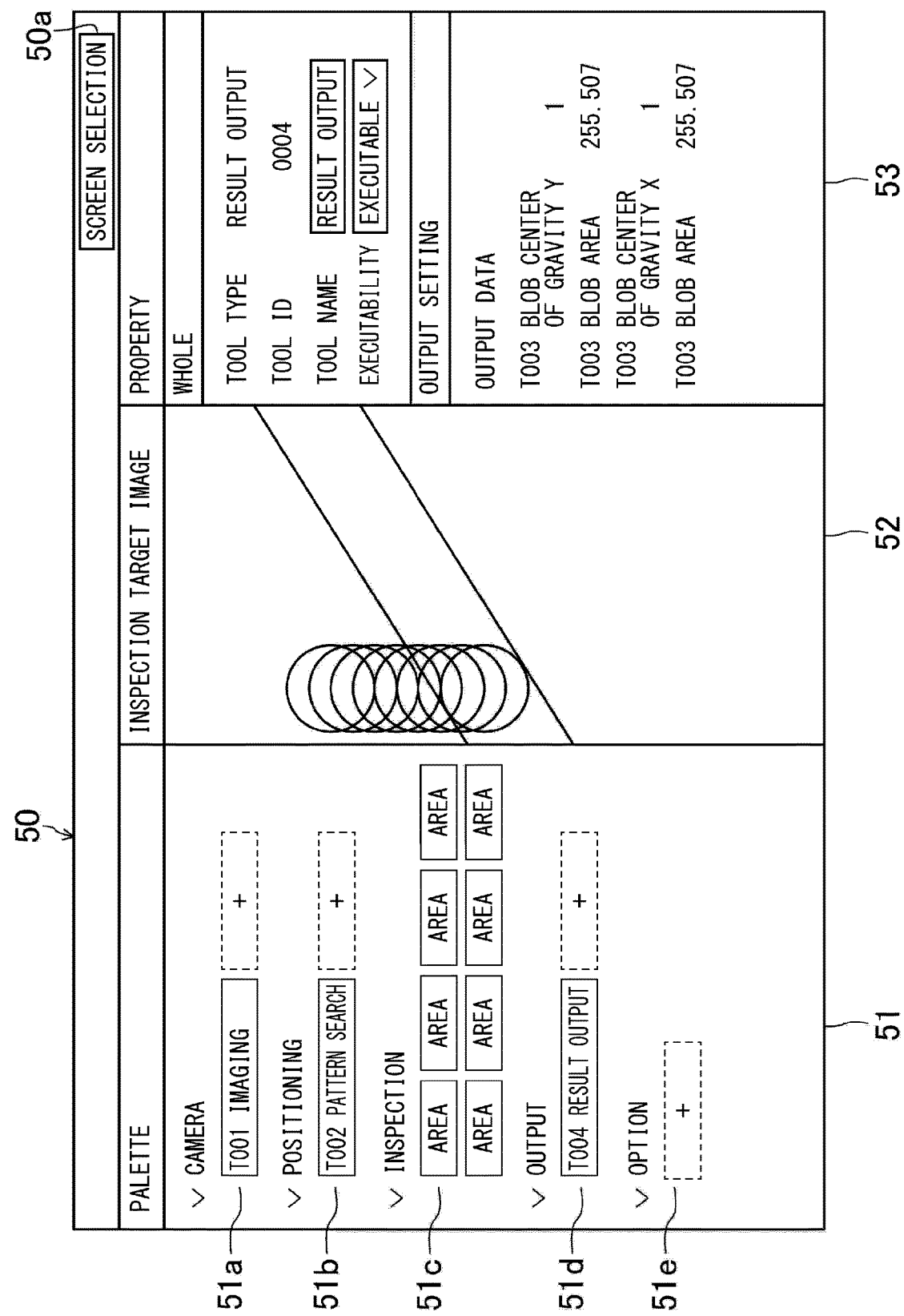
FIG. 13 is a step layout screen illustrating a state in which a plurality of inspection setting tools are shown in an image region.
Figure 14:
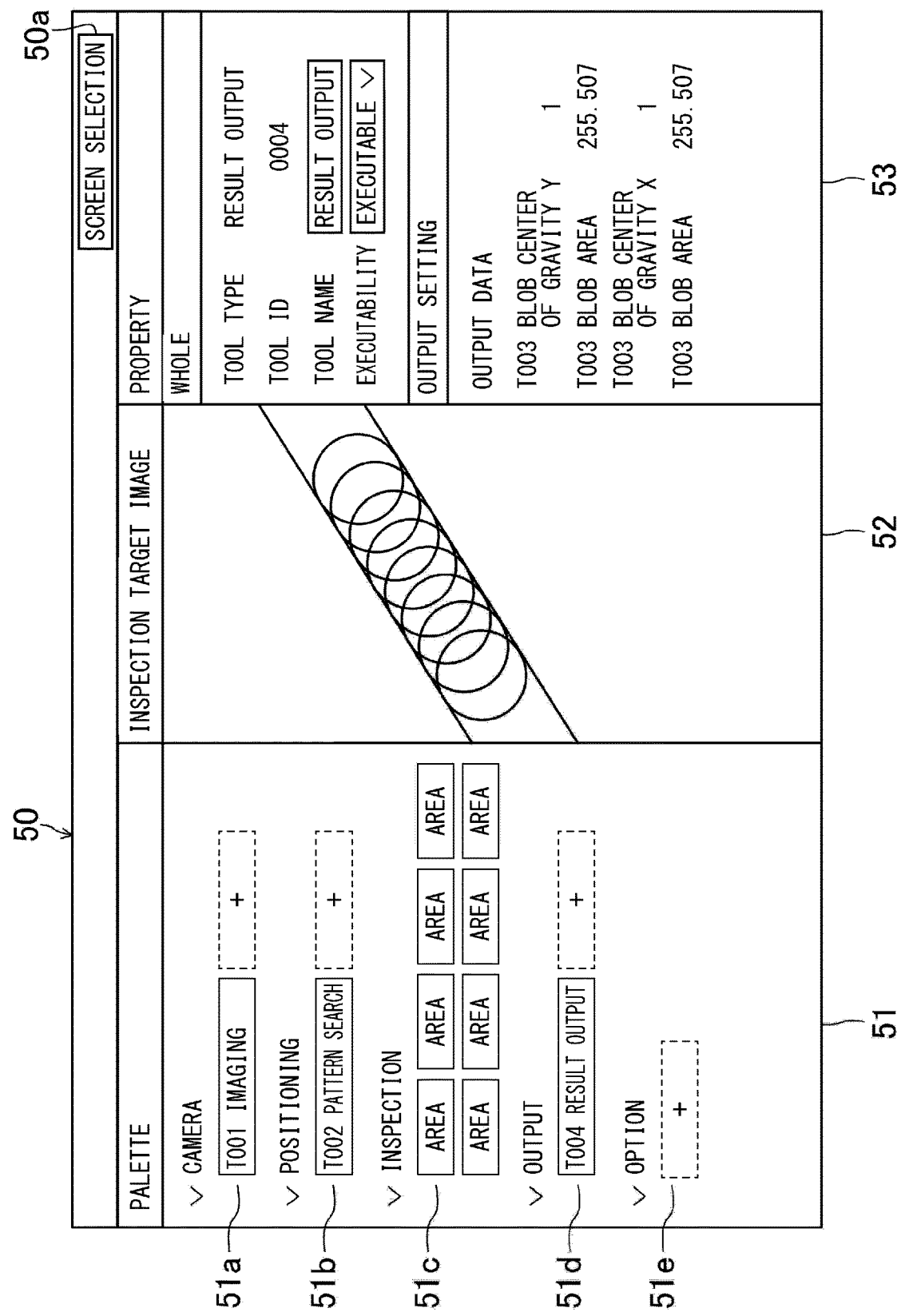
FIG. 14 is a diagram corresponding to FIG. 13 in a case where a plurality of inspection setting tools are collectively edited.

The inspection setting device 1 has a batch editing function of collectively editing a plurality of tools arranged in the palette region 61 of the free layout screen 60. FIG. 13 illustrates a case where eight inspection setting tools are arranged in the palette region 61, and correspondingly, eight tool displays (circles) indicating the inspection region are displayed so as to be aligned in the longitudinal direction in the image region 52. By collectively editing the eight inspection setting tools, the inspection regions of the workpiece can be arranged in a predetermined direction as illustrated in FIG. 14. In this manner, by setting the positions, arrangement directions, pitches, and the like of the plurality of tools in the palette region 61, the plurality of tools can be aligned.

(Display of Work Sheet Region)

Figure 15:
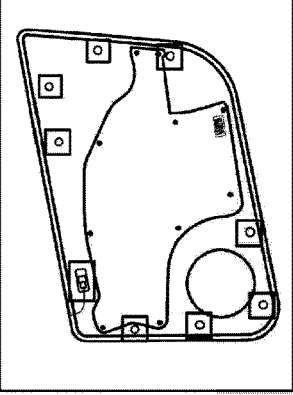
FIG. 15 is a free layout screen including a work sheet region.

As illustrated in FIG. 15, the screen generation unit 11 of the inspection setting device 1 can generate, for example, a free layout screen 60 as an example of a display screen that simultaneously displays the palette region 61, the image region 62, and the work sheet region 65. Note that the palette region 61 and the work sheet region 65 may not be displayed at the same time, and for example, only one may be displayed and the other may be displayed by a switching operation.

A work sheet region 65 is a region for referring to and calculating data related to a plurality of tools arranged in the palette region 61, and has a plurality of cells. The cells in the work sheet region 65 are arranged in the longitudinal direction and the lateral direction. Note that the step layout screen 50 can also be a display screen for displaying the work sheet region.

The input unit 12 receives selection of a tool arranged on the palette region 61 of the free layout screen 60. For example, when the user selects an arbitrary tool from a plurality of tools arranged on the palette region 61 using the operation unit 40, the operation is received by the input unit 12, and the control unit 13 specifies the tool received by the input unit 12. In addition, the input unit 12 receives a setting related to input, reference, or calculation of data related to the tool selected by the user via the work sheet region 65. As a result, even if the user does not learn a programming skill, setting of image processing to data utilization can be easily executed. In addition, the image processing can be set by the tool in the palette region 61, and the data utilization regarding the tool can be set in the work sheet region 65. Therefore, each setting can be distinguished, and the setting operation can be easily understood.

Figure 25A:
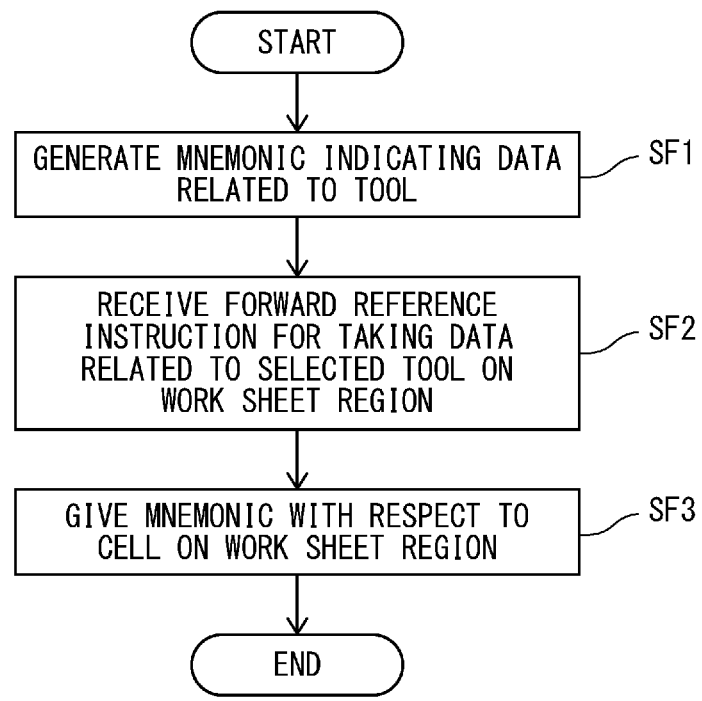
FIG. 25A is a flowchart illustrating a flow of processing when sequentially referring from the palette region to the work sheet region.
Figure 25B:
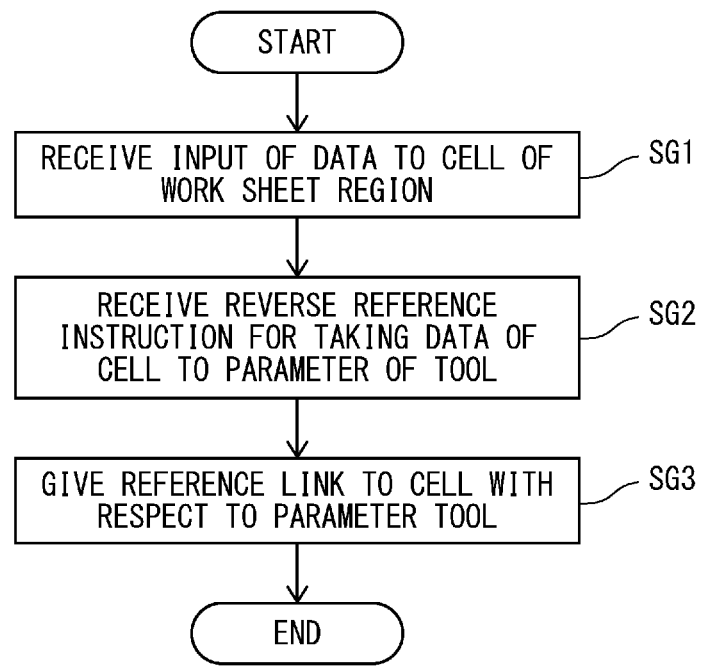
FIG. 25B is a flowchart illustrating a flow of processing when reversely referring from the work sheet region to the palette region.

The data reference function between the palette region and the work sheet region will be described along the flow of the processing shown in the flowcharts of FIG. 25A and FIG. 25B of FIG. 25. In step SF1 of FIG. 25A, the control unit 13 generates a mnemonic indicating data related to the tool arranged on the palette region 61. In step SF2, the input unit 12 receives, from the user, a forward reference instruction for taking data related to the selected tool on the palette region 61 into the work sheet region 65. The forward reference instruction refers to a numerical value such as a measurement result of a tool on the palette region 61 in the work sheet region 65 to be taken into the work sheet region, and may be in any manner. As an example of a method of the forward reference instruction, the input unit 12 is configured to be capable of receiving the forward reference instruction by a drag and drop operation in which data related to a selected tool on the palette region 61 is dragged and dropped on the work sheet region 65. That is, the forward reference instruction can be easily performed by operating the mouse 40b. Note that the order of step SF1 and step SF2 may be reversed. That is, after the input unit 12 receives the forward reference instruction, the control unit 13 may generate a mnemonic related to data of a tool that is a target of the forward reference instruction.

In step SF3, when the input unit 12 receives the forward reference instruction, the control unit 13 is configured to associate the selected tool with the cell by giving a mnemonic of data related to the selected tool to the cell on the work sheet region 65.

The input unit 12 can receive a reverse reference instruction in addition to the forward reference instruction. The reverse reference instruction is to feed back the operation result in the work sheet region 65 to the palette region 61 for use. That is, in step SG1 of FIG. 25B, the input unit 12 receives an input of data to a cell in the work sheet region 65. In step SG2, the input unit 12 receives a first reverse reference instruction for taking the data of the selected cell on the work sheet region 65 into the parameter of the selected tool on the palette region 61 of the free layout screen 60. In this case, in step SG3, when the input unit 12 receives the first reverse reference instruction, the control unit 13 gives a reference link to the selected cell on the work sheet region 65 to the parameter of the selected tool on the palette region 61. As a result, the control unit 13 associates the parameter of the selected tool on the palette region 61 with the selected cell on the work sheet region 65.

The input unit 12 can also receive, as a reverse reference instruction, a second reverse reference instruction for capturing data of a cell in which a calculation result received via the work sheet region 65 is arranged, as a parameter of the selected tool on the palette region 61. When the input unit 12 receives the second reverse reference instruction, the control unit 13 associates the parameter of the selected tool on the palette region 61 with the cell in which the calculation result is arranged by providing a reference link to the cell in which the result of the operation is arranged for the parameter of the selected tool on the palette region 61.

The input unit 12 receives at least one of a selection operation of an arbitrary tool among a plurality of tools arranged on the palette region 61 and a selection operation of a cell to which data in the work sheet region 65 is input. When the user selects an arbitrary tool on the palette region 61 using the operation unit 40, the operation is received by the input unit 12 as a selection operation, and when the user selects a cell to which data of the work sheet region 65 is input using the operation unit 40, the operation is received by the input unit 12 as a selection operation.

The control unit 13 analyzes a reference relationship between a plurality of tools arranged on the palette region 61 and data input to the work sheet region 65, and determines an execution order at the time of execution of inspection of each tool and a reference order and a calculation order of data in the work sheet region 65. At this time, when the input unit 12 receives a selection operation of an arbitrary tool, the control unit 13 creates reference relationship data indicating a reference relationship between the selected tool and a cell in the work sheet region 65, and when the input unit 12 receives a selection operation of a cell to which data is input, the control unit creates reference relationship data indicating a reference relationship between the selected cell and a tool. The screen generation unit 11 displays the reference relationship data created by the control unit 13 as described later.

In addition, the control unit 13 refers to the identification information allocated to the plurality of tools arranged on the palette region 61 and the plurality of cells of the work sheet region 65, analyzes the dependency based on the processing content of each identification information, and executes topological sorting, so that it is possible to determine the execution order at the time of execution of the inspection of each tool and the reference order and the calculation order of the data in the work sheet region 65.

Figure 16:
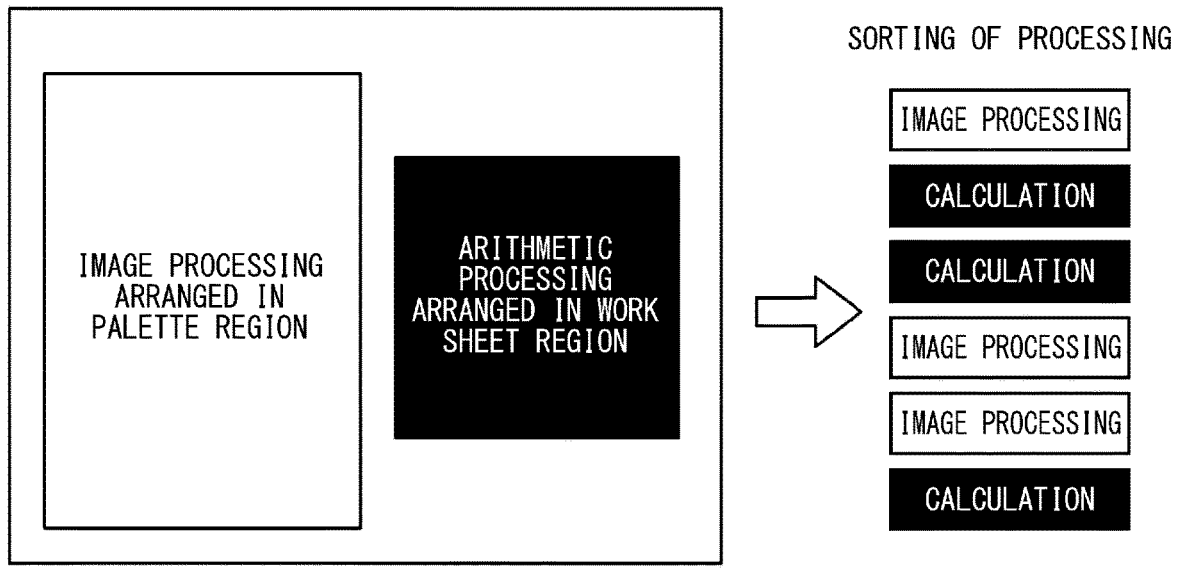
FIG. 16 is a conceptual diagram illustrating sorting of tools in a palette region and a work sheet region.

Hereinafter, the order determination procedure will be specifically described. FIG. 16 is a conceptual diagram illustrating sorting of the image processing tools arranged in the palette region 61 and the arithmetic processing tools arranged in the work sheet region 65. As illustrated in this figure, in a case where the work sheet region 65 and the palette region 61 are provided, a plurality of image processing tools may be arranged in the palette region 61, and a plurality of arithmetic processing tools may be arranged in the work sheet region 65. The control unit 13 executes topological sorting and sorts the plurality of image processing tools in the palette region 61 and the plurality of arithmetic processing tools in the work sheet region 65 in an optimal order. As a result, the user does not need a design skill with a high degree of difficulty, and only needs to concentrate on only the processing and calculation to be realized and add a tool.

In the plurality of image processing tools in the palette region 61, as described above, the control unit 13 analyzes the reference relationship among the plurality of tools, and determines the execution order at the time of execution of the inspection of each tool. On the other hand, the plurality of arithmetic processing tools in the work sheet region 65 can determine the execution order by decomposing the reference relationship for each cell as in general spreadsheet software. By combining these, the execution order in the case of the forward reference is determined.

For the tool, information indicating which other tool's setting/result information is to be referred to and/or which cell's value is to be referred to is included. In the case of the positioning setting tool, the information indicates which imaging setting tool is used to refer to the image. In the case of the inspection setting tool, the information indicates which positioning setting tool is used to refer to the result. In the case of the output tool, the information indicates which positioning setting tool is used to refer to the result. The setting of these pieces of information can be set in the property region 63, the input unit 12 receives the information input to the property region 63, and the control unit 13 holds the information received by the input unit 12 in association with the corresponding tool.

In addition, for a cell, information indicating which data of which tool the cell represents, an operation using the cell, or an operation using a value of which other cell is used is included. In specifying which tool, a tool ID set for each tool may be used. In addition, when a cell is specified, a cell ID set for each cell may be used. Reference relationships of all tools and cells set in the palette region and the work sheet region are comprehensively determined, and the execution order is automatically determined.

Figure 17:
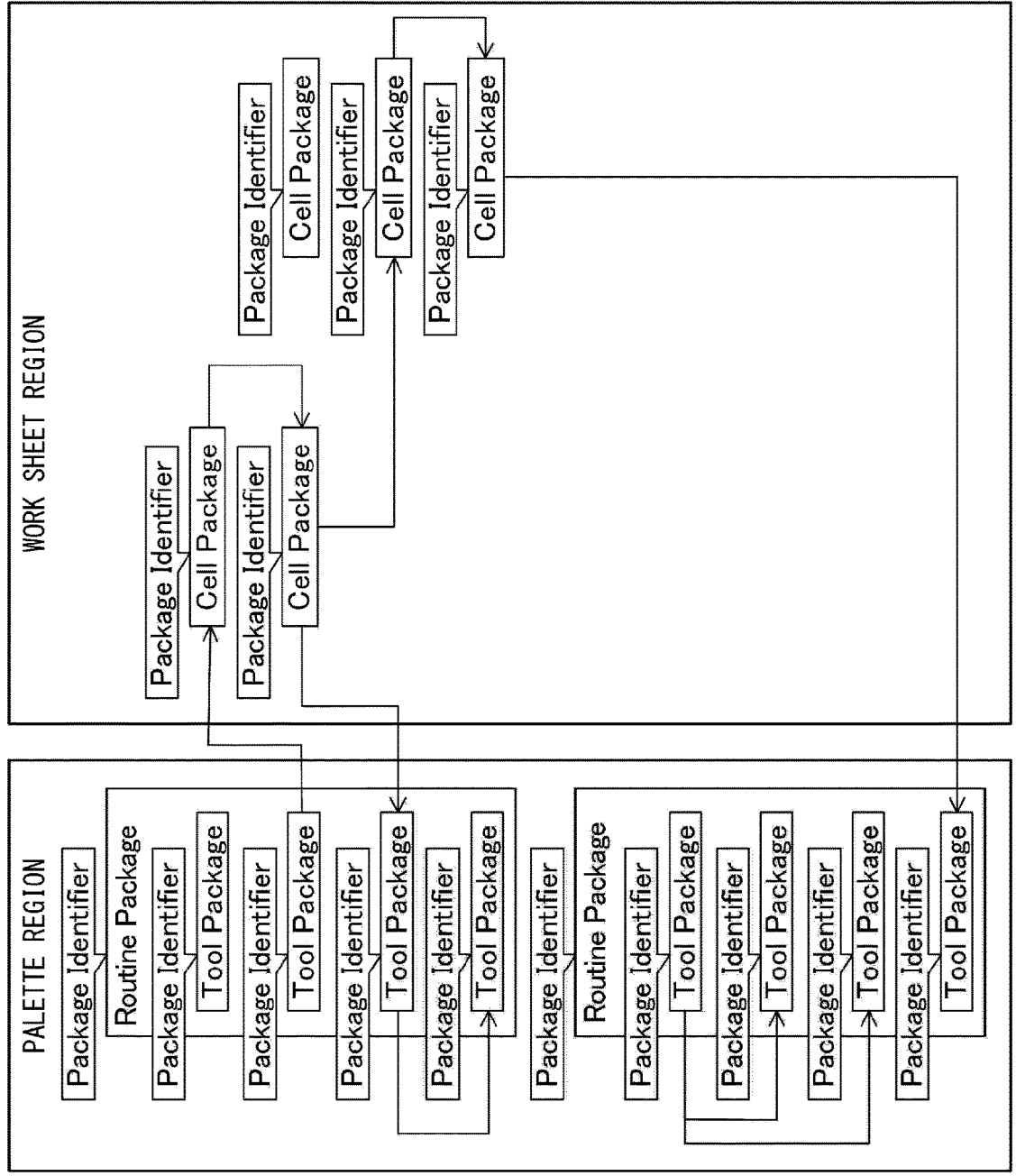
FIG. 17 is a diagram illustrating an analysis example of an execution order.
Figure 24:
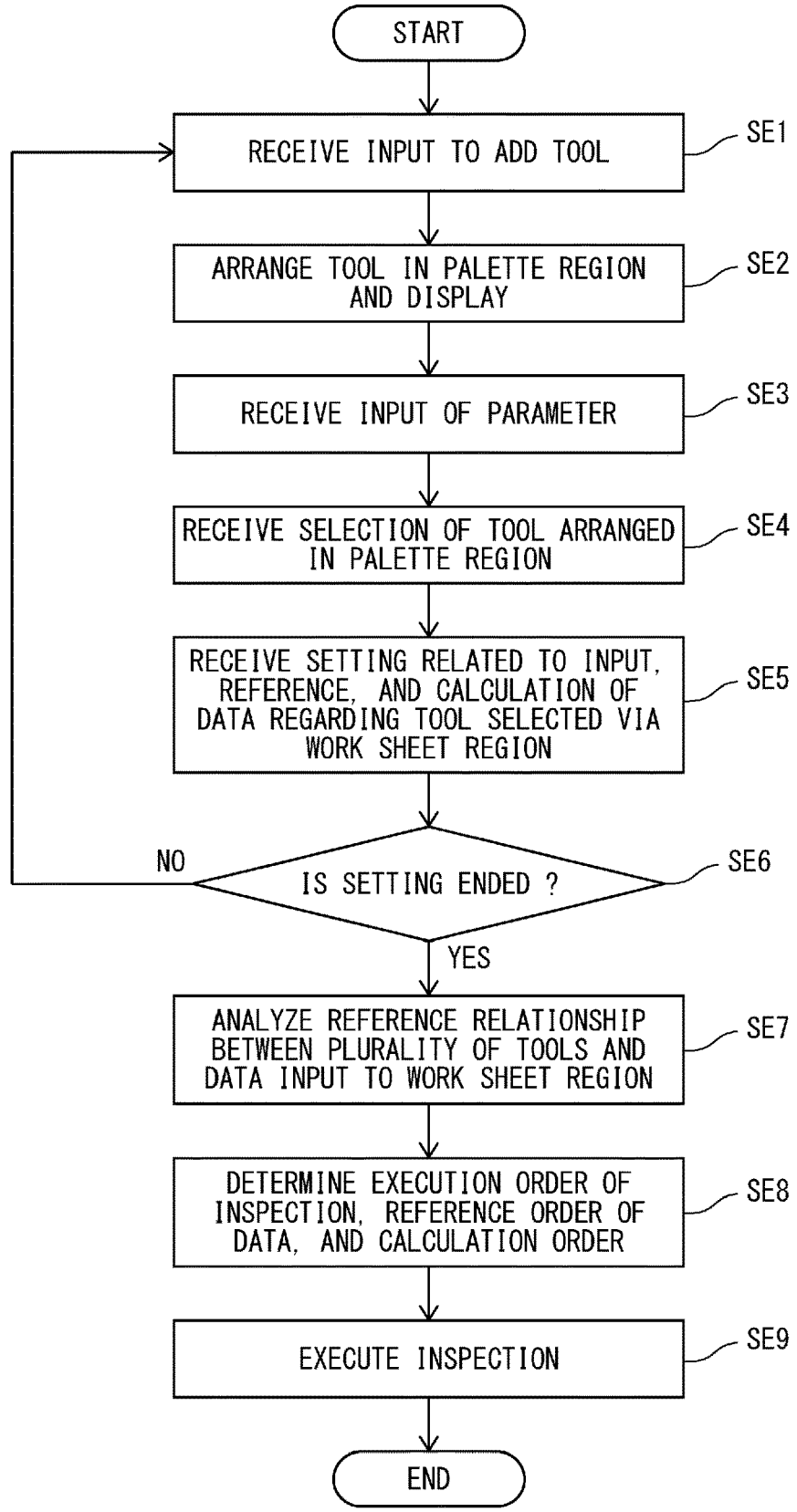
FIG. 24 is a flowchart illustrating an example of a flow of processing from addition of a tool to execution of inspection.

FIG. 17 is an analysis example of the execution order, and illustrates a mechanism of decomposing the reference order of the palette region 61 and the work sheet region 65 and determining the execution order from the reference relationship. The cells in the work sheet region 65 constitute one numerical calculation tool. The order is resolved including the cell units, and the tool in the work sheet region 65 is disassembled to apply the mechanism of the execution order automatic resolution of the palette region 61. Further, FIG. 24 is a flowchart illustrating a flow of processing from addition of a tool to execution of inspection in a case where inspection setting is performed using not only the palette region but also the work sheet region, and the same applies to both the step layout screen 50 and the free layout screen 60. Steps SE1 to SE3 are similar to steps SC1 to SC3 illustrated in FIG. 7. In step SE4, the input unit 12 receives selection of the tool arranged in the palette region in step SE2. In step SE5, the input unit 12 receives settings related to input, reference, and calculation of data related to the tool whose selection has been received in step SE4 via the work sheet region 65. In step SE6, in a case where there is another additional necessary tool, the processing returns to step SE1 and similar processing is performed. In step SE6, when the inspection setting by the user is completed and the input unit 12 receives an instruction to execute the inspection, the processing proceeds to step SE7. In step SE7, the control unit 13 analyzes a reference relationship between a plurality of tools and data input to the work sheet region. In step SE7, the control unit 13 determines the execution order of the inspection, the reference order of the data, and the calculation order based on the reference relationship analyzed in step SE6. In step SE9, the inspection unit 20 executes inspection based on the order determined in step SE8.

Figure 18A:
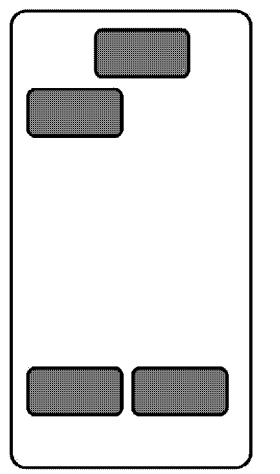
FIGS. 18A and 18B are diagrams illustrating a display example using a GUI and a work sheet.
Figure 18B:
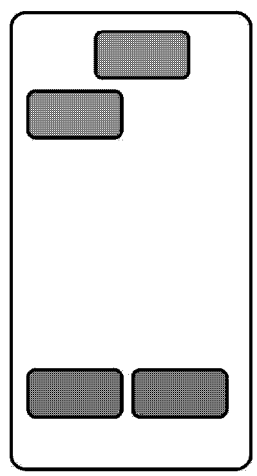

FIG. 18A of FIG. 18 shows an example of adding a graphical user interface (GUI) corresponding to a palette separately from the work sheet region. In this example, image processing and data utilization are performed in the work sheet region, while an image processing tool is displayed in a GUI corresponding to a palette. In addition, as illustrated in FIG. 18B, when the image processing tool is arranged in the GUI, the image processing tool may be processed in a region (right end column) invisible to the user of the work sheet. In this way, the user can define the image processing in the GUI corresponding to the palette and define the data utilization in the work sheet region, so that each processing can be set distinguishably The input unit 12 receives an instruction to take the output results from a plurality of positioning setting tools and/or inspection setting tools arranged on the palette region 61 into the work sheet region 65. Further, the input unit 12 receives an instruction to take a calculation setting and a calculation result based on an output result arranged in a cell of the work sheet region 65 into an output tool arranged in the palette region 61.

When the input unit 12 receives an instruction to take the output result into the work sheet region 65, the control unit 13 inputs the output result to a cell on the work sheet region 65. In addition, the control unit 13 is configured to, when receiving an instruction to take the calculation result on the work sheet region 65 into the output tool arranged in the palette region 61, execute the calculation and provide the output tool with a reference link to a cell in which the calculation result is arranged, thereby associating the output tool with the cell in which the calculation result is arranged. Further, on the free layout screen 60 generated by the screen generation unit 11, the first inspection region in the image region 62 and the tool and the cell related to the first inspection region, and the second inspection region in the image region 62 and the tool and the cell related to the second inspection region are displayed distinguishably. For example, when the first inspection region and the second inspection region are set as inspection regions different from each other in the workpiece displayed in the image region 62, the first inspection region and the second inspection region are displayed in the image region 62 in a distinguishable form.

Figure 19:
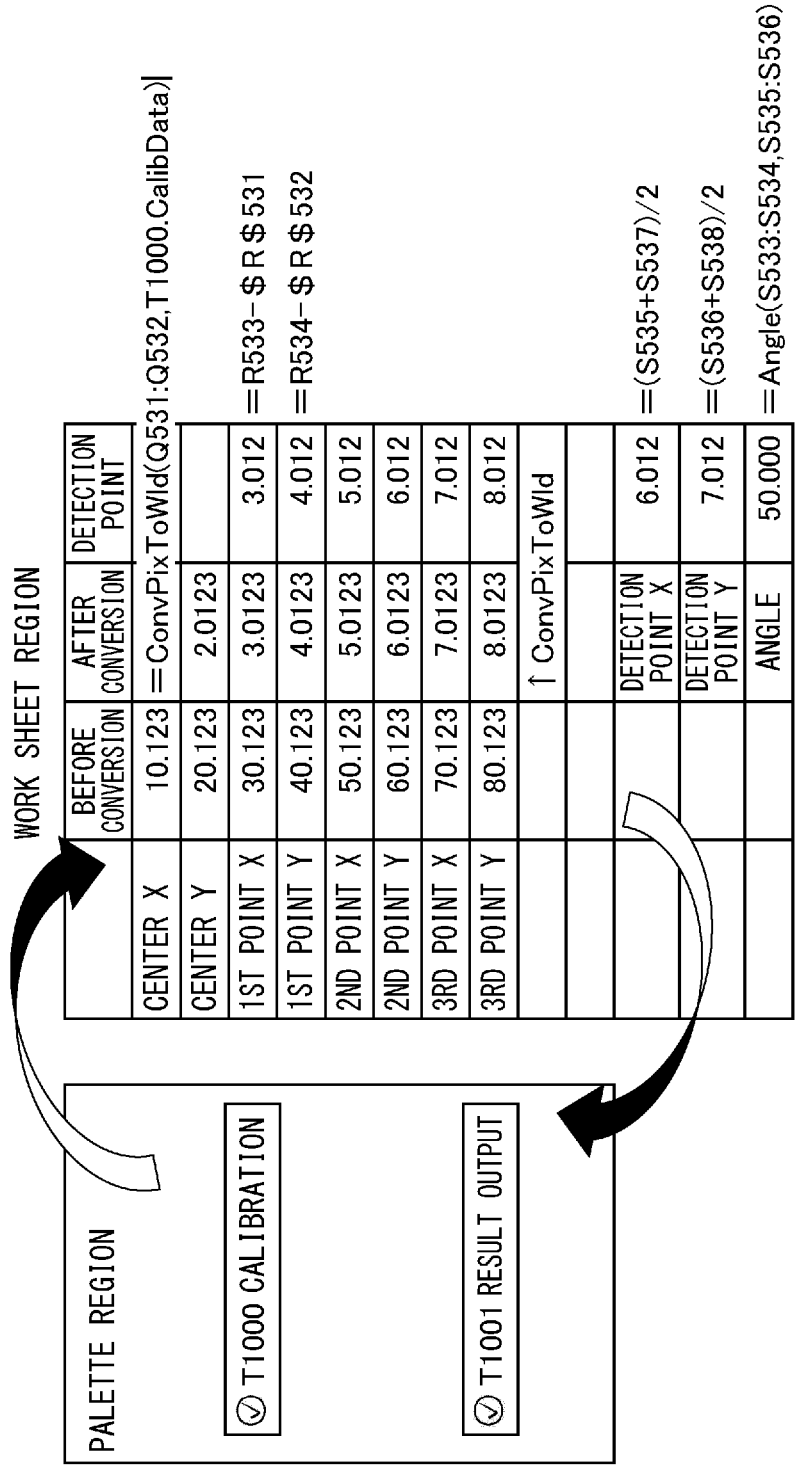
FIG. 19 is a diagram for explaining a case where calculation can be viewed in a list in a work sheet region.

As illustrated in FIG. 15, the inspection result can be displayed in the work sheet region 65. In this example, coordinate transformation is performed on the displayed inspection result, and the tool in the palette region 61 refers to the coordinates after the coordinate transformation. This specific example is illustrated in FIG. 19. FIG. 19 in which the calculation of the "T 1000 calibration" tool in the palette region 61 can be illustrated in the work sheet region 65, and the calculation of the "T0001 result output" tool in the palette region 61 can also be illustrated in the work sheet region 65.

Figure 20:
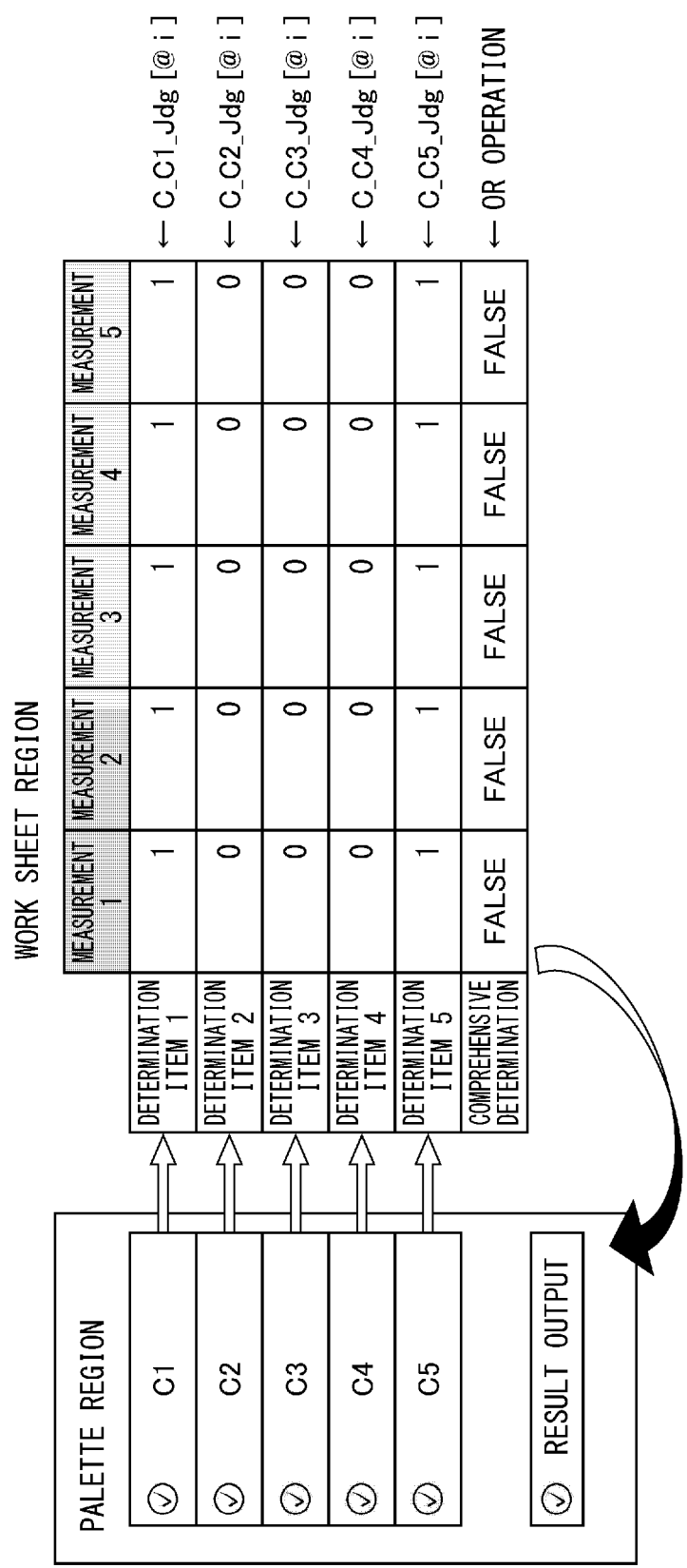
FIG. 20 is a diagram for explaining a case of application to comprehensive determination.

FIG. 20 is a diagram for explaining a case where the disclosure is applied to comprehensive determination. The comprehensive determination means that a final result is determined by integrating a plurality of determination results. In the comprehensive determination, the determination is stored by classifying conditions for each determination result. In the work sheet region 65, the determination result can be represented in a table. As a result, for example, the calculation can be easily performed using the OR function. In addition, in the work sheet region 65, since expression can be performed using control logics such as AND, OR, SUM, and IF which are easy to understand, it is possible to perform comprehensive determination by integrating a plurality of determination results by various calculations.

Figure 21:
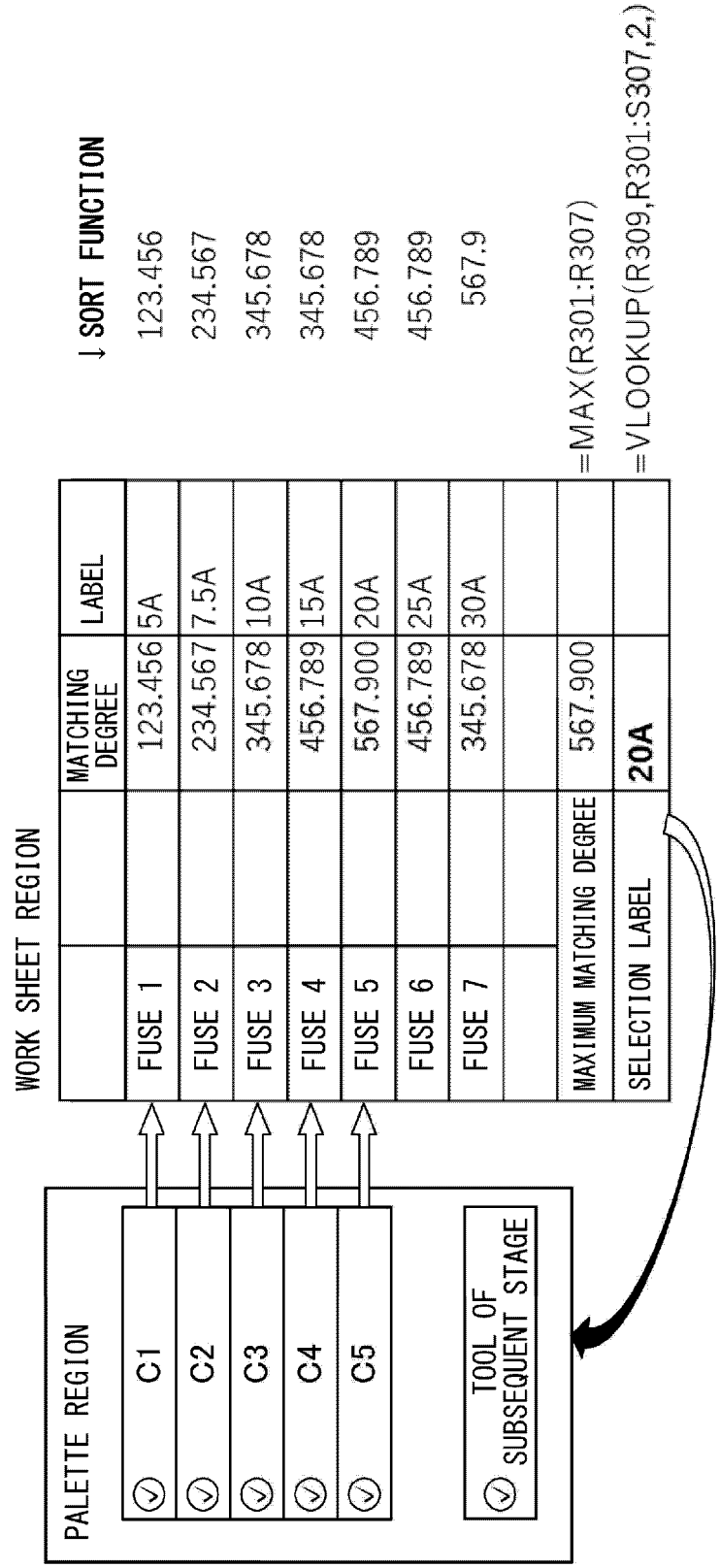
FIG. 21 is a diagram for explaining a case of application to sorting at maximum.

FIG. 21 is a diagram for explaining a case of being applied to maximum and sorting, and for example, it is also possible to obtain a numerical value having the maximum matching degree and to rearrange the values in ascending order or descending order. In this case, in the work sheet region 65, the MAX function is used, or VLOOKUP and a sorting tool are used. By displaying in the work sheet region 65, the visibility is improved and the determination logic is easy to understand.

Figure 22:
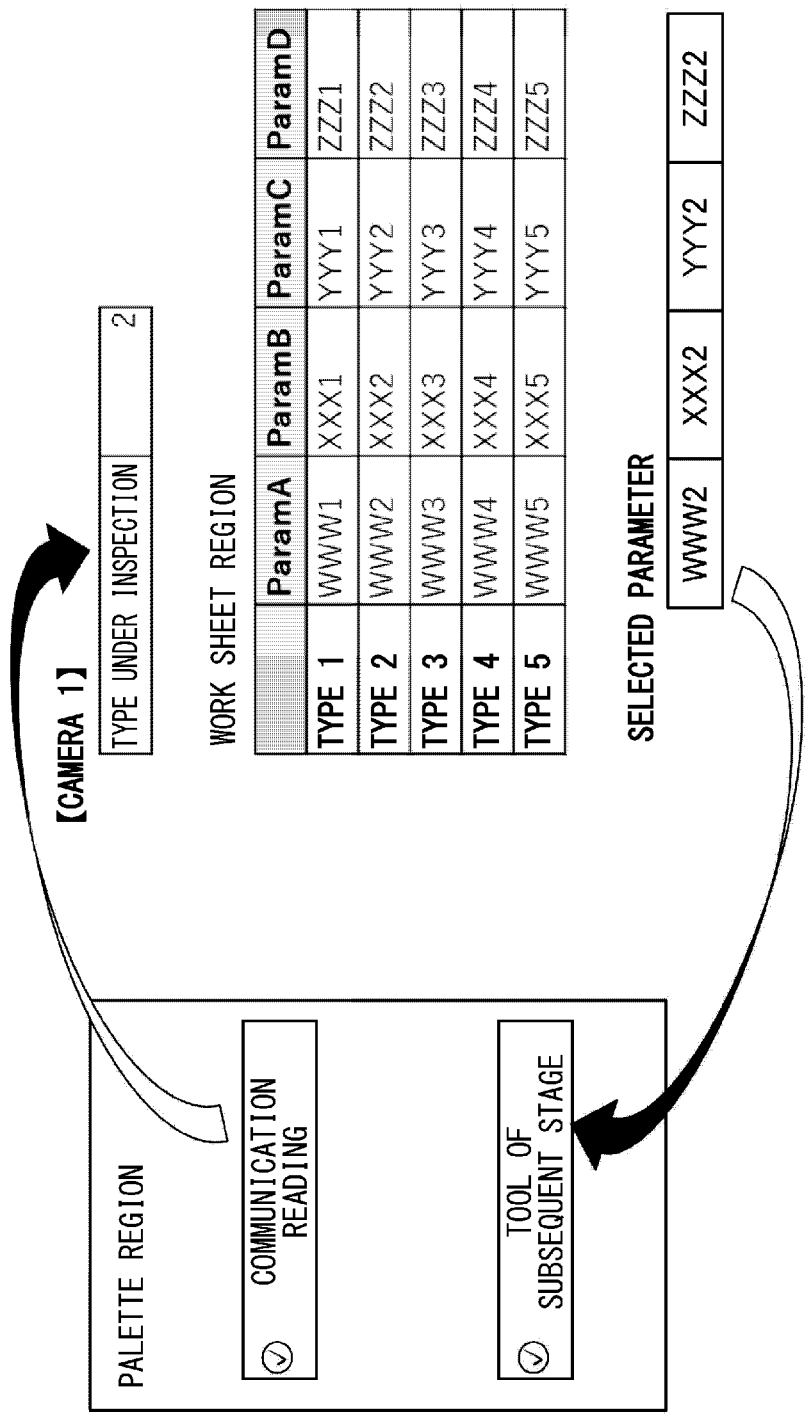
FIG. 22 is a diagram for explaining a case of application to parameter selection.

FIG. 22 illustrates a case where a "communication reading tool" and a "tool in the subsequent stage" are arranged in the palette region 61. In the "communication reading tool", an input value from a programmable logic controller (PLC) is read. For example, when "2" is read as the product type under inspection, a parameter corresponding to the "product type 2" is used in the "tool in the subsequent stage" with reference to the "product type 2" in the work sheet region 65. The parameter may include an illumination condition of the imaging setting tool and the like. Based on the input value from the PLC, the illumination can be switched to capture an image, and a plurality of inspection target images can be acquired. In this case, the quality determination is performed by executing the inspection on each inspection target image.

Further, as a use case of the work sheet region 65, a character string can be customized. Specifically, customization of data itself such as switching of a character string used for data, customization of an output method such as switching of a folder name, and the like are possible. For example, the combined character string obtained by combining a plurality of cells in which the character string of the work sheet region 65 is arranged can be referred to as a parameter of the tool.

Figure 26:
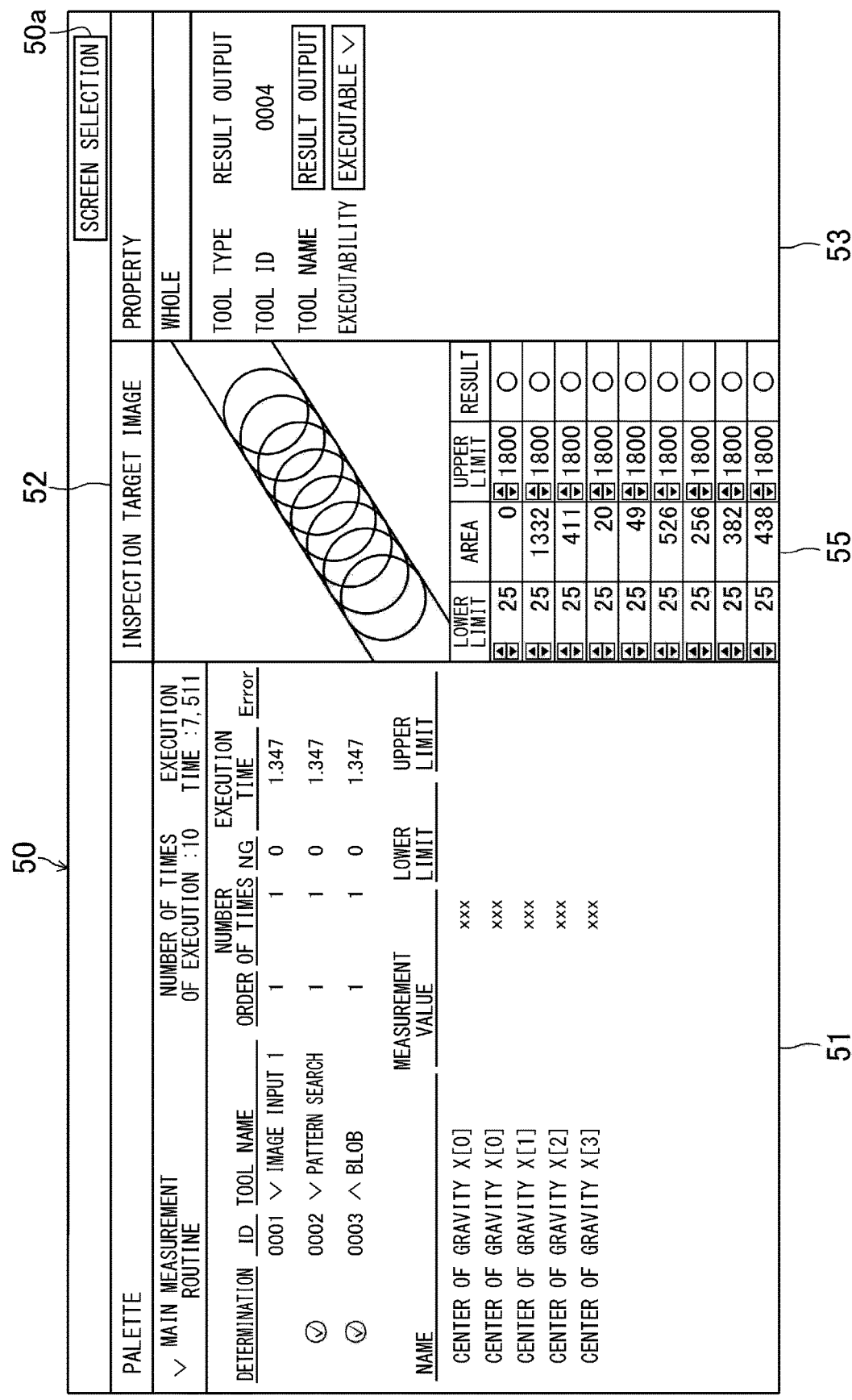
FIG. 26 is a diagram corresponding to FIG. 14 illustrating a case where attachment of a mnemonic is executed.

FIG. 14 illustrates a case where a plurality of inspection regions is set as described above. In this case, as illustrated in FIG. 26, the mnemonic can be attached to the work sheet region 65. Specifically, a desired mnemonic is extracted by a filter before the mnemonic is attached to the work sheet region and a plurality of mnemonics can be attached to the work sheet region 65 at once by dragging and dropping the selected mnemonics together into the work sheet region 65.

Figure 27:
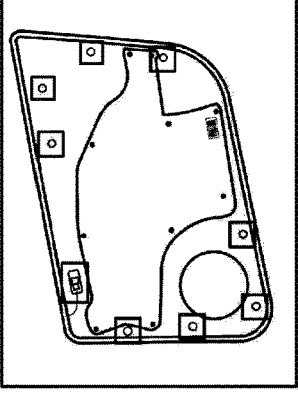
FIG. 27 is a diagram corresponding to FIG. 15 illustrating a case where a graph is displayed in a work sheet region.

FIG. 27 illustrates a case where a graph is displayed in the work sheet region 65. In this example, a table to which numerical values are input and a graph representing the numerical values input to the table are displayed in the work sheet region 65. The graph can be generated by the control unit 13 and the generated graph is incorporated into the work sheet region 65 by the screen generation unit 11. In this manner, the graph can also be displayed in the work sheet region 65.

Figure 28:
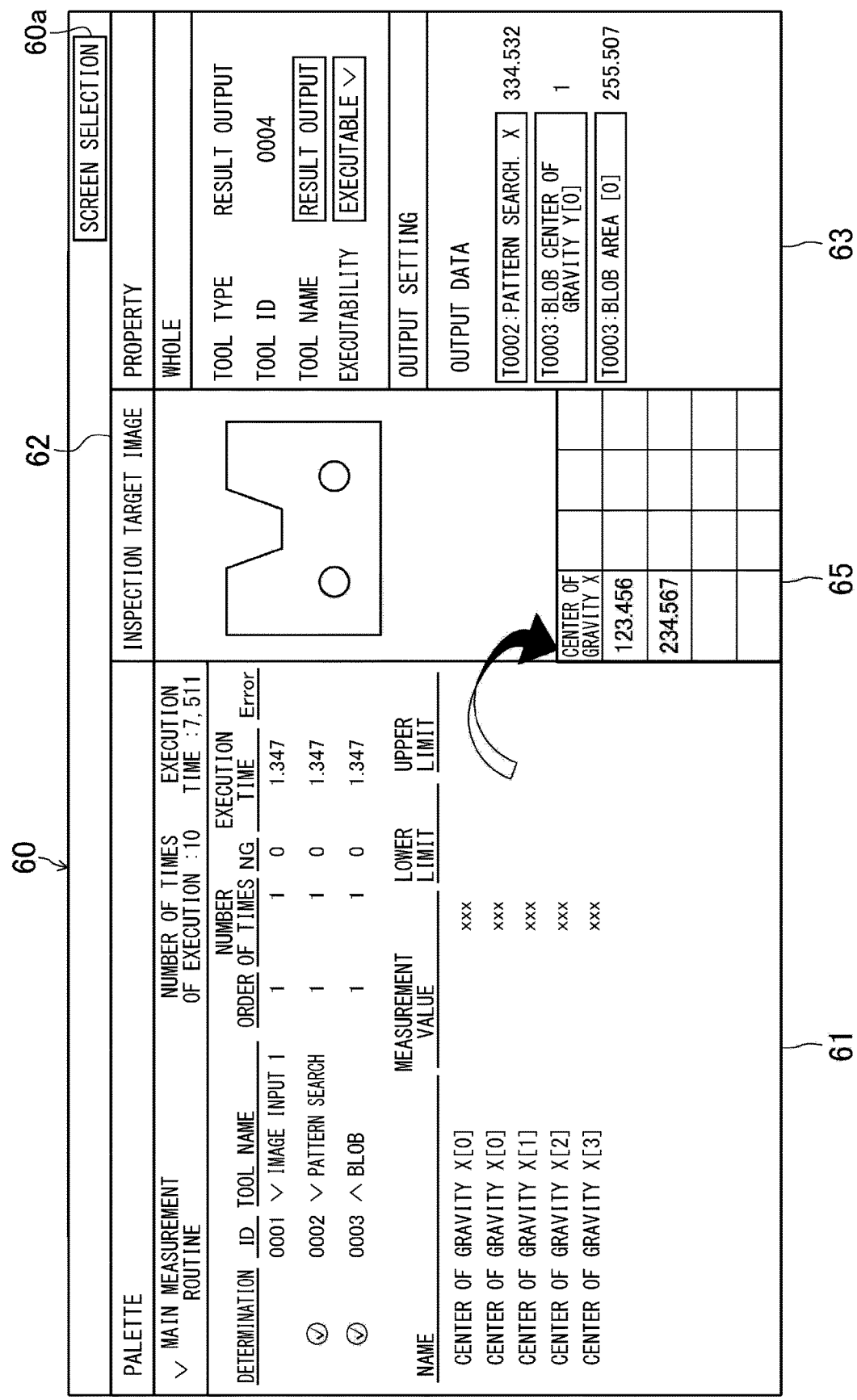
FIG. 28 is a diagram illustrating a case where a mnemonic is attached.

FIG. 28 is a diagram for explaining the cooperation on the user interface and explaining a case where the mnemonic on the palette region 61 is attached to the work sheet region 65. The mnemonic can be filtered on the palette region 61 using the display screen illustrated in FIG. 29. For example, a desired mnemonic can be extracted by filtering the mnemonic using the name of the tool, the type, the name of the parameter, and the like. The extracted mnemonic is attached from the palette region 61 to the work sheet region 65 by drag-and-drop as described above.

As a result, a key (character string such as T1000.XXX.JG) called a mnemonic is assigned. The numerical value of the tool on the palette region 61 is assigned by the mnemonic. The numerical value is updated for each measurement and input onto the work sheet region 65. Using this, numerical values are reflected from the palette region 61 to the work sheet region 65.

Figure 30:
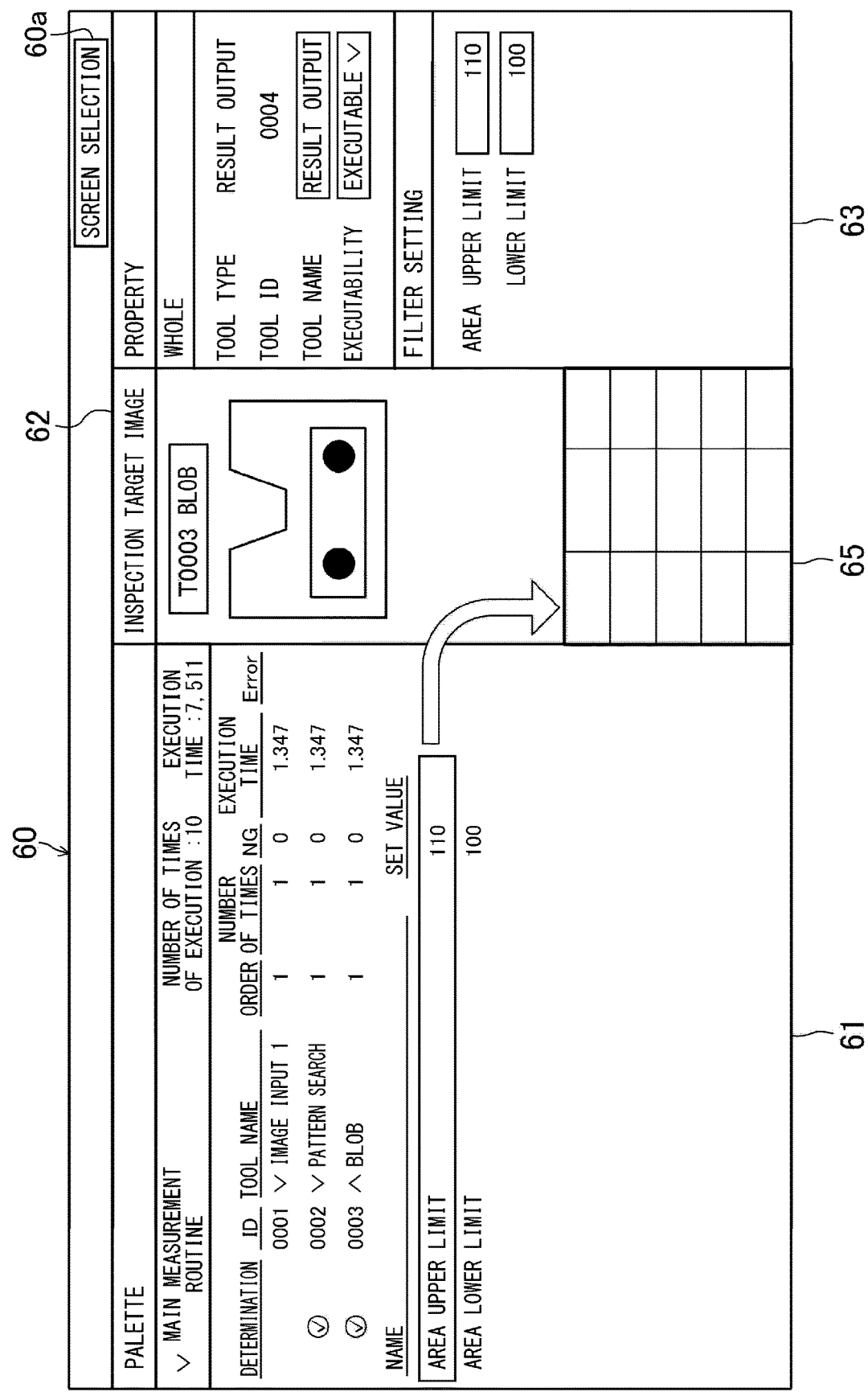
FIG. 30 is a diagram illustrating a display screen at the time of attaching a setting mnemonic.

FIG. 30 illustrates a display screen at the time of attaching the settings. As illustrated in this drawing, a mnemonic on the palette region 61 can also be applied to the work sheet region 65. The mnemonic is also attached from the palette region 61 to the work sheet region 65 by drag-and-drop as described above. Then, as illustrated in FIG. 31, the link is attached from the tool side. Specifically, the "T0003 blob" tool illustrated in FIG. 30 has data in which the upper limit of the area of the blob has a set value "110" and the lower limit of the area of the blob has a set value "100", and the data is displayed in the filter settings of the palette region 61 and the property region 63. When the data related to the upper limit of the area of the "T0003 blob" tool is dragged and dropped from the palette region 61 to the work sheet region 65, as illustrated in FIG. 31, the control unit 13 gives a mnemonic in which the upper limit of the area means the set value "110" to a cell of the work sheet region 65, so that the "T0003 blob" tool and the cell "B2" are associated with each other. Then, in the filter setting of the property region 63, the display of the parameter of the upper limit of the area is replaced with "B2" indicating the link of the cell. As a result, the set value of the upper limit of the area of the blob of the "T0003 blob" tool can be changed by adjusting the numerical value of the "B2" cell 65a of the work sheet region 65.

Figure 32:
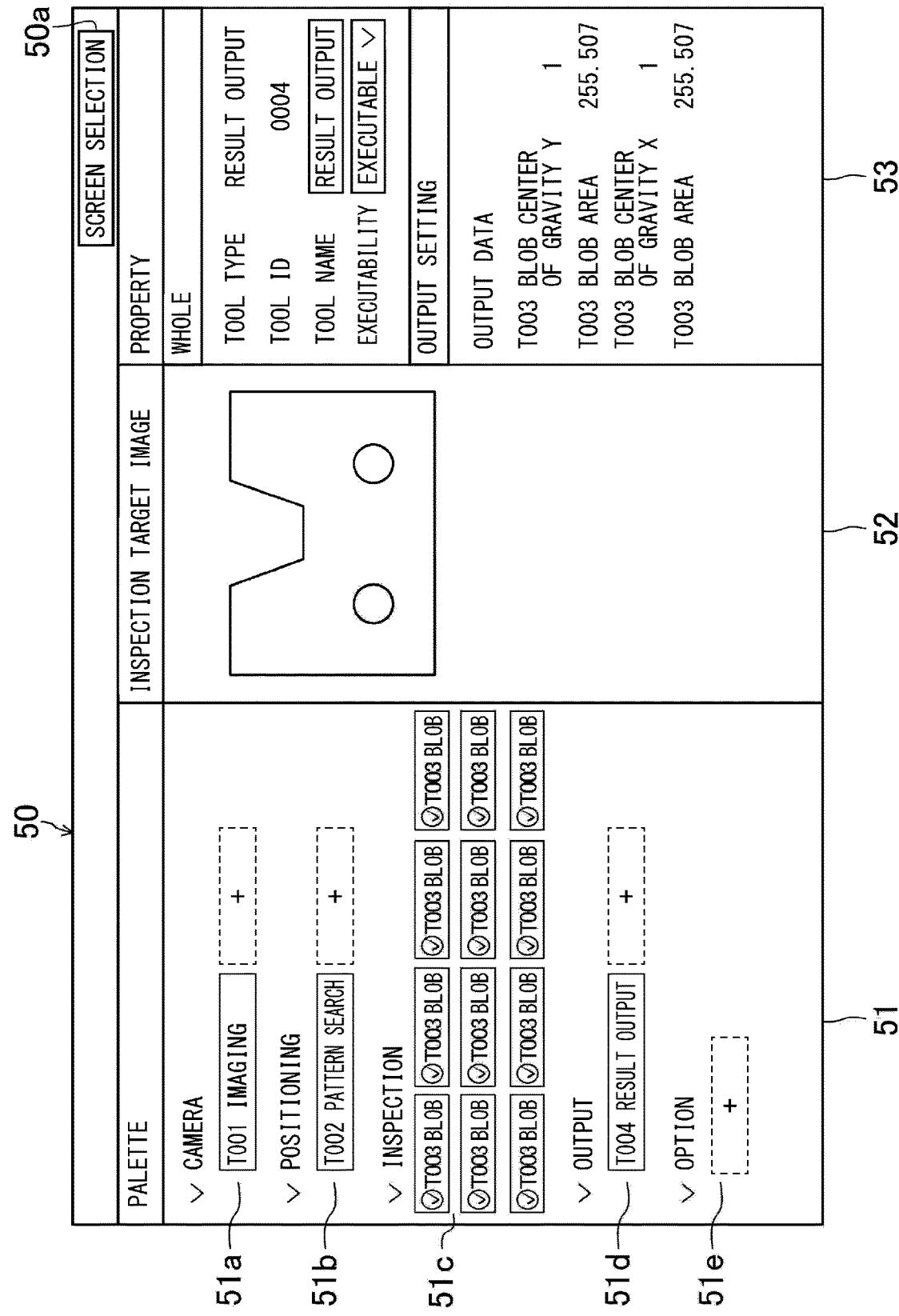
FIG. 32 is a diagram illustrating a case where a plurality of inspection setting tools are arranged in a palette region.
Figure 33:
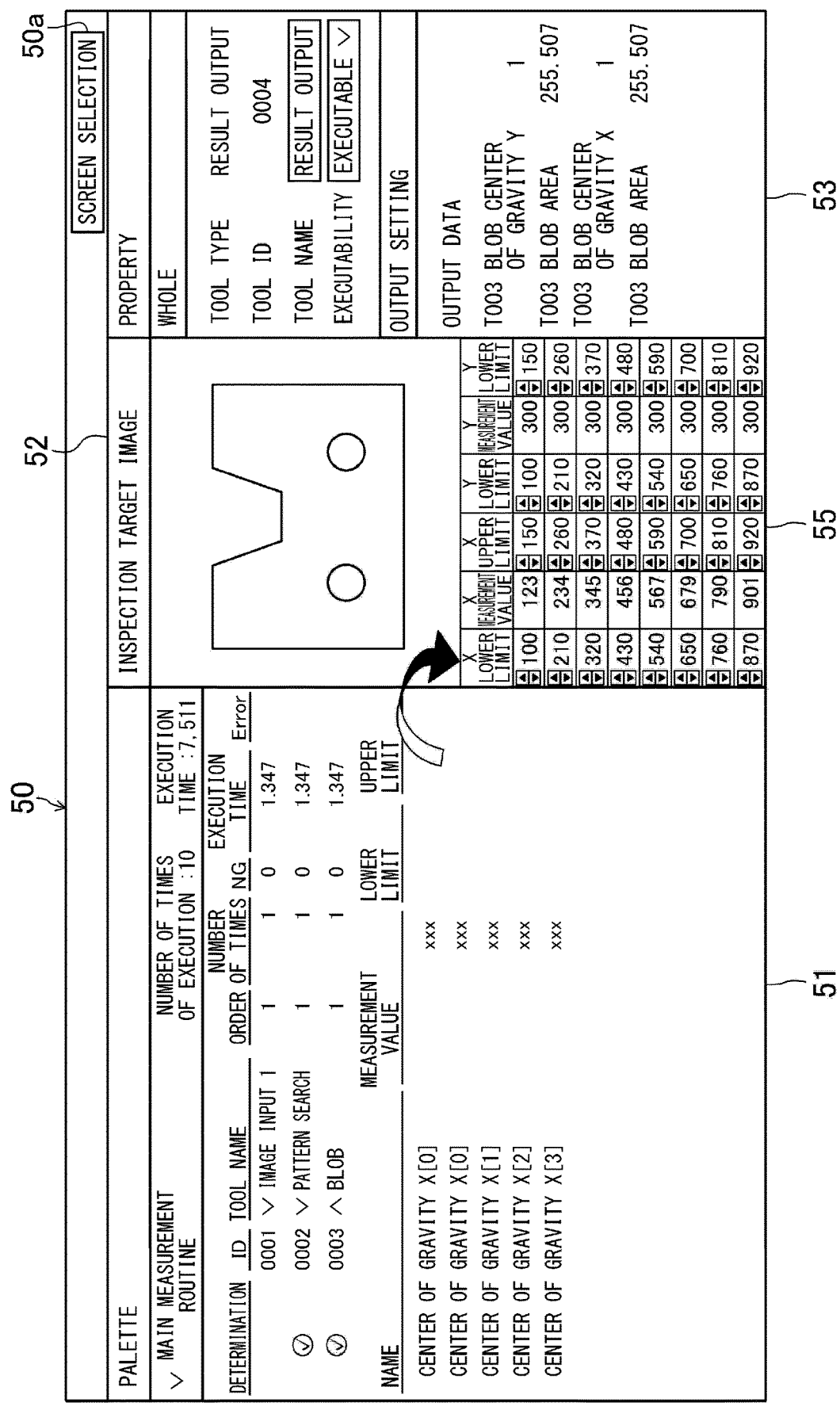
FIG. 33 is a diagram illustrating a state in which a list of thresholds of a plurality of inspection setting tools is input.

FIG. 32 illustrates a case where a plurality of inspection setting tools are arranged in the palette region 51 of the step layout screen 50. After the plurality of inspection setting tools are arranged in the palette region 51 in this manner, as illustrated in FIG. 33, the threshold list is attached to a work sheet region 55 of the step layout screen 50 by drag and drop. After the attaching, the threshold can be easily adjusted by re-inputting a numerical value in an arbitrary cell of the work sheet region 55.

Figure 34:
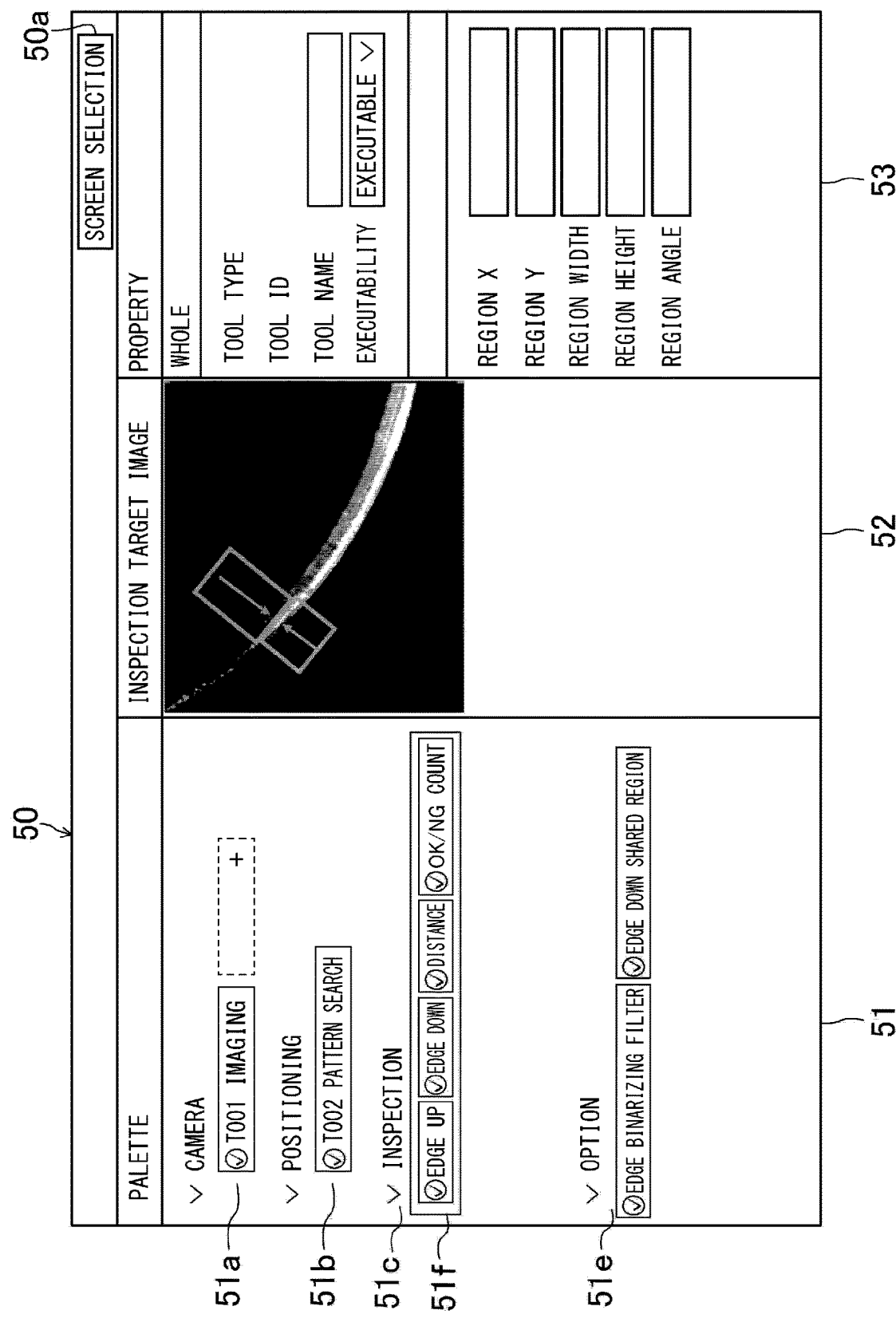
FIG. 34 is a diagram for explaining custom tooling.

FIG. 34 is a diagram illustrating a case where a custom tool is formed. The custom tool is a tool that groups a plurality of tools and enables selection of a parameter that can be displayed and/or edited as a parameter of the custom tool among parameters of the plurality of tools. For example, of a plurality of tools included in a custom tool, only some parameters of some tools may be displayed and/or editable as parameters of the custom tool. That is, customization of the user interface for display including whether to display or not to edit each parameter, such as the lock function, can be set for each account authority (administrator, worker, or the like) of the user. Since a mnemonic of a custom tool can also be created, a user-friendly user interface can be created. In performing the image inspection, information unnecessary for the user is hidden, and only necessary information can be displayed and/or edited, thereby improving usability.

Figure 43:
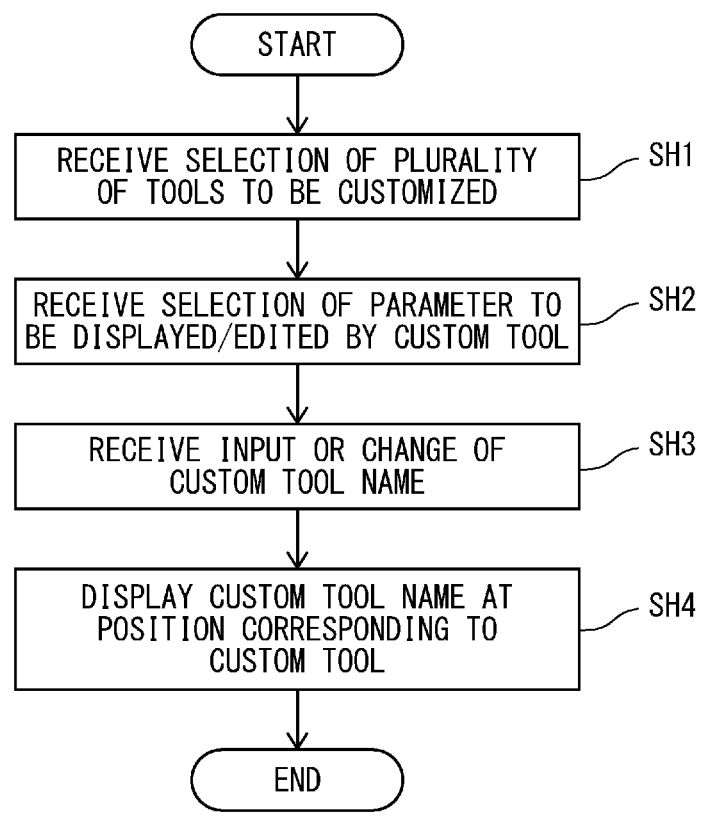
FIG. 43 is a flowchart illustrating a flow of processing when a plurality of tools are customized as tools.

FIG. 43 is a flowchart illustrating an example of a flow of processing when the above-described custom tooling is performed. In step SH1 after the start, the input unit 12 receives selection of a plurality of tools to be customized from a plurality of tools arranged on the palette region. In step SH2, the input unit 12 receives selection of a parameter that can be displayed and/or edited as a parameter of the custom tool. In step SH3, the input unit 12 receives input or change of a custom tool name. In step SH4, the screen generation unit 11 displays the custom tool name at the corresponding position of the custom tool.

Returning to FIG. 34, four types of inspection setting tools "edge up", "edge down", "distance", and "OK/NG count" arranged in the inspection setting area 51c of the palette region 51 on the step layout screen 50 are collectively customized to create a custom tool 51f. In addition, as optional tools, an "edge binarizing filter" and an "edge down shared region" are arranged. The custom tooling can be executed not only on the step layout screen 50 but also on the free layout screen 60.

Figure 35:
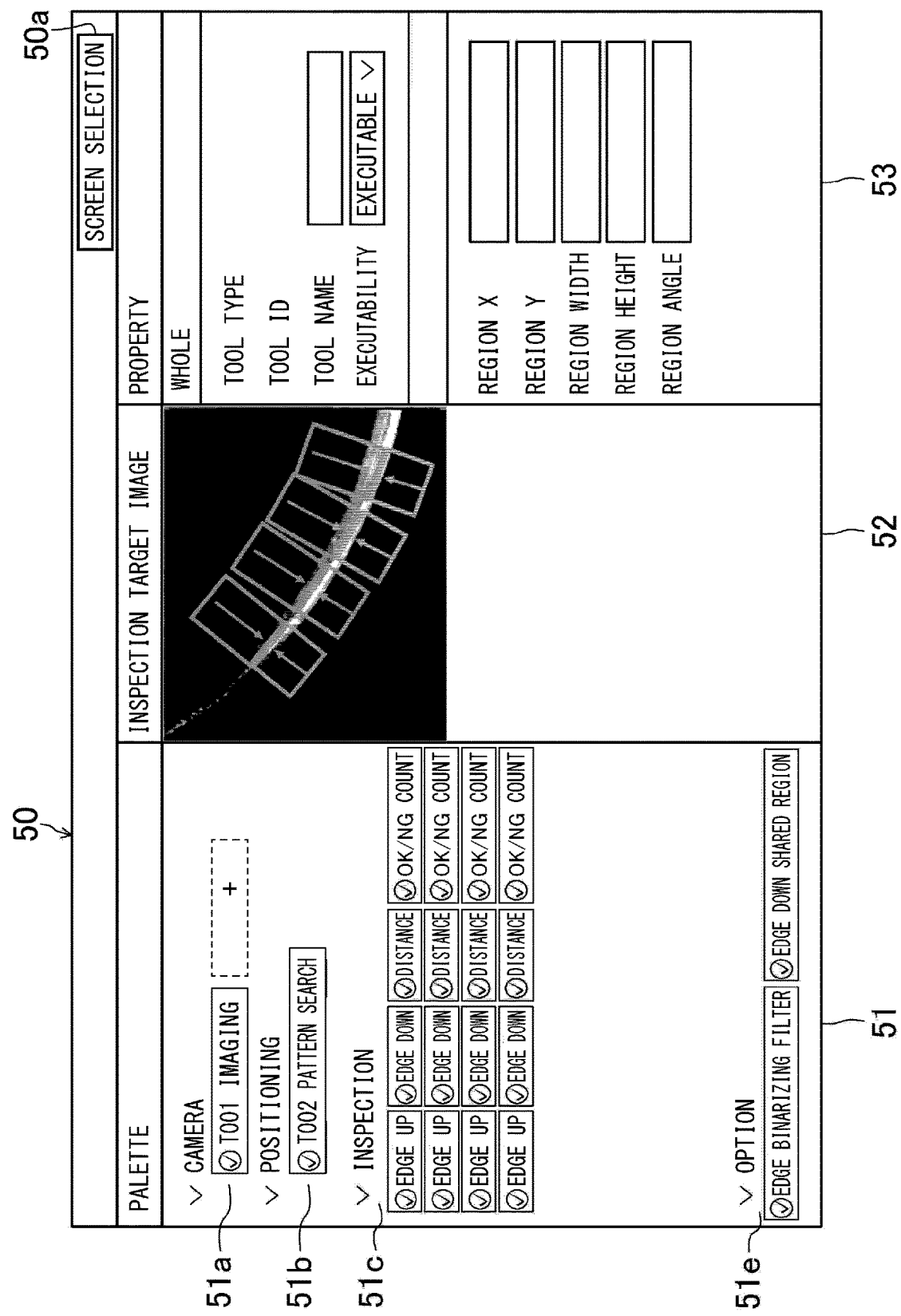
FIG. 35 is a diagram illustrating a state in which a custom tool is developed by copying.
Figure 36:
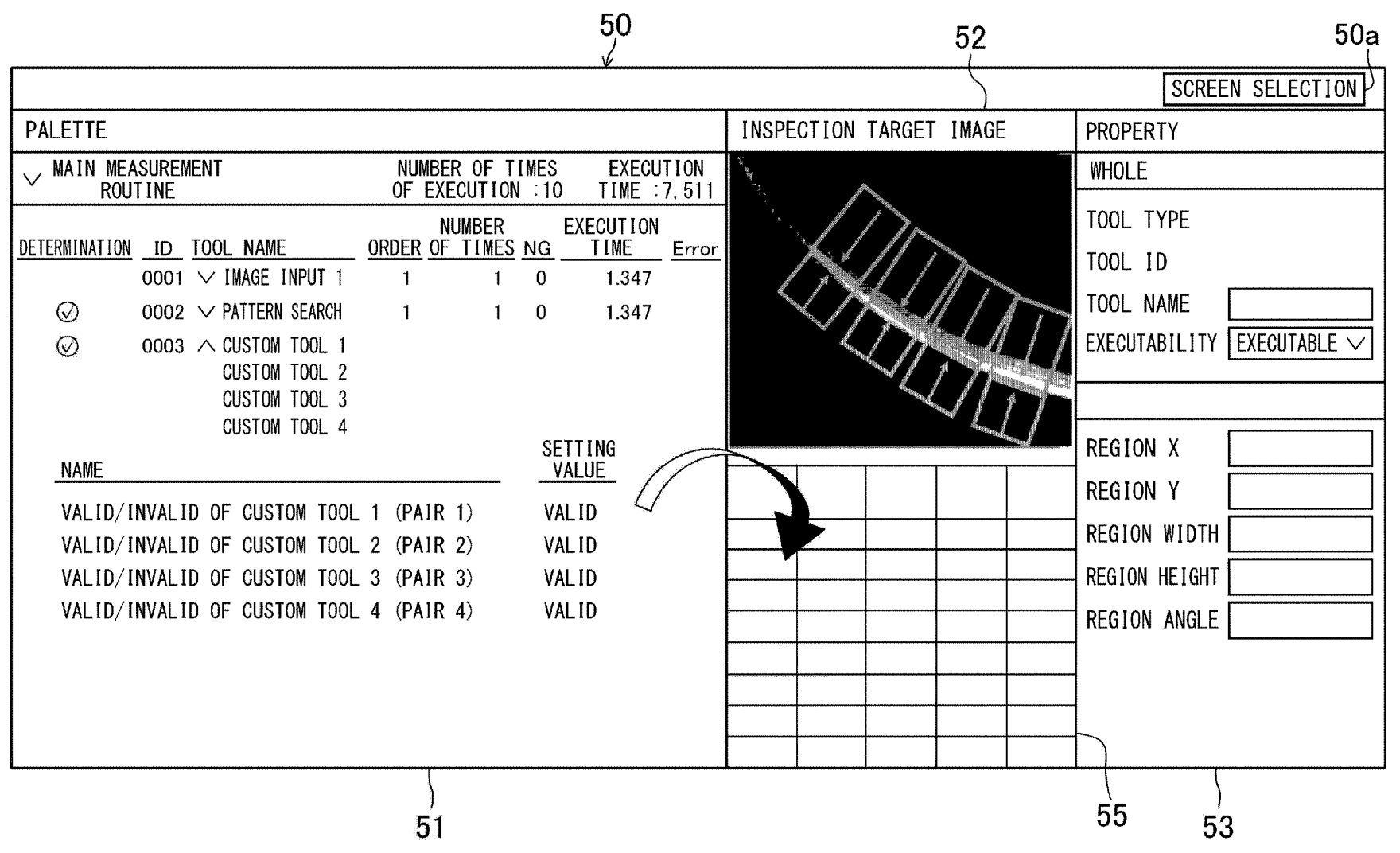

FIG. 35 illustrates a case where four custom tools having the same inspection content are created by duplicating the custom tool 51f set in FIG. 34. By duplicating the custom tool, it is possible to save time and effort to set a plurality of custom tools having the same inspection content. In this manner, it is possible to inspect each of a large number of inspection target regions. As illustrated in FIG. 36, the mnemonic for each custom tool can be attached to the work sheet region 55. For example, by applying a filter to extract a parameter regarding "valid/invalid" among the parameters of each custom tool and attaching the parameter to the work sheet region 55, the parameter can be displayed in a tabular form in the work sheet region 55.

Figure 37:
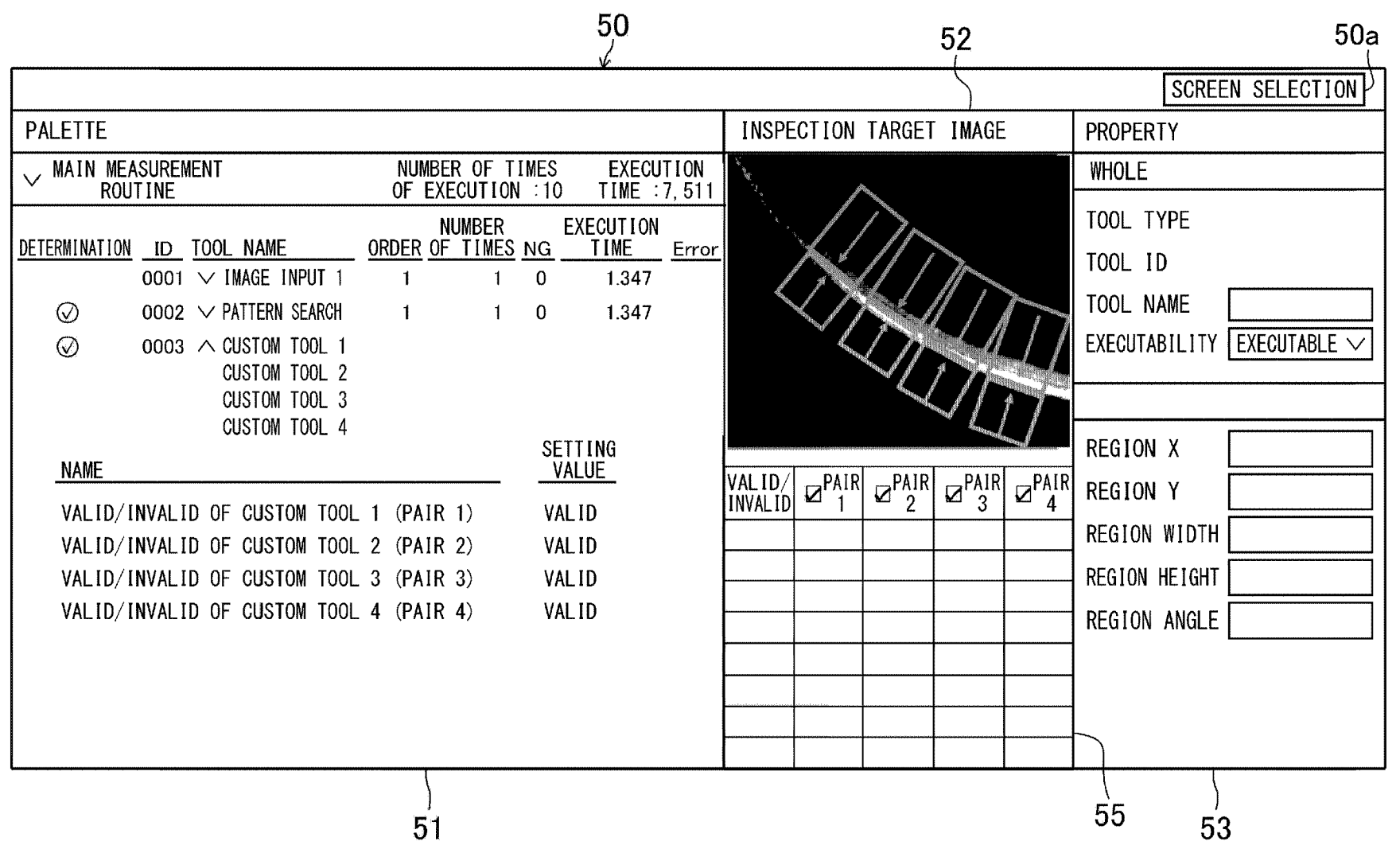

FIG. 37 illustrates a screen after the operation illustrated in FIG. 36. In the present example, since all the custom tools are made valid, the checked check box is displayed at the beginning of the cell of "pair 1", "pair 2", "pair 3", and "pair 4" indicating each of the custom tools 1 to 4 in the work sheet region That is, whether to make each custom tool valid or invalid can be set via the check box in the work sheet region 55.

Figure 38:
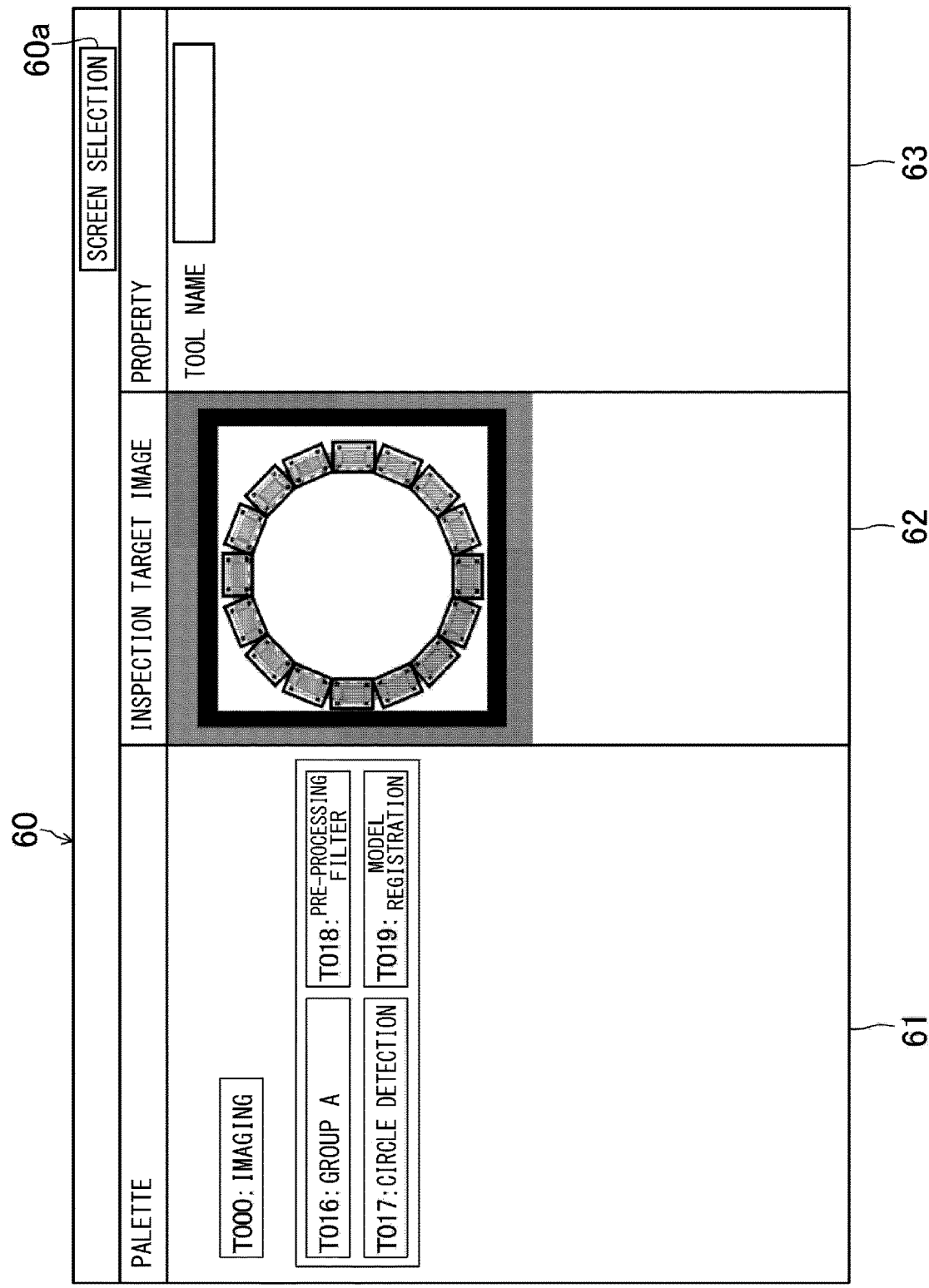
FIG. 38 is a diagram for explaining a case of creating a custom tool including a group tool.
Figure 39:
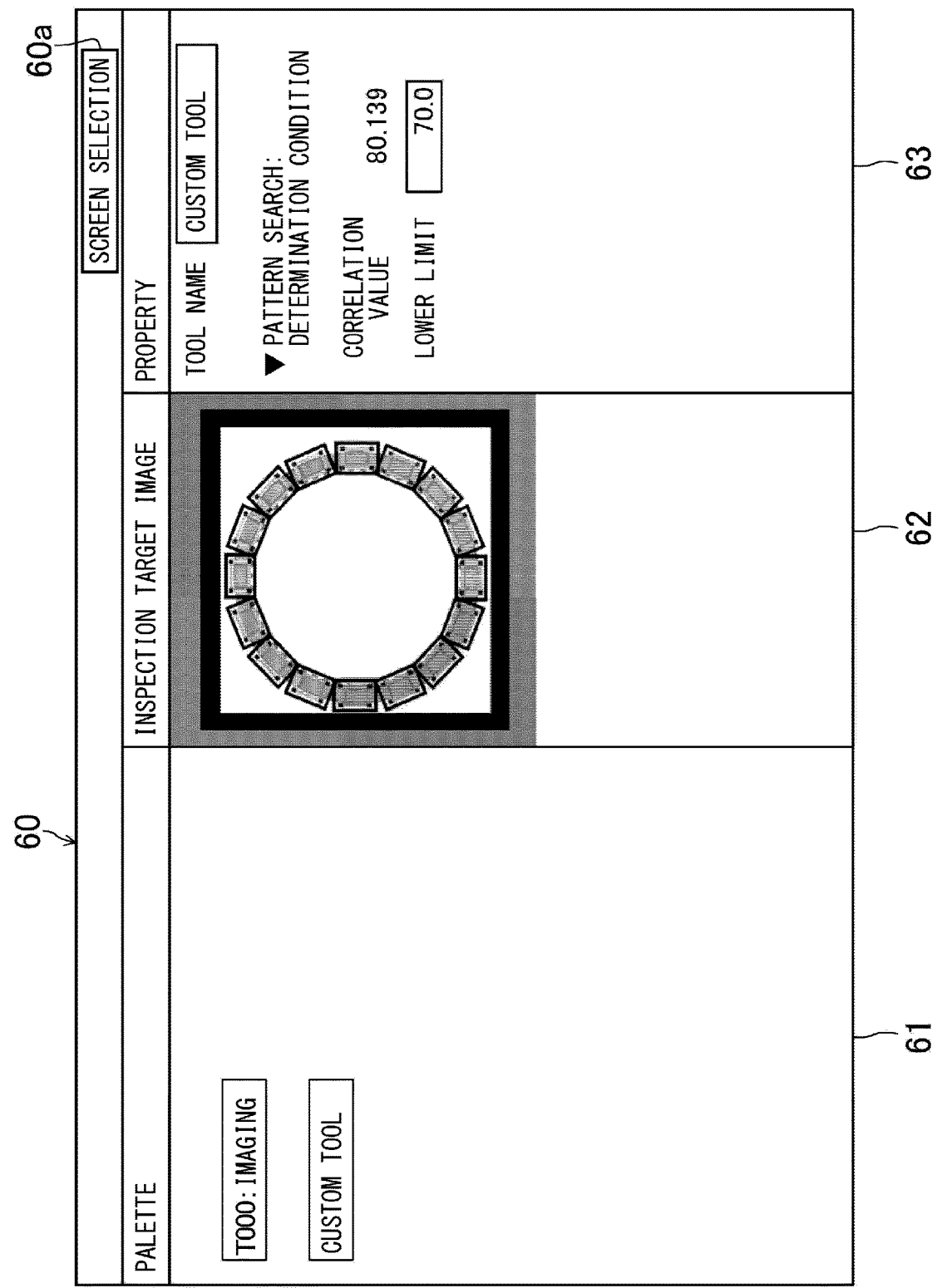
FIG. 39 is a diagram illustrating a state in which a custom tool is created.

FIG. 38 is a diagram for explaining a case of creating a custom tool including a group tool and other tools. The group tool including "T016 group A" tool, "T017 circle detection" tool, "T018 preprocessing filter" tool, and "T019 model registration" tool arranged in the palette region 61 can be customized. FIG. 39 illustrates a case where one custom tool named "custom tool" including a group tool and other tools is generated by the custom tooling illustrated in FIG. 38. In the present example, the "T016 group A" tool includes a "pattern search" tool, and only determination conditions of the tool are displayed in the property region 63 as parameters that can be displayed and edited for the created custom tool. Note that not only a group tool but also a custom tool further including a custom tool can be created.

(Modification)

Figure 40:
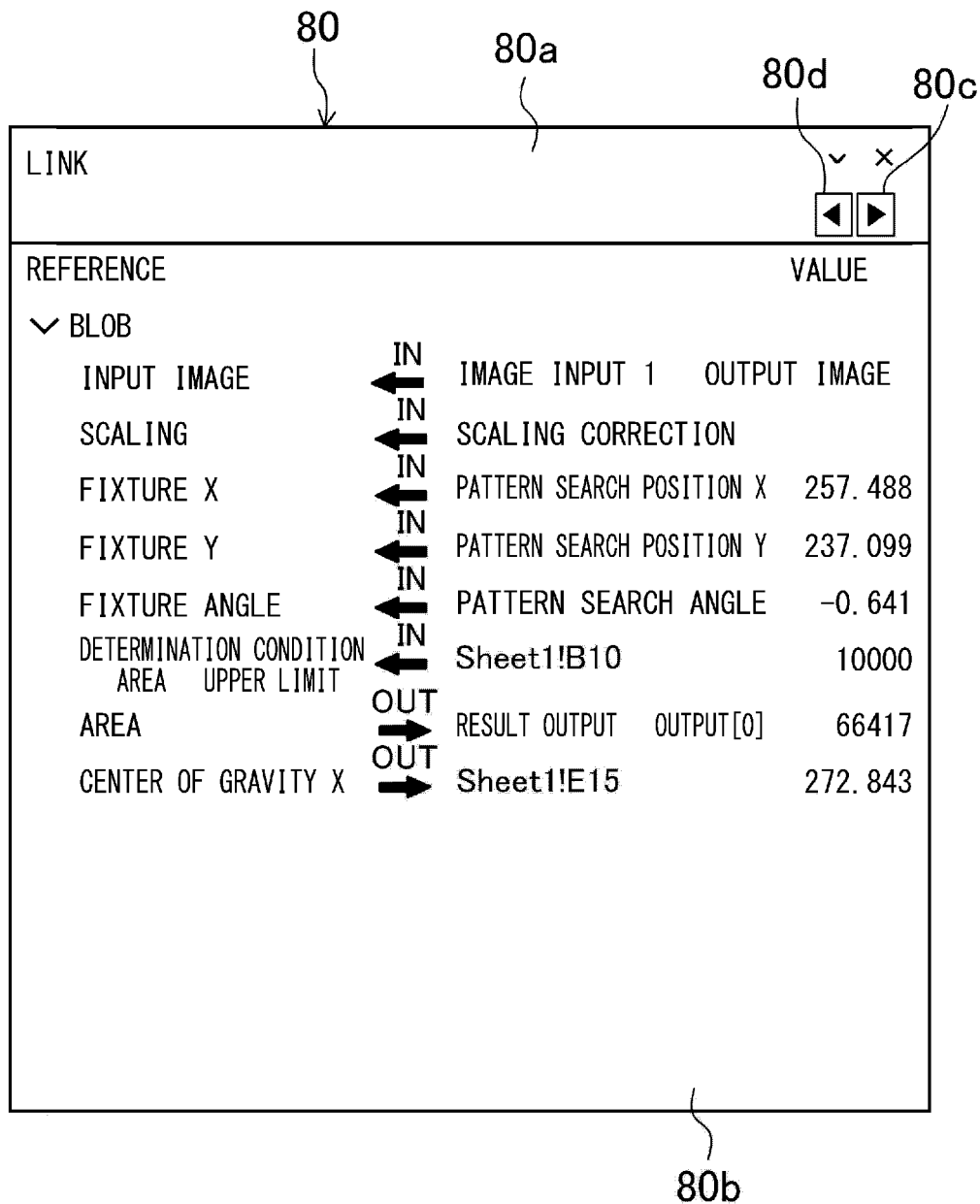
FIG. 40 is a diagram according to a modification in which reference relationships are displayed in a list.

FIG. 40 is a diagram illustrating a case where a region illustrating a reference relationship is separately displayed, and is a link screen 80 that displays a reference state of a tool or the like selected on the palette region 61 or the work sheet region 65. The link screen 80 includes a tool bar 80a and a list 80b that displays a reference state. The tool bar 80a is provided with a return button 80c and a forward button 80d. The return button 80c and the forward button 80d are buttons for returning/advancing the state transition by the hyperlink when operated by the operation unit 40. In a case where the transition has never been made by the hyperlink, the hyperlink is inactive and the operation is disabled. In a case where the transition has been made even once, when the return button 80c is operated in the initial state, it is inactive, and when the forward button 80d is operated, it is active. From the beginning to the end, the return button 80c and the forward button 80d are activated. When the return button 80c is operated in the last state, it is activated, and when the forward button 80d is operated, it is deactivated.

In the list 80b, the tool selected in the palette region 61 and the reference state of the cell selected in the work sheet region 65 are displayed as a list. When the group tool is selected, all the tools included in the group tool are displayed as being selected. Further, when a plurality of tools or cells are selected, all the selected tools or cells are displayed.

Figure 41:
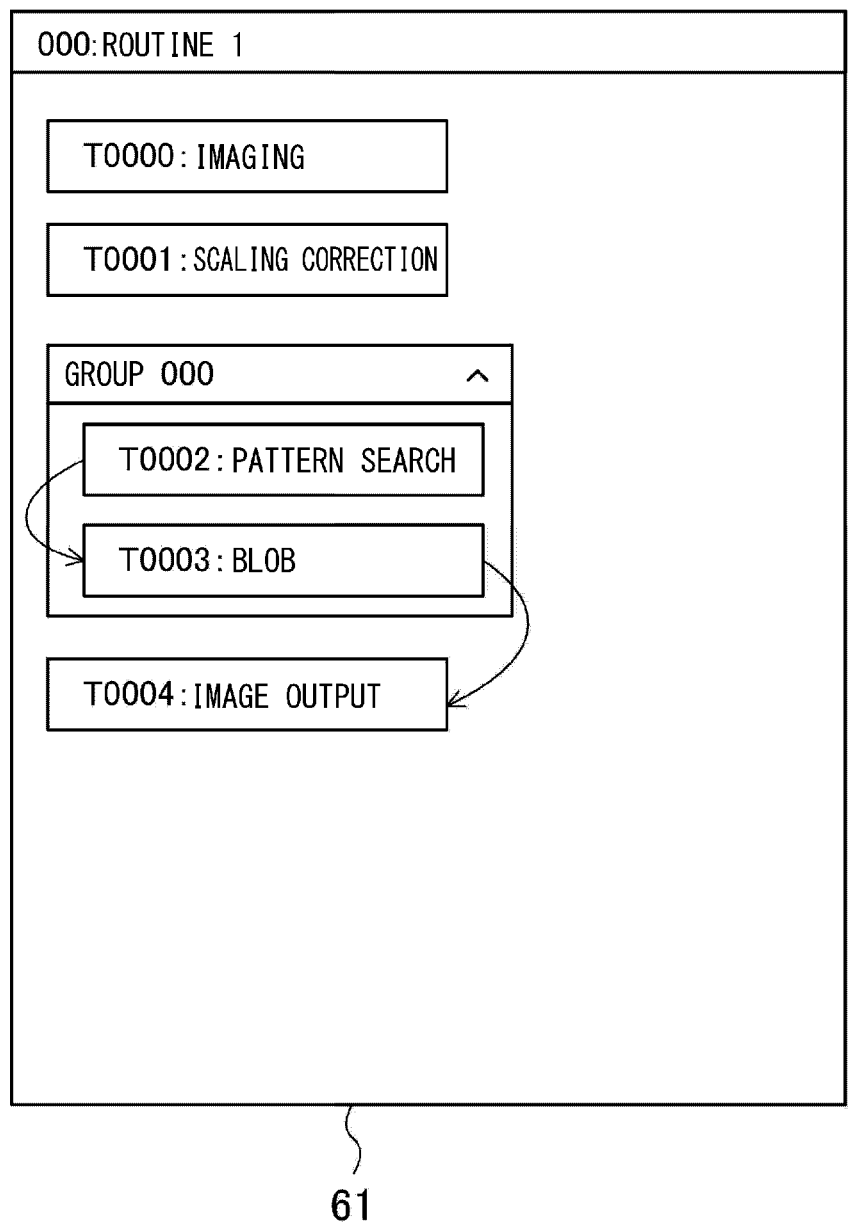
FIG. 41 is a diagram according to a modification in which reference relationships are displayed by arrows.

FIG. 41 is a modification illustrating a case where the reference relationship is illustrated by an arrow. As illustrated in this drawing, an arrow is displayed from the selected tool on the palette region 61 toward the referenced tool. When a cell is selected, an arrow is similarly displayed toward the reference destination.

Figure 42:
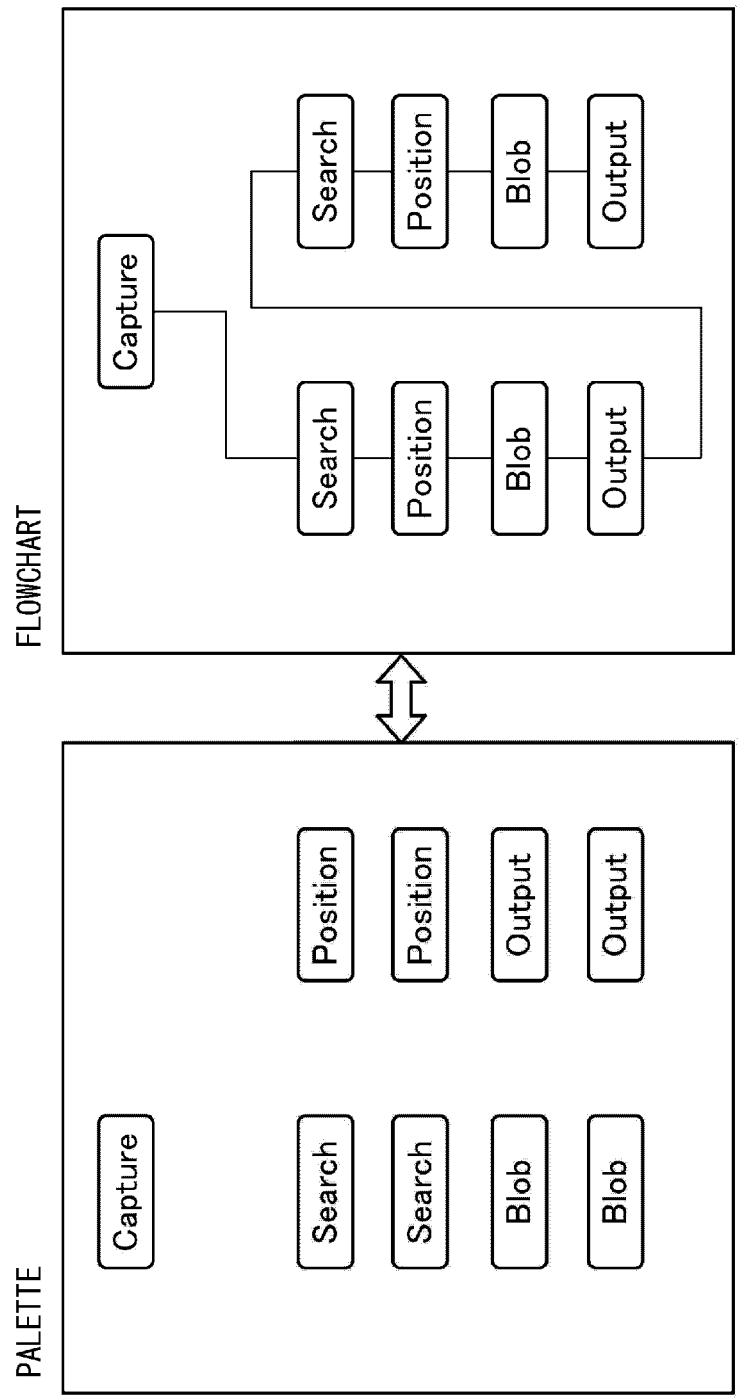
FIG. 42 is a modification in which a flowchart is switched to be displayable.

FIG. 42 is a modification illustrating a case where the flowchart is switched. In a case where a plurality of tools are arranged in the palette region 61, a flowchart illustrating a reference relationship can be displayed by a user operation.

The above-described embodiments are merely examples in all respects, and should not be construed in a limiting manner. Further, all modifications and changes falling within the equivalent scope of the claims are within the scope of the invention.

As described above, the inspection setting device according to the invention can be used when setting the image inspection device that inspects the workpiece captured by the camera.

What is claimed is:

1. An inspection setting device for setting an image inspection device that inspects a workpiece captured by a camera, the inspection setting device comprising:
   a screen generation unit configured to generate a display screen displaying a palette region in which a plurality of tools can be arranged, the plurality of tools including an imaging setting tool related to capturing setting of a camera, a positioning setting tool related to positioning an inspection region with respect to an inspection target image captured by the camera, an inspection setting tool related to an inspection content with respect to the positioned inspection region, and an output tool related to an output setting for an inspection result, and displaying a work sheet region for referring to and calculating data related to the plurality of tools; and
   an input unit configured to receive selection of a tool arranged on the palette region on the display screen, and receive a setting related to input, reference, or calculation of data related to the selected tool via the work sheet region.

2. The inspection setting device according to claim 1, comprising
   a control unit configured to generate a mnemonic representing data related to a tool arranged on the palette region, wherein
   the input unit receives a forward reference instruction for taking data related to a selected tool on the palette region into the work sheet region, and
   when the input unit receives the forward reference instruction, the control unit associates the selected tool with a cell by giving the mnemonic of data related to the selected tool to the cell on the work sheet region.

3. The inspection setting device according to claim 2, wherein the input unit is configured to receive the forward reference instruction by a drag and drop operation in which the data related to the selected tool on the palette region is dragged and dropped on the work sheet region.

4. The inspection setting device according to claim 1, wherein
   the input unit receives a reverse reference instruction for taking data of a selected cell on the work sheet region into a parameter of the selected tool on the palette region, and
   the inspection setting device comprises a control unit configured to, when the input unit receives the reverse reference instruction, associate the parameter of the selected tool on the palette region with a selected cell on the work sheet region by providing a reference link to the selected cell on the work sheet region with respect to the parameter of the selected tool on the palette region.

5. The inspection setting device according to claim 1, wherein
   the input unit receives a reverse reference instruction for taking data of a cell in which a calculation result received via the work sheet region is arranged, into a parameter of the selected tool on the palette region, and
   the inspection setting device comprises a control unit configured to, when the input unit receives the reverse reference instruction, associate the parameter of the selected tool on the palette region with a cell in which the calculation result is arranged by providing a reference link to the cell in which the calculation result is arranged for the parameter of the selected tool on the palette region.

6. The inspection setting device according to claim 1, comprising
   a control unit configured to analyze a reference relationship between a plurality of tools arranged on the palette region and data input to the work sheet region, and determine an execution order at the time of execution of inspection of each tool, and a reference order and a calculation order of data in the work sheet region.

7. The inspection setting device according to claim 6, wherein
   the input unit receives at least one of a selection operation of an arbitrary tool among a plurality of tools arranged on the palette region and a selection operation of a cell in the work sheet region to which data is input,
   when the selection operation of the arbitrary tool is received by the input unit, the control unit creates reference relationship data indicating a reference relationship between the selected tool and a cell in the work sheet region, and when the selection operation of the cell to which the data is input is received by the input unit, the control unit creates reference relationship data indicating a reference relationship between the selected cell and a tool, and
   the screen generation unit generates a display screen displaying the reference relationship data created by the control unit.

8. The inspection setting device according to claim 6, wherein the control unit refers to identification information allocated to a plurality of tools arranged on the palette region and a plurality of cells in the work sheet region, analyzes a dependency relationship based on a processing content of each piece of the identification information, and executes a sorting algorithm, thereby determining an execution order of each tool at the time of execution of inspection, and a reference order and a calculation order of data in the work sheet region.

9. The inspection setting device according to claim 8, wherein
   the input unit is configured to receive an instruction to take an output result from positioning setting tools and/or inspection setting tools arranged on the palette region into the work sheet region, and an instruction to take a calculation setting and a calculation result based on an output result arranged in a cell into the output tool arranged in the palette region, and
   when the input unit receives an instruction to take the output result into the work sheet region, the control unit inputs the output result into a cell in the work sheet region, and when the input unit receives an instruction to take the calculation result into the output tool arranged in the palette region, the control unit executes the calculation, and provides the output tool with a reference link to a cell in which the calculation result is arranged, thereby associating the output tool with a cell in which the calculation result is arranged.

10. The inspection setting device according to claim 1, wherein the screen generation unit is configured to generate a display screen that simultaneously displays the palette region, the work sheet region, and an image region that displays an image captured by the camera.

11. The inspection setting device according to claim 10, wherein the screen generation unit is configured to generate a display screen that distinguishes and displays a first inspection region in the image region and a tool and a cell related to the first inspection region, and a second inspection region in the image region and a tool and a cell related to the second inspection region.

12. An inspection setting device for setting an image inspection device that inspects a workpiece captured by a camera, the inspection setting device comprising:
 a processor; and
 a memory connected to the processor, wherein the processor and the memory are configured to:
  generate a display screen displaying a palette region in which a plurality of tools including an imaging setting tool related to capturing setting of a camera, a positioning setting tool related to positioning an inspection region with respect to an inspection target image captured by the camera, an inspection setting tool related to an inspection content with respect to the positioned inspection region, and an output tool related to an output setting for an inspection result, and a work sheet region for referring to and calculating data related to the plurality of tools; and
  receive selection of a tool arranged on the palette region on the display screen, and receive a setting related to input, reference, or calculation of data related to the selected tool via the work sheet region.

13. The inspection setting device according to claim 12, wherein the processor and the memory are further configured to:
 generate a mnemonic representing data related to a tool arranged on the palette region;
 receive a forward reference instruction for taking data related to a selected tool on the palette region into the work sheet region; and
 associate the selected tool with a cell by giving the mnemonic of data related to the selected tool to the cell on the work sheet region.

14. The inspection setting device according to claim 12, wherein the processor and the memory are further configured to:
 receive a reverse reference instruction for taking data of a selected cell on the work sheet region into a parameter of the selected tool on the palette region; and
 associate the parameter of the selected tool on the palette region with the selected cell on the work sheet region by providing a reference link to the selected cell on the work sheet region with respect to the parameter of the selected tool on the palette region.

15. The inspection setting device according to claim 12, wherein the processor and the memory are further configured to:
 receive a reverse reference instruction for taking data of a cell in which a calculation result received via the work sheet region is arranged, into a parameter of the selected tool on the palette region; and
 associate the parameter of the selected tool on the palette region with the cell in which the calculation result is arranged by providing a reference link to the cell in which the calculation result is arranged for the parameter of the selected tool on the palette region.

16. The inspection setting device according to claim 12, wherein the processor and the memory are further configured to:
 analyze a reference relationship between a plurality of tools arranged on the palette region and data input to the work sheet region; and
 determine an execution order at the time of execution of inspection of each tool, and a reference order and a calculation order of data in the work sheet region.

17. The inspection setting device according to claim 16, wherein the processor and the memory are further configured to:
 receive at least one of a selection operation of an arbitrary tool among a plurality of tools arranged on the palette region and a selection operation of a cell in the work sheet region to which data is input,
 create reference relationship data indicating at least one of a reference relationship between the selected tool and a cell in the work sheet region and a reference relationship between the selected cell and a tool; and
 generate a display screen displaying the reference relationship data.

18. The inspection setting device according to claim 16, wherein the processor and the memory are further configured to:
 refer to identification information allocated to a plurality of tools arranged on the palette region and a plurality of cells in the work sheet region;
 analyze a dependency relationship based on a processing content of each piece of the identification information; and
 execute a sorting algorithm, thereby determining an execution order of each tool at the time of execution of inspection, and a reference order and a calculation order of data in the work sheet region.

19. The inspection setting device according to claim 18, wherein the processor and the memory are further configured to:
 receive an instruction to take an output result from positioning setting tools and/or inspection setting tools arranged on the palette region into the work sheet region, and an instruction to take a calculation setting and a calculation result based on an output result arranged in a cell into the output tool arranged in the palette region;
 input the output result into a cell in the work sheet region, when the instruction to take the output result into the work sheet region is received; and
 execute the calculation and provide the output tool with a reference link to a cell in which the calculation result is arranged, when the instruction to take the calculation result into the output tool arranged in the palette region is received, thereby associating the output tool with the cell in which the calculation result is arranged.

20. The inspection setting device according to claim 12, wherein the processor and the memory are further configured to generate a display screen that simultaneously displays the palette region, the work sheet region, and an image region that displays an image captured by the camera.

* * * * *